US005698806A

United States Patent [19]

Yamada et al.

[11] Patent Number: 5,698,806

[45] Date of Patent: Dec. 16, 1997

[54] COMPUTERIZED SOUND SOURCE PROGRAMMABLE BY USER'S EDITING OF TONE SYNTHESIS ALGORITHM

[75] Inventors: Hideo Yamada; Masashi Hirano, both of Hamamatsu, Japan

[73] Assignee: Yamaha Corporation, Japan

[21] Appl. No.: 657,045

[22] Filed: May 29, 1996

[30] Foreign Application Priority Data

Jun. 2, 1995 [JP] Japan .................................... 7-159945
Feb. 19, 1996 [JP] Japan .................................... 8-055600

[51] Int. Cl.$^{6}$ ................................ G01H 1/18; G01H 7/00

[52] U.S. Cl. ................................................ 84/615; 84/622

[58] Field of Search .............................. 84/600, 601, 622, 84/659, 615

[56] References Cited

U.S. PATENT DOCUMENTS

| | | | |
|---|---|---|---|
| 4,297,933 | 11/1981 | Nishimoto . | |
| 4,554,857 | 11/1985 | Nishimoto | 84/624 |
| 5,153,829 | 10/1992 | Furuya et al. . | |
| 5,220,117 | 6/1993 | Yamada et al. . | |
| 5,276,272 | 1/1994 | Masuda | 84/600 |
| 5,354,948 | 10/1994 | Toda . | |
| 5,376,752 | 12/1994 | Limberis et al. . | |
| 5,449,857 | 9/1995 | Ohshima . | |

FOREIGN PATENT DOCUMENTS

| | | | |
|---|---|---|---|
| 5-173576 A | 7/1993 | Japan . | |
| WO 90/03629 | 4/1990 | WIPO . | |

OTHER PUBLICATIONS

Fujitsu Scientific & Technical Journal, 26 (1990) Autumn, No. 3, Kawasaki, JP Mizuno, et al., "Musical Instrument Digital Interface Sequencer Software: EUPHONY" pp. 207–213.

*Primary Examiner*—William M. Shoop, Jr.
*Assistant Examiner*—Jeffrey W. Donels
*Attorney, Agent, or Firm*—Graham & James LLP

[57] ABSTRACT

In a sound source apparatus, a display unit displays a block diagram containing various functional blocks which represent corresponding elementary functions selectively usable for synthesis of a desired musical tone. A secondary memory provisionally stores a pair of an effective elementary program and an ineffective elementary program for each functional block such that the effective elementary program is designed to effectuate the corresponding elementary function while the ineffective elementary program is designed to ineffectuate the corresponding elementary function. An editor unit graphically treats the displayed block diagram so that each functional block is selected if the corresponding elementary function is necessary for the synthesis of the desired musical tone and is otherwise nonselected if the corresponding elementary function is unnecessary for the synthesis of the desired musical tone to thereby edit an algorithm which defines an arithmetic procedure for the synthesis of the desired musical tone. An assembler unit retrieves from the secondary memory an effective elementary program for each selected functional block so as to enable the corresponding elementary function, and retrieves an ineffective elementary program for each nonselected functional block so as to disable the corresponding elementary function to thereby assemble the retrieved ones of the effective and ineffective elementary programs into a complete program according to the edited algorithm. A primary memory stores the complete program. A generator unit is connected to the primary memory for executing the edited arithmetic procedure according to the stored complete program to thereby generate the desired musical tone.

28 Claims, 33 Drawing Sheets

FIGURE 6

| | |
|---|---|
| WAVE GEN FLG | WAVE GEN BLOCK OPERATION ON/OFF FLAG |
| NOISE GEN FLG | NOISE GEN BLOCK OPERATION ON/OFF FLAG |
| WAVE-FILTER FLG | WAVE-FILTER BLOCK OPERATION ON/OFF FLAG |
| NOICE-FILTER FLG | NOISE-FILTER BLOCK OPERATION ON/OFF FLAG |
| DIST1 FLG | DIST1 BLOCK OPERATION ON/OFF FLAG |
| IN-HPF1 FLG | IN-HPF1 BLOCK OPERATION ON/OFF FLAG |
| LOOP1 FLG | LOOP1 BLOCK OPERATION ON/OFF FLAG |
| APF1 FLG | APF1 BLOCK OPERATION ON/OFF FLAG |
| DIST2 FLG | DIST2 BLOCK OPERATION ON/OFF FLAG |
| IN-HPF2 FLG | IN-HPF2 BLOCK OPERATION ON/OFF FLAG |
| LOOP2 FLG | LOOP2 BLOCK OPERATION ON/OFF FLAG |
| APF2 FLG | APF2 BLOCK OPERATION ON/OFF FLAG |
| OUT-FILTER FLG | OUT-FILTER BLOCK OPERATION ON/OFF FLAG |
| EFFECT FLG | EFFECT BLOCK OPERATION ON/OFF FLAG |

FIGURE 7

| | |
|---|---|
| WAVE GEN | WAVE GEN OPERATION |
| WAVE GEN OFF | "CLR WAVEOUT"=CLEAR WAVEOUT |
| NOISE GEN | NOISE GEN OPERATION |
| NOISE GEN OFF | "CLR NOUT"=CLEAR NOUT |
| WAVE-FILTER | WAVE-FILTER OPERATION |
| WAVE-FILTER OFF | "MOVE WOUT WFOUT"=TRANSFER WOUT TO WFOUT |
| NOISE-FILTER | NOISE-FILTER OPERATION |
| NOISE-FILTER OFF | "MOVE NOUT NFOUT"=TRANSFER NOUT TO NFOUT |
| IN-MIX | IN-MIX OPERATION |
| DIST1 | DIST1 OPERATION |
| DIST1 OFF | "MOVE IMXOUT DIST1OUT" |
| IN-HPF1 | IN-HPF1 OPERATION |
| IN-HPF1 OFF | "MOVE DIST1OUT INHPF1OUT" |
| LOOP1(ADD1+LPF1+DELAY1) | ADD1,LPF1,DELAY1 OPERATIONS |
| LOOP1 OFF | "MOVE INHPF1OUT LPF1OUT" |
| APF1 | APF1 OPERATION |
| APF1 OFF | "MOVE DELAY1OUT APF1OUT" |
| DIST2 | DIST2 OPERATION |
| DIST2 OFF | "MOVE IMXOUT DIST2OUT" |
| IN-HPF2 | IN-HPF2 OPERATION |
| IN-HPF2 OFF | "MOVE DIST2OUT INHPF2OUT" |
| LOOP2(ADD2+LPF2+DELAY2) | ADD2,LPF2,DELAY2 OPERATIONS |
| LOOP2 OFF | "MOVE INHPF2OUT LPF2OUT" |
| APF2 | APF2 OPERATION |
| APF2 OFF | "MOVE DELAY2OUT APF2OUT" |
| OUT-MIX | OUT-MIX OPERATION |
| OUT-FILTER | OUT-FILTER OPERATION |
| OUT-FILTER OFF | "MOVE OMXOUT OFOUT" |
| EFFECT | EFFECT OPERATION |
| EFFECT OFF | "MOVE OFOUT OUT" |

FIGURE 8

| FUNCTION | NORMAL INPUT | OUTPUT | INPUT IF PRECEDING BLOCK IS OFF |
|---|---|---|---|
| WAVE GEN | ------- | WAVEOUT | ------- |
| WAVE-FILTER | WAVEOUT | WFOUT | 0 |
| NOISE GEN | ------- | NOUT | ------- |
| NOISE-FILTER | NOUT | NFOUT | 0 |
| IN-MIX | WFOUT,NFOUT | IMXOUT | · IF WAVE-FILTER OFF<br>WFOUT→WAVEOUT<br>· IF NOISE-FLTER OFF<br>NFOUT→NOUT |
| DIST1 | INXOUT | DIST1OUT | ------- |
| IN-HPF1 | DIST1OUT | INHPF1OUT | INMXOUT |
| LOOP1<br>(ADD1+LPF1+DELAY1) | INHPF1OUT,APF1OUT | LOOP1OUT<br>DELAY1OUT | · IF IN-HPF1 OFF<br>INHPF1OUT→DIST1OUT<br>· IF APF1 OFF<br>APF1OUT→DELAY1OUT |
| APF1 | DELAY1OUT | APF1OUT | ------- |
| DIST2 | IMXOUT | DIST2OUT | ------- |
| IN-HPF2 | DIST2OUT | INHPF2OUT | IMXOUT |
| LOOP2<br>(ADD2+LPF2+DELAY2) | INHPF2OUT,APF2OUT | LOOP2OUT<br>DELAY2OUT | · IF IN-HPF2 OFF<br>INHPF2OUT→DIST2OUT<br>· IF APF2 OFF<br>APF2OUT→DELAY2OUT |
| APF2 | DELAY2OUT | APF2OUT | ------- |
| OUT-MIX | LPF1OUT,LPF2OUT | OMXOUT | · IF LOOP1 OFF<br>LPF1OUT→0<br>· IF LOOP2 OFF<br>LPF2OUT→0 |
| OUT-FILTER | OMXOUT | OFOUT | ------- |
| EFFECT | OFOUT | OUTPUT | OMXOUT |

COMPUTERIZED SOUND SOURCE PROGRAMMABLE BY USER'S EDITING OF TONE SYNTHESIS ALGORITHM

BACKGROUND OF THE INVENTION

The present invention relates to a programmable sound source having an algorithm editor, which can synthesize various tones with definite steps of data processing, and which enables free setting of a desired tone generation algorithm.

In the prior art, there is a known sound source device in which a DSP (Digital Signal Processor) executes certain data processing according to a microprogram in order to synthesize musical tones. For example, Japanese patent JP-A-5-173576 discloses a sound source in which a microprogram corresponding to a selected tone is transferred to a tone generator circuit comprised of a DSP and RAM. The tone generator circuit executes the microprogram to create a musical sound signal of the selected tone.

In order to modify timbre of the tone in such a sound source device, a desired tone generation algorithm is selected from several tone generation algorithms prepared in advance, and then tone control parameters are modified to create the desired timbre in the tone generation. Therefore, if an old algorithm is changed to a new algorithm during the timbre setup, the tone control parameters adapted for the old algorithm may not work in the new algorithm, so that a user may have to set up the tone control parameters all over again from the start. Further in the conventional sound source, selection of elementary or fundamental functions in the tone generating algorithm is carried out by modifying relevant parameters to disable unnecessary functions. For example, if a functional noise generator in the tone generation algorithm is not required, relevant parameters are set to turn off output of the noise generator to 'zero'. In this case, the microprogram corresponding to the noise generation itself is not modified. Thus, the tone generation algorithm can be modified virtually or equivalently by changing the parameters. However, the number of computation steps of the microprogram is fixed in spite of the change in the tone generation algorithm. For that reason, even if a complicated one of the tone generation algorithm is changed to a simplified one, it is impossible to execute other processings by DSP or to increase the number of tone generation channels because the total number of the computation steps for the tone generation is unchanged and therefore the DSP cannot perform jobs other than the tone generation.

SUMMARY OF THE INVENTION

The purpose of the present invention is to provide the user with freedom of editing the tone generation algorithm to synthesize various tones with limited hardware resources and limited computation steps of the microprogram in a sound source apparatus in which a musical sound signal is produced by digital signal processing.

According to the present invention, a sound source apparatus comprises editor means for editing a specific algorithm which defines an arithmetic procedure for computerized synthesis of a desired musical tone by selecting or nonselecting each of various elementary functions which are generally usable for computerized synthesis of any musical tones, assembler means for assembling a computer program corresponding to the edited specific algorithm, memory means for storing the assembled computer program, and generator means for executing the arithmetic procedure according to the stored computer program to thereby generate the desired musical tone.

In a specific form, the inventive sound source apparatus comprises display means for displaying a block diagram containing various functional blocks which represent corresponding elementary functions selectively usable for synthesis of a desired musical tone, secondary memory means provisionally storing a pair of an effective elementary program and an ineffective elementary program for each functional block such that the effective elementary program is designed to effectuate the corresponding elementary function while the ineffective elementary program is designed to ineffectuate the corresponding elementary function, editor means for graphically treating the displayed block diagram so that each functional block is selected if the corresponding elementary function is necessary for the synthesis of the desired musical tone and is otherwise nonselected if the corresponding elementary function is unnecessary for the synthesis of the desired musical tone to thereby edit an algorithm which defines an arithmetic procedure for the synthesis of the desired musical tone, assembler means for retrieving from the secondary memory means an effective elementary program for each selected functional block so as to enable the corresponding elementary function and for retrieving an ineffective elementary program for each nonselected functional block so as to disable the corresponding elementary function to thereby assemble the retrieved ones of the effective and ineffective elementary programs into a complete program according to the edited algorithm, primary memory means for storing the complete program, and generator means connected to the primary memory means for executing the edited arithmetic procedure according to the stored complete program to thereby generate the desired musical tone. Preferably, the secondary memory means comprises means storing the elementary program in the form of a microprogram.

Further, according to the invention, a timbre creating apparatus assembles microprograms into a complete program which is loaded into a digital signal processor to operate the same to generate a musical tone having a desired timbre. The apparatus comprises display means for displaying a block diagram containing various functional blocks which represent corresponding elementary functions selectively usable for creation of the desired timbre, memory means for storing a pair of effective and ineffective microprograms for each functional block such that the effective microprogram is designed to effectuate the corresponding elementary function while the ineffective microprogram is designed to ineffectuate the corresponding elementary functions editor means for graphically treating the displayed block diagram so that each functional block is selected if the corresponding elementary function contributes to the desired timbre and is otherwise nonselected if the corresponding elementary function does not contribute to the desired timbre to thereby edit an algorithm which defines an arithmetic procedure for the creation of the desired timbre, and assembler means for retrieving from the memory means an effective microprogram for each selected functional block so as to enable the corresponding elementary function and for retrieving from the memory means an ineffective microprogram for each nonselected functional block so as to disable the corresponding elementary function to thereby assemble the retrieved ones of the effective and ineffective microprograms into the complete program according to the edited algorithm.

According to the present invention as defined above, if the user specifies and edits an arithmetic procedure to generate a desired musical tone, a tone generation program relevant to the specified arithmetic procedure is assembled and stored in the primary memory means. The musical tone is synthesized by executing digital signal processing according to the tone generation program stored in the primary memory means. Specifically, an original or common form of the tone generation algorithm to synthesize a musical tone can be graphically displayed with representing each elementary function of the tone generation algorithm as a corresponding functional block in order to enable the user to select and nonselect each displayed block. For this configuration, there are provided an elementary program to be installed in case that the relevant functional block is selected and another complementary elementary program to be installed in case that the relevant functional block is nonselected. The effective elementary programs for each selected block and the ineffective elementary programs for each nonselected block are combined altogether, in order to build up a complete tone generation program.

BRIEF DESCRIPTION OF THE DRAWINGS

FIG. 6 shows a list of microprogram flags.

FIG. 7 shows contents of DSP basic microprograms stored in the ROM.

FIG. 8 shows relationship between performance of each microprogram and data input/output.

DETAILED DESCRIPTION OF THE INVENTION

Figure 1:
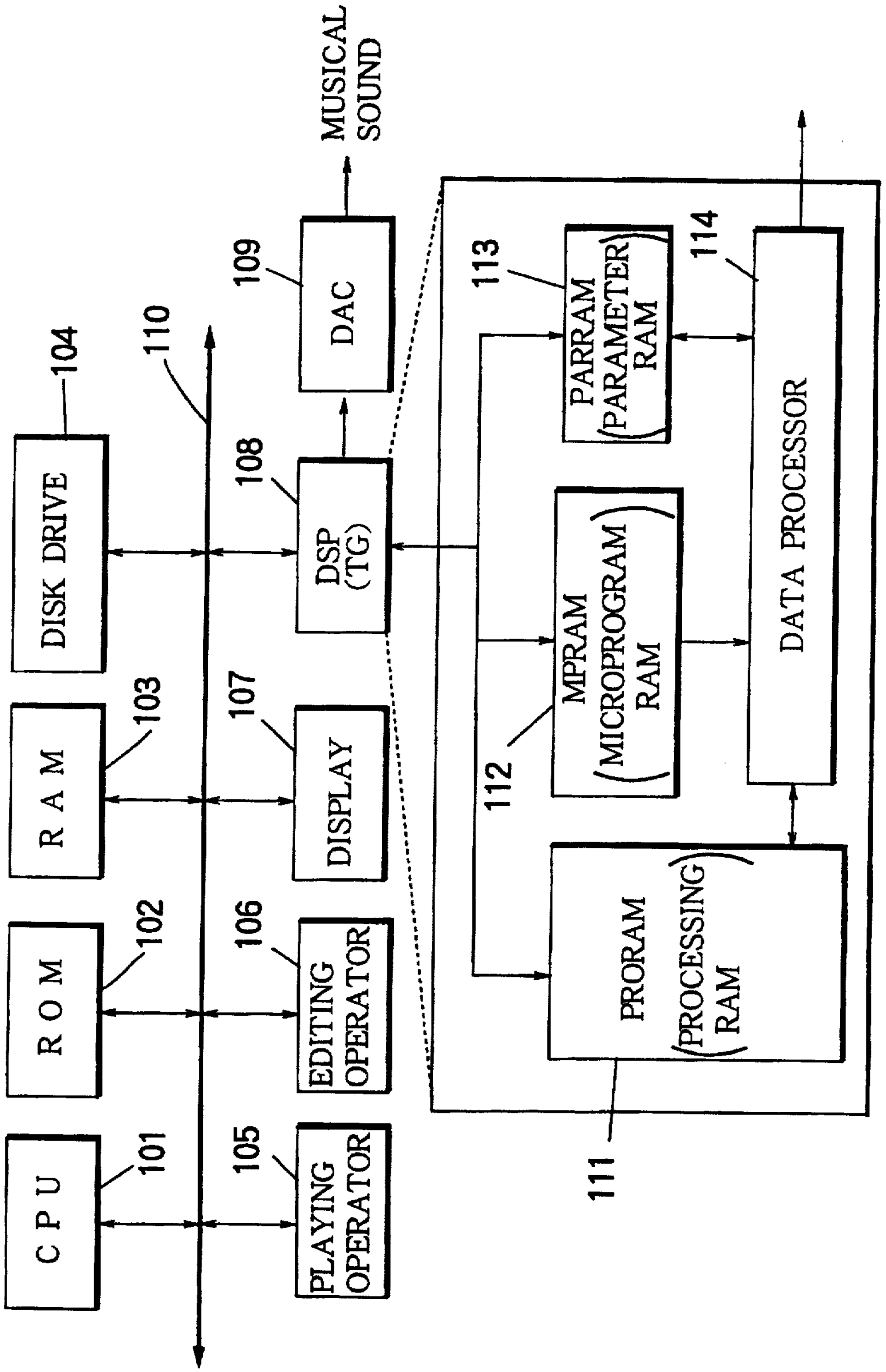
FIG. 1 is a schematic block diagram of an electronic musical instrument employing a programmable sound source apparatus having an algorithm editor according to an embodiment of the present invention.

Details of embodiments of the present invention will be described with reference to Figures. FIG. 1 is a schematic diagram of an electronic musical instrument employing a programmable sound source and a timbre editor according to the present invention. The electronic musical instrument comprises a Central Processing Unit (CPU) 101, a Read Only Memory (ROM) 102, a Random Access Memory (RAM) 103, a disk drive 104, a playing operator 105, an editing operator 106, a display 107, a sound source (tone generator TG) 108 composed of DSP, and a Digital-to-Analog Converter (DAC) 109. Numeral 110 denotes a bus line connecting these units with each other.

The CPU 101 controls the whole system of the electronic musical instrument. The ROM 102 stores control programs to be executed by the CPU 101, as well as elementary microprograms to be transferred to the sound source 108. In the RAM 103, there are allocated various buffer areas and data areas for timbre parameters. The disk drive 104 is an external memory device to store various data including the timbre parameters. The playing operator 105 is a manipulating device operated by the user such as a keyboard. The editing operator 106 is a manipulating device operated by the user and composed of an alphanumeric keyboard and a mouse etc. The display 107 is utilized to display various data. The DAC 109 converts a digital signal produced by the sound source 108 into an analog signal.

The sound source 108 is a programmable tone generator comprised of DSP. The DSP includes a Processing RAM (PRORAM) 111, a Microprogram RAM (MPRAM) 112, a Parameter RAM (PARRAM) 113, and a data processor 114. The PRORAM 111 is used as arithmetic registers, delay registers, various tables for waveform data etc. MPRAM 112 stores microprograms as a primary memory of the DSP. PARRAM 113 stores tone control parameters (hereinafter, "voice parameters"). The data processor 114 executes arithmetic operation for the musical sound generation according to the elementary microprograms stored in the MPRAM 112, using the voice parameters stored in the PARRAM 113. The microprograms stored in the MPRAM 112 define the tone generation algorithm of the sound source 108.

In the instrument shown in FIG. 1, the user can set and edit timbres by means of the operator 106 with monitoring the display 107. More particularly, the user selects desired one of the ready-made or preset timbres reserved in the ROM 102 or the user-made timbres registered in the RAM 103. The user-made timbres stored in the RAM 103 is loaded from the disk drive 104 in advance. On the timbre selecting operation, a set of microprograms relevant to the tone generation algorithm corresponding to the selected timbre is assembled or set up in a V buffer (described later with reference to FIG. 5) in the RAM 103. The assembled microprogram set is sent to the sound source 108. The sound source 108 stores the transferred microprogram set in the MPRAM 112.

After the timbre selection operation above, the user manipulates the playing operator 105 to perform the instrument so that the voice parameters corresponding to performance information such as pitch information and touch information inputted by a keyboard of the playing operator 105 is transferred to the sound source 108 through the V buffer in the RAM 103. The sound source 108 stores the transferred voice parameters in the PARRAM 113, and starts the data processing of the tone generation. The data processing is carried out according to the microprogram set stored in the MPRAM 112, using the parameters stored in the PARRAM 113. Thus, the selected timbre is generated.

Further, in the inventive instrument of this embodiment, it is possible to specify and edit a desired tone generation algorithm. More particularly, a functional block diagram graphically representing the tone generation algorithm is displayed on the display 107, and the user can command by means of the editing operator 106 to select and nonselect each block in order to set up or edit the desired tone generation algorithm.

Figure 2:
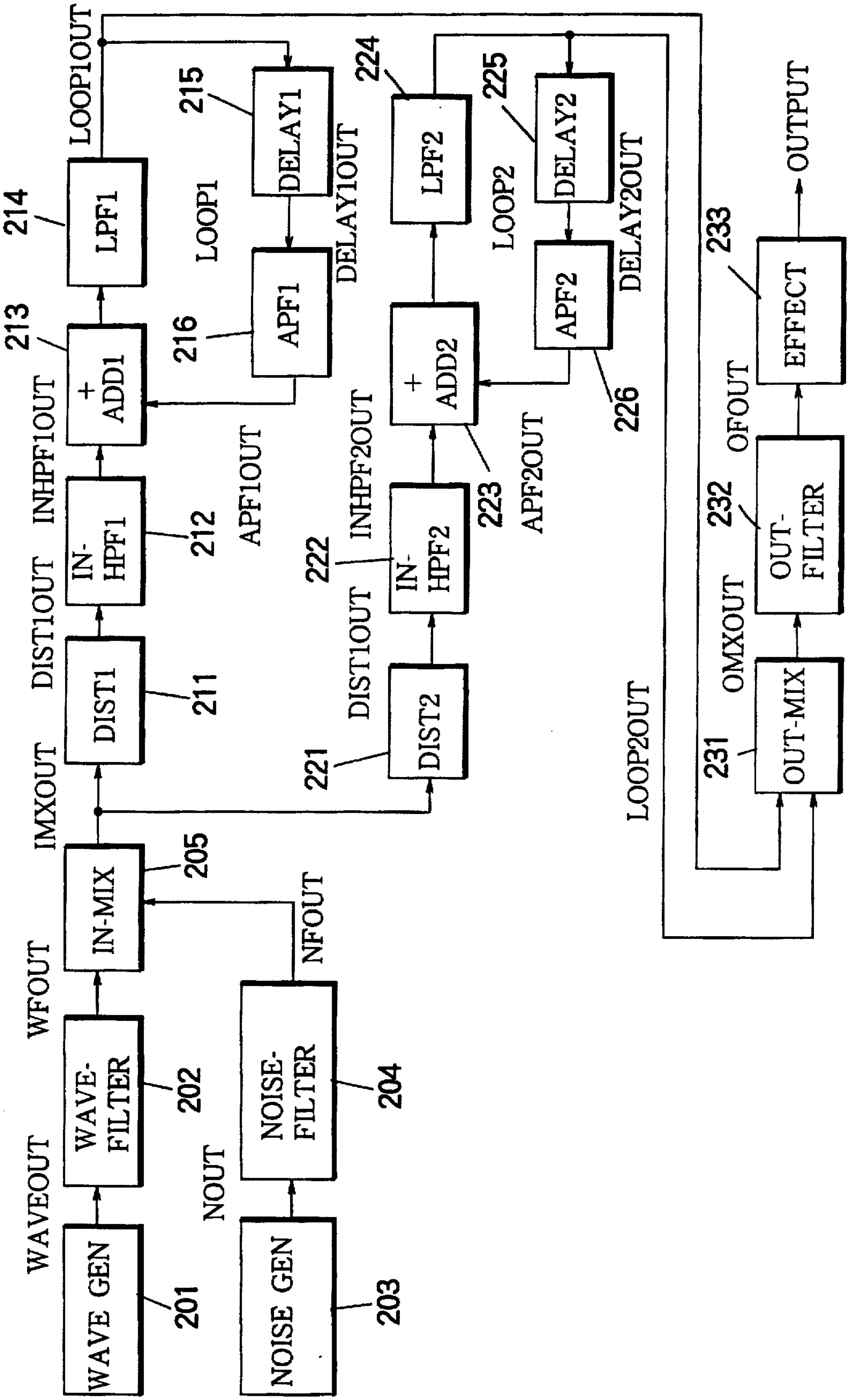
FIG. 2 shows an example of a tone generation algorithm to be edited by the embodiment.

FIG. 2 shows an example of a tone generation algorithm designed for the sound source 108. FIG. 2 shows a most extensive configuration of the algorithm available in the instrument of the present embodiment. Now the algorithm will be explained in detail. A wave generator (WAVE GEN) 201 generates waveform data WAVE OUT. The waveform data WAVE OUT is filtered by a wave filter (WAVE-FILTER) 202, and the filtered output WFOUT is fed to a mixer (IN-MIX) 205. On the other hand, a noise generator (NOISE GEN) 203 generates noise data NOUT, and the noise data NOUT is filtered by a noise filter (NOISE-FILTER) 204, and the filtered output NFOUT is sent to the mixer (IN-MIX) 205. The mixer 205 mixes the data WFOUT and NFOUT with each other, and outputs data IMXOUT. The output data IMXOUT is divided into two part, which are fed to a distorter 211 and a distorter 221, respectively. The distorter (DIST1) 211 adds a distortion effect to the input data IMXOUT, and outputs data DIST1OUT. A high-pass filter (IN-HPF1) 212 processes the data DIST1OUT to suppresses low frequency components thereof. Output data INHPF1OUT is fed to an adder (ADD1) 218 included in a loop effector (LOOP1). The adder 213 adds the output data INHPF1OUT fed from the high-pass filter 212 to output data APF1OUT fed back from an all-pass filter (APF1) 216. The added result is sent to a low-pass filter (LPF1) 214. The output of the low-pass filter (LPF1) 214 is fed to a delay (DELAY1) 215 and is delayed by a predetermined time. The all-pass filter 216 receives the output DELAY1OUT of the delay 215, and adds thereto a predetermined phase characteristic. The output of the all-pass filter 216 is fed back to the adder 213. The output of the low-pass filter 214 becomes the output data LOOP1OUT of the loop effector (LOOP1). A set of blocks 221 to 226 constitutes another data path, respectively corresponding to the above blocks 211 to 216, and operates similarly. An output mixer (OUT-MIX) 231 receives the output LOOP1OUT of the loop effector (LOOP1) and the output LOOP2OUT of the other loop effector (LOOP2), and mixes them to create output OMXOUT. An output filter (OUT-FILTER) 232 filters the data OMXOUT, and produces output OFOUT. An effector (EFFECT) 233 adds various sound effects (reverb, modulation etc.) and produces final output data OUTPUT.

Figure 3:
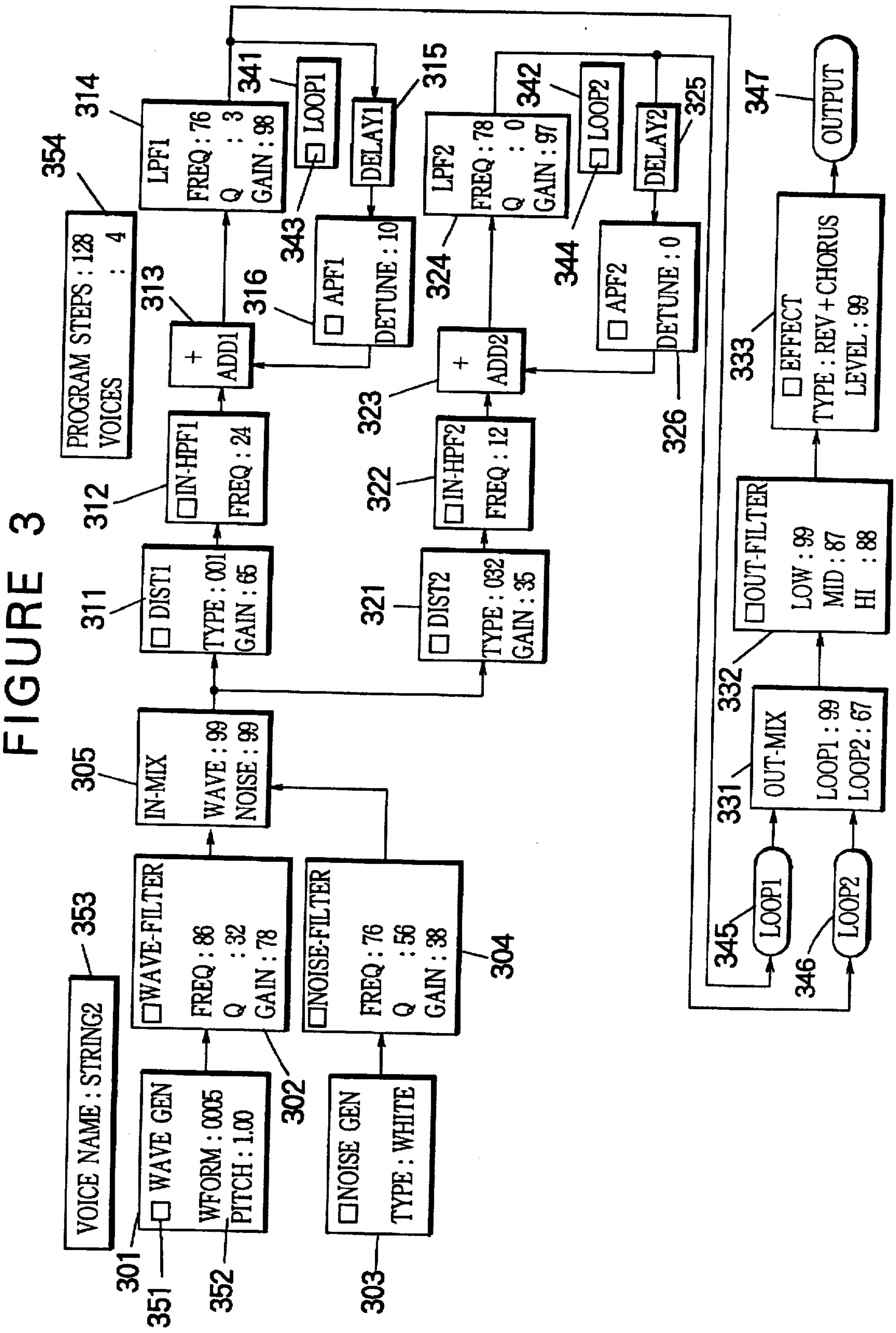
FIG. 3 shows an example of a display screen treated in a algorithm editing mode.
Figure 4:
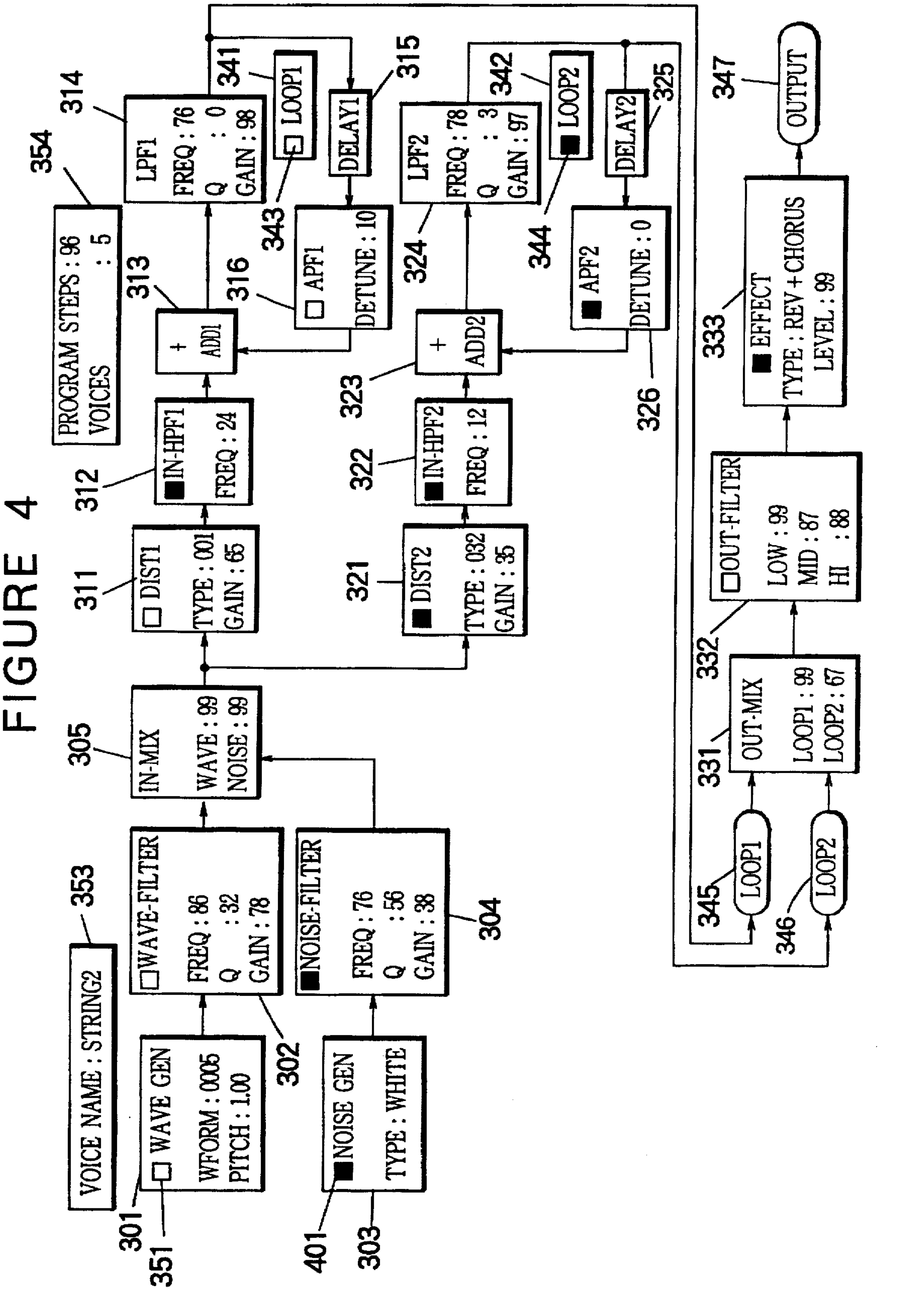
FIG. 4 shows another example of the display screen treated in the algorithm editing mode.

The described algorithm shown in FIG. 2 is the most extensive configuration of the tone generation algorithm in the instrument of the present embodiment. The user can edit the initial algorithm by specifying on/off of each functional block in the algorithm so as to modify timbre of the musical sound. The editing operation of the algorithm is explained hereunder. FIGS. 3 and 4 shows screen display examples in the algorithm editing operation. Elementary blocks 301 to 333 in FIGS. 3 and 4 correspond to the elementary blocks 201 to 233 which represent elementary functions of the algorithm (least significant two digits of the numeral correspond each other for the same block). The arrows in FIGS. 3 and 4 also correspond to the arrows showing the data flow in FIG. 2. Numerals 345 and 346 do not denote actual functional blocks relating to the algorithm, but designate nodes just to illustrate that the outputs of the two loops LOOP1 and LOOP2 are fed to the output mixer (OUT-MIX) 331. Numeral 353 denotes a name of the timbre currently being edited.

In the algorithm editing display shown in FIGS. 3 and 4, a small rectangle 351 within the block 301 corresponding to the wave generator (WAVE GEN) is a check box signifying on/off status of the block. The on status of each block means that the block is selected and enabled to actually work in the tone generation algorithm, while the off status of each block means that the block is functionally disabled in the tone generation algorithm. In other words, the disabled block passes its input data as it is, or outputs 'zero' always. The block is selected if the check box 351 is turned white as shown in FIG. 3, or nonselected if the check box 401 (as in FIG. 4) is turned black. Similar check boxes are provided also for the respective blocks 302, 303, 304, 311, 312, 316, 321, 322, 326, 332 and 333. In FIGS. 3 and 4, the blocks 305 and 331 do not have a check box. These blocks without the check box are indispensable ones, and cannot be eliminated from the tone generation.

A block 341 representing the loop effector (LOOP1) and having a check box 343 is provided to enable concurrent turning on/off of the blocks 313, 314 and 315 which constitute the loop effector LOOP1. If the check box 343 is marked white, more particularly, if the block 341 corresponding to the loop effector is turned on, the blocks 313, 314 and 315 are all enabled to work in the algorithm. Similarly, a block 342 representing the loop effector (LOOP2) and having a check box 344 is provided to enable concurrent turning on/off of the blocks 323, 324 and 325 composing the loop effector (LOOP2).

The user can command to selectively turn on/off each block by means of the editing operator 106 (FIG. 1). FIG. 3 shows the most extensive configuration of the tone generation algorithm where all the blocks are turned on. On the other hand, FIG. 4 shows a limited configuration of the tone generation algorithm in which the blocks 301, 302, 311, 341, 316 and 332 are turned on, while the blocks 303, 304, 312, 321, 322, 342, 326 and 333 are turned off. To simplify the explanation, each displayed block may be called also by the name of the corresponding functional element in the tone generation algorithm. For example, the functional block 301 may be called as a wave generator (WAVE GEN) 301. Additionally, each displayed block has a display area for indicating tone control parameters used in the corresponding functional element (e.g., numeral 352 in FIG. 3). The value of the parameters can be modified or updated through the operation of the editing operator 106 (FIG. 1).

The selected blocks turned on in the tone generation algorithm shown in FIG. 4 operate as described with reference to FIG. 2. In the algorithm shown in FIG. 4, the blocks 303 and 304 are turned off or nonselected, so that the corresponding noise generator (NOISE GEN) 303 outputs 'zero' in place of the noise output NOUT and the noise filter (NOISE-FILTER) 304 passes the input as it is. This 'zero' signal is fed to the mixer (IN-MIX) 305. The high-pass filter (IN-HPF1) 312 is also turned off so that the output from the distortion unit (DIST1) 311 passes the high-pass filter (IN-HPF1) 312 as it is, and goes into the adder (ADD1) 313 of the loop effector (LOOP1) 341. Further, all the blocks from the distorter (DIST2) 321 to the loop effector (LOOP2) 342 are turned off so that the input to the distorter (DIST2) 321 passes therethrough as it is, and is sent to the output mixer (OUT-MIX) 331 via the node 346. The effector (EFFECT) 333 is also turned off so that it passes therethrough its input signal distributed by the output filter (OUT-FILTER) 332.

In the instrument of the present embodiment, a complete set of microprograms is assembled according to the result of the algorithm edit operation, and the assembled microprogram set is sent to the sound source 108. Thus, the number of the computation steps involved in the algorithm is made small if the edited algorithm is simple, while the number of the steps becomes great if the edited algorithm is complicated. The edited algorithm is sent to the sound source 108. The microprogram RAM 112 can accommodate 512 steps of the microprograms, and the number of timbre items (hereinafter, "voices") capable of being synthesized simultaneously is determined depending upon how many set of microprograms for the edited algorithm can be stored in the MPRAM 112. An additional block 354 in FIGS. 3 and 4 shows how many steps of the microprograms is involved in the current algorithms and how many voices can be allocated and synthesized simultaneously. In the most extensive or maximum configuration in FIG. 3, the block 354 indicates "PROGRAM STEPS: 128" and "VOICES: 4", so that the user can recognize that the number of the steps of the microprograms corresponding to the configured algorithm is 128, and 4 sets of microprograms ($128\times4=512$) can be stored in the MPRAM 112 (meaning four voices can be synthesized simultaneously). On the other hand in FIG. 4, the block 354 indicates "PROGRAM STEPS: 96" and "VOICES: 5", so that the user can recognize that the number of the steps of the microprograms corresponding to the configured algorithm is 96, and 5 sets (for five voices) of microprograms. ($96\times5=480<512$) can be stored in the MPRAM 112.

Figure 5:
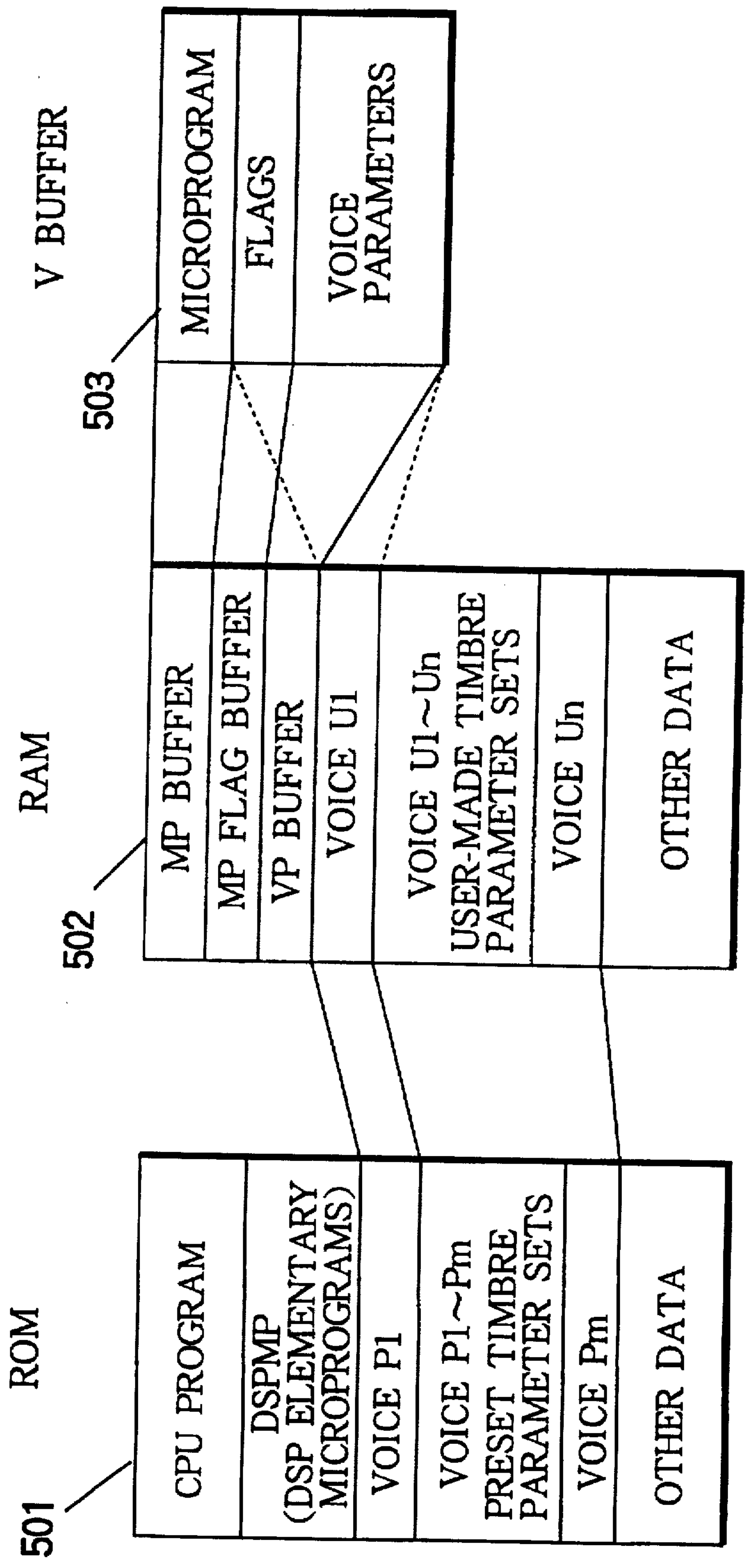
FIG. 5 illustrates a memory map of ROM and RAM provided in the embodiment.

FIG. 5 is a memory map of the ROM 102 and the RAM 103 shown in FIG. 1. Numerals 501 and 502 respectively denote the contents of the ROM 102 and the RAM 103. The ROM 102 is stored with CPU programs. The operation of CPU 101 will be described later referring to FIGS. 9A to 17. The elementary DSP microprograms (contents thereof will be described later referring to FIG. 7) are also stored as well as the preset timbre parameter sets (VOICE $P_1$ to $P_m$), and other various data. The RAM 103 is allocated with MP buffer, MP flag buffer, VP buffer, user-made timbre parameter sets (VOICE $U_1$ to $U_n$), and a storage area for other various data. The three of the MP buffer, MP flag buffer and VP buffer are called collectively as V buffer.

The editing operation of the tone generation algorithm is conducted after the user designates one of the preset timbre stored in the ROM 102 or one of the user-made timbres reserved in the RAM 103 as already explained referring to FIGS. 2 to 4. The user designation of the timbre is actually carried out by selecting one of the preset timbre parameter sets stored in the ROM 102 (VOICEs $P_1$ to $P_m$ in FIG. 5) or one of the user-made timbre parameter sets stored in the RAM 103 (VOICEs $U_1$ to $U_n$ in FIG. 5) in advance. The selected timbre parameter set is copied to the V buffer in the RAM 103. More specifically, the selected timbre parameter set includes MP flags which are copied to the MP flag buffer, and voice parameters which are copied into the VP buffer. Numeral 503 in FIG. 5 denotes the content of the V buffer provided in the RAM 103. The MP buffer stores a complete microprogram to be transferred to the MPRAM 112 of the sound source 108, the MP flag buffer stores the MP flags (described later referring to FIG. 6), and the VP buffer stores the voice parameters including parameters such as denoted by numeral 352 in FIG. 3 and parameters set up in response to the performance information from the playing operator 105.

FIG. 6 shows the list of the MP flags. Each MP flag corresponds to each functional block relevant to each functional element of the tone generation algorithm previously explained referring to FIGS. 2 to 4. The MP flags will be described hereunder. The flag value "0" means "off", and "1" means "on" hereafter.

(1) WAVE GEN FLG: a flag signifies turning on/off (enable/disable) of the wave generator (WAVE GEN) 301 in FIG. 3.

(2) NOISE GEN FLG: a flag signifies turning on/off (enable/disable) of the noise generator (NOISE GEN) 303 in FIG. 3.

(3) WAVE-FILTER FLG: a flag signifies turning on/off (enable/disable) of the wave filter (WAVE-FILTER) 302 in FIG. 3.

(4) NOISE-FILTER FLG: a flag signifies turning on/off (enable/disable) of the noise filter (NOISE-FILTER) 304 in FIG. 3.

(5) DIST1 FLG: a flag signifies turning on/off (enable/disable) of the distortion unit (DIST1) 311 in FIG. 3.

(6) IN-HPF1 FLG: a flag signifies turning on/off (enable/disable) of the high-pass filter (IN-HPF1) 312 in FIG. 3.

(7) LOOP1 FLG: a flag signifies turning on/off (enable/disable) of the loop effector (LOOP1) 341 in FIG. 3.

(8) APF1 FLG: a flag signifies turning on/off (enable/disable) of the all-pass filter (APF1) 316 in FIG. 3.

(9) DIST2 FLG: a flag signifies turning on/off (enable/disable) of the distortion unit (DIST2) 321 in FIG. 3.

(10) IN-HPF2 FLG: a flag signifies turning on/off (enable/disable) of the high-pass filter (IN-HPF2) 322 in FIG. 3.

(11) LOOP2 FLG: a flag signifies turning on/off (enable/disable) of the loop effector (LOOP2) 342 in FIG. 3.

(12) APF2 FLG: a flag signifies turning on/off (enable/disable) of the all-pass filter (APF2) 326 in FIG. 3.

(13) OUT-FILTER FLG: a flag signifies turning on/off (enable/disable) of the output filter (OUT-FILTER) 332 in FIG. 3.

(14) EFFECT FLG: a flag signifies turning on/off (enable/disable) of the effector (EFFECT) 333 in FIG. 3.

The preset timbre parameters P1 to $P_m$ stored in the ROM 102, as well as the user-made timbre parameters $U_1$ to $U_n$ stored in the RAM 1032 are composed of the MP flags and the voice parameters corresponding to the designated timbre. Upon the user's selection of a desired timbre, the MP flags contained in the relevant timbre parameter set are copied to the MP flag buffer, and the voice parameters contained in the same parameter set are copied to the VP buffer. Then, the complete microprogram to achieve the relevant tone generation algorithm is assembled in the MP buffer by selectively combining the elementary or basic microprograms stored in the ROM 102 with each other according to the MP flags.

FIG. 7 shows the basic DSP microprograms stored in a secondary memory composed of the ROM 102. FIG. 8 shows the relationship between basic functions performed by the basic microprograms and the resulting data input/output. The basic microprograms correspond to the functional blocks relevant to the functional elements of the tone generation algorithm previously explained with reference to FIGS. 2 to 4. Since each block is capable of being turned on/off, there are provided two basic microprograms for each block, one of which is an effective microprogram used in the selected state of the block, and the other of which is an ineffective microprogram used in the nonselected state of the same block. The basic microprograms will be described hereunder referring to FIGS. 7 and 8.

(1) WAVE GEN: An effective basic microprogram executing the waveform generation process of the wave generator (WAVE GEN) 201 in FIG. 2. This is installed in case that the MP flag WAVE GEN FLG is turned on. This software block or module has no input, and the output is WAVEOUT.

(2) WAVE GEN OFF: An ineffective basic microprogram installed in case that the MP flag WAVE GEN FLG is turned off in place of the effective microprogram WAVE GEN described above. This microprogram executes "CLR WAVEOUT" process, that is clearing the output WAVEOUT to zero (means generating "zero" output always).

(3) NOISE GEN: A basic microprogram executing the noise generation process of the noise generator (NOISE GEN) 203 in FIG. 2. This is installed in case that the MP flag NOISE GEN FLG is turned on. It has no input, and the output is NOUT.

(4) NOISE GEN OFF: A basic microprogram installed in case that the MP flag NOISE GEN FLG is turned off and used in place of the microprogram NOISE GEN described above. This executes "CLR NOUT" process, that is clearing the output NOUT to zero.

(5) WAVE-FILTER: A basic microprogram executing the filtering process of the wave filter (WAVE-FILTER) 202 in FIG. 2. This is installed in case that the MP flag WAVE-FILTER FLG is turned on. The input is WAVEOUT, and the output is WFOUT. If the wave generator provided in the preceding stage is turned off, "zero" data is input.

(6) WAVE-FILTER OFF: A basic microprogram installed in case that the MP flag WAVE-FILTER FLG is turned off and used in place of the microprogram WAVE-FILTER described above. This executes "MOVE WOUT WFOUT" process, that is transferring the content of WOUT to WFOUT (passing the input to the output as it is). The description of the other basic microprograms is abbreviated here, since they are illustrated in FIGS. 7 and 8. For summary, the effective basic microprogram is installed in case that the corresponding MP flag is turned on to execute corresponding functional element of the tone generation algorithm, while the ineffective basic microprogram is installed in case that the corresponding MP flag is turned off to output "zero", or to pass through its input to output. It should be noted that some blocks indispensable for the tone generation algorithm do not have an ineffective basic or elementary microprogram since the indispensable blocks are never turned off. For example, the mixing block (IN-MIX) 205 shown in FIG. 2 is indispensable so that the corresponding effective basic microprogram is registered as listed in FIG. 7; however, an ineffective basic microprogram IN-MIX OFF is not prestored.

The operation in the instrument of the embodiment will now be described hereunder. FIG. 9A is a flowchart showing the main routine executed by the CPU 101. Predetermined initialization is carried out in step 901. Then, various operation events are detected in step 902. Timbre setup procedure is carried out in step 903. In the timbre setup procedure, specified timbre parameters are copied to V buffer and the relevant basic microprograms are installed upon detecting the timbre selecting operation event. The timbre setup procedure will be described later referring to FIGS. 10 to 13. In step 904, operating mode administration is executed. In the operating mode administration, various mode switching operation is detected, and the operating mode is switched in response to the mode switching input. In step 905, it is tested whether the current mode is the timbre edit mode or not. In case that the timbre edit mode is set, the timbre edit processing is carried out in step 906 before advancing forward to step 907. If the timbre edit mode is not set, the procedure jumps to step 907. In the timbre edit processing, operation events to turn on/off the functional blocks are detected in a displayed algorithm edit screen. MP flags are set or reset corresponding to the editing operation as described referring to FIGS. 2 to 4. The timbre edit processing will be described later in detail referring to FIGS. 14 to 17. In step 907, tone generator control procedure is executed. In the tone generation control procedure, the contents of the V buffer such as the voice parameters are transferred to the sound source 108, and note-on command is sent to the sound source 108. Miscellaneous processing is carried out in step 908, and the procedure returns to step 902.

Figure 9B:
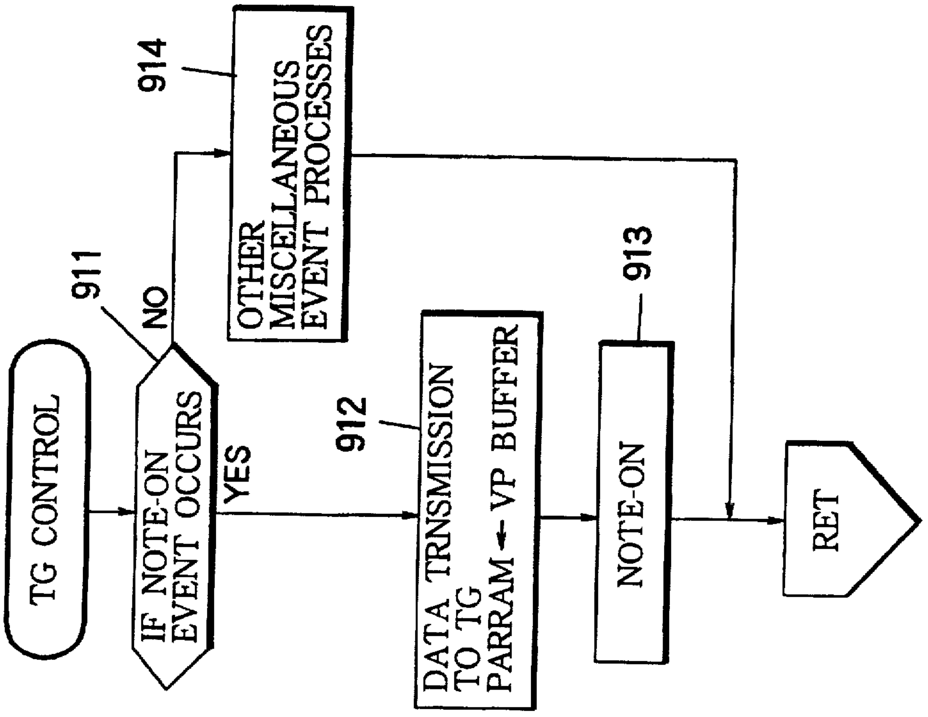
FIGS. 9A and 9B are a flowchart showing a main routine of sound source management procedures in the embodiment.
Figure 9A:
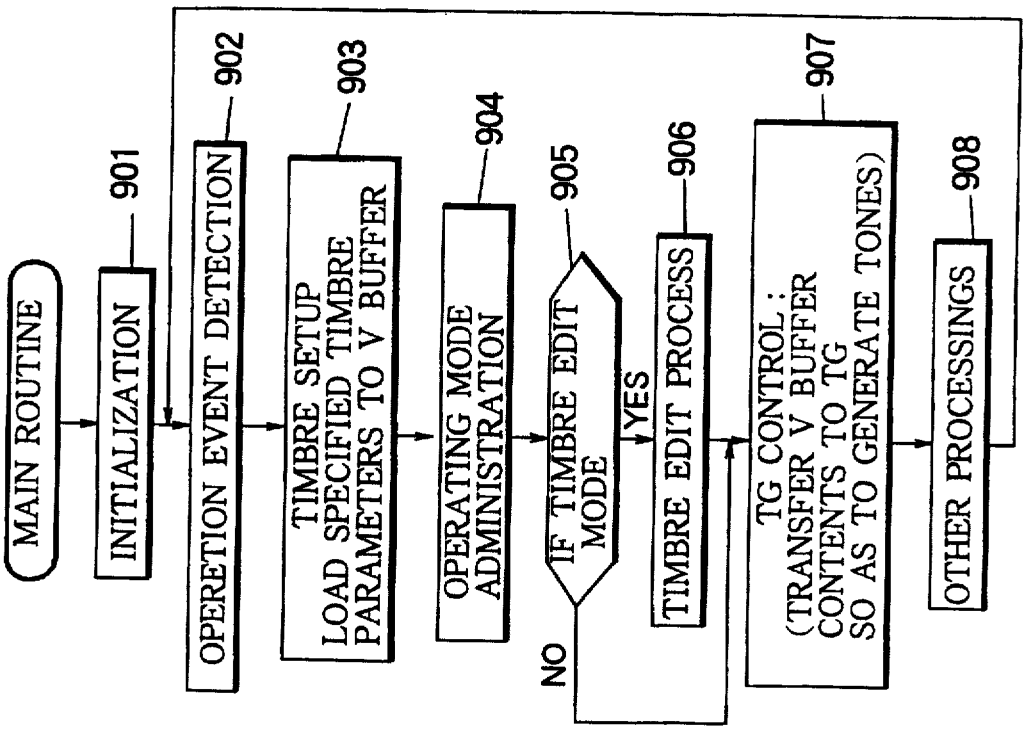
Figure 10:
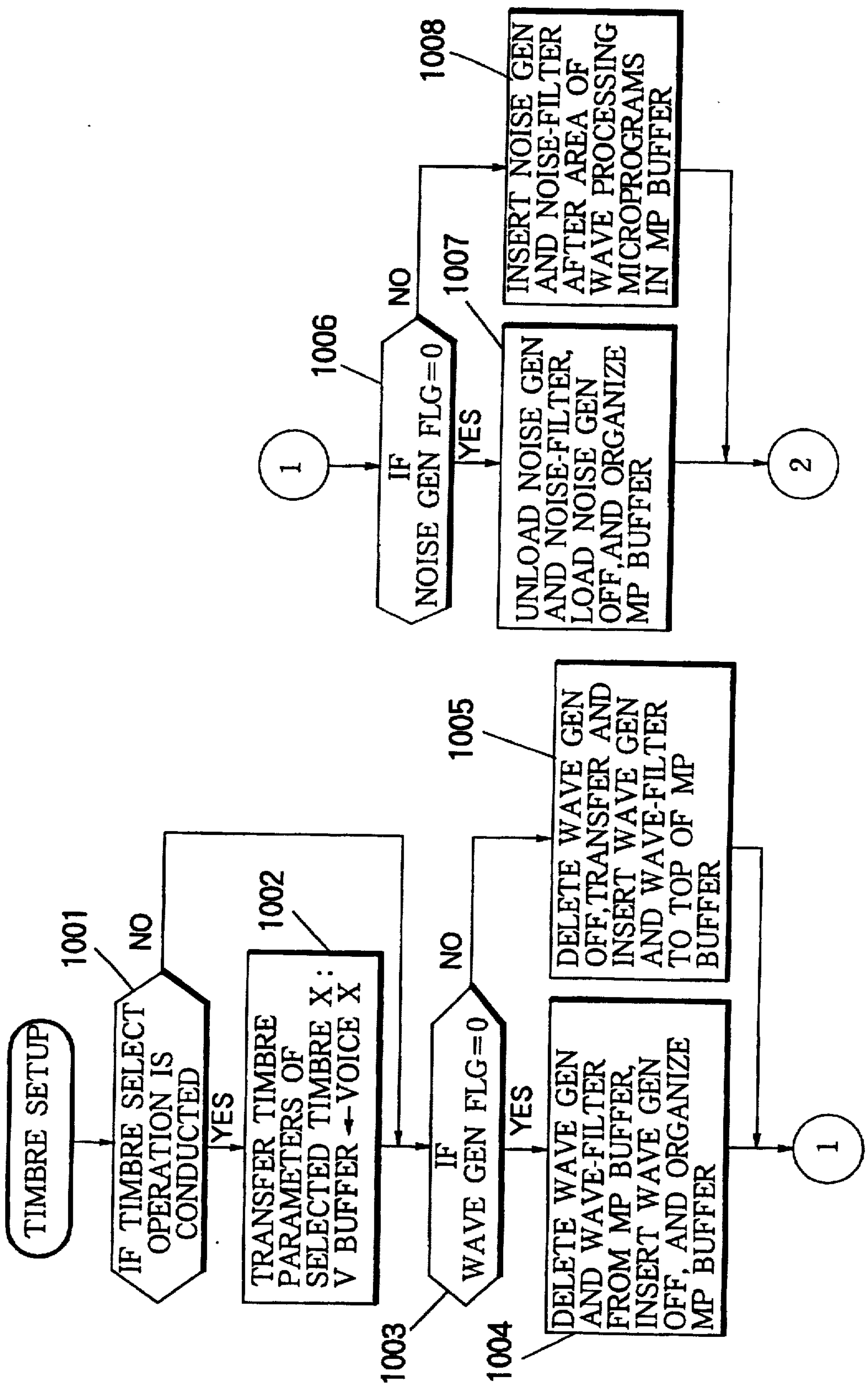
FIG. 10 is a flowchart showing timbre setup procedures in detail.
Figure 11:
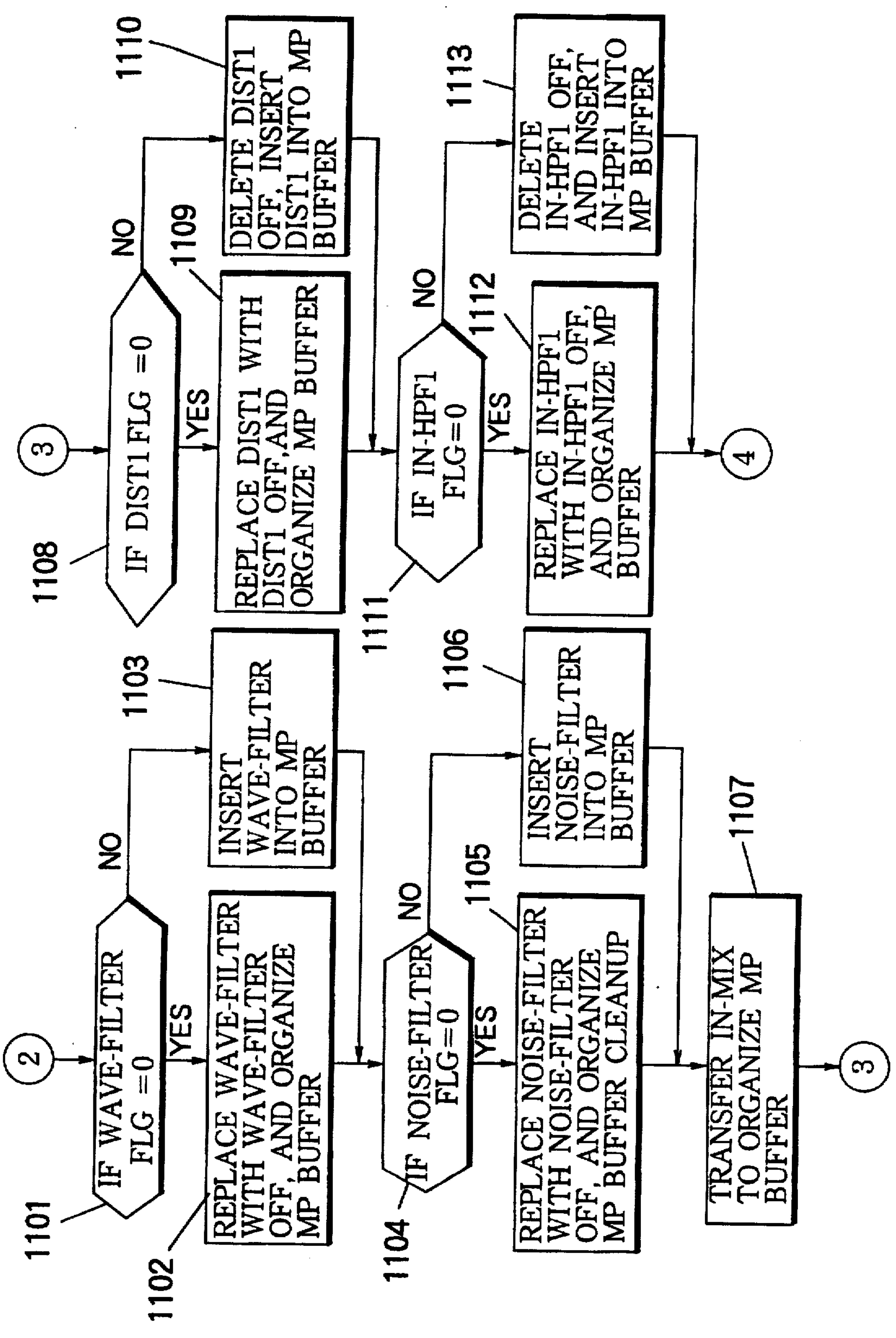
FIG. 11 is a flowchart showing the timbre setup procedures in detail.

FIG. 9B illustrates details of the tone generator control procedure executed in step 907 of FIG. 9A. In step 911, it is tested whether there is any event in the operation of the playing operator 105 to command note-on or not. If an event commanding note-on is detected, the data reserved in the V buffer is sent to the sound source 108 in step 912. The data sent from the V buffer is stored in the parameter RAM 113 of the sound source 108. The complete microprogram has already been loaded from the MP buffer of the V buffer to the MPRAM 112 by the timbre setup procedure (more exactly, at step 1310 in FIG. 13). In step 913, note-on procedure is carried out to command the sound source 108 to invoke musical tone synthesizing. Thus, the sound source 108 executes the tone synthesizing procedure according to the voice parameters stored in the V buffer. If no note-on event is not detected in step 911, other miscellaneous events are processed in step 914, and then returning to the main routine.

FIGS. 10 to 13 show the timbre setup procedure of step 903 in detail. In step 1001, it is tested whether the manual operator 106 is manipulated to designate a timbre or not. If the timbre selection operation is conducted, the timbre parameters of the selected timbre X are transferred to the V buffer. The timbre parameters to be transferred may be ones that are selected out of the preset timbre parameters stored in the ROM 102, or the user-made timbre parameters stored in the RAM 103 according to the user operation. After step 1002, or in case that there is no timbre selecting operation, the procedure advances forward to step 1003.

In step 1003, it is tested if flag WAVE GEN FLG stored in the V buffer is "0". In case that WAVE GEN FLG is "0", the routine advances forward to step 1004 so that the basic microprograms WAVE GEN and WAVE-FILTER are deleted if they are reserved in the MP buffer. Then, the aubstitutive basic microprogram WAVE GEN OFF is loaded into the MP buffer to organize the microprograms in the MP buffer. On the other hand, if WAVE GEN FLG is not "0", the basic microprogram WAVE GEN OFF is cleared in the MP buffer in step 1005 and the basic microprograms WAVE GEN and WAVE-FILTER are loaded to organize or arrange the microprograms in the MP buffer. The microprogram replacement is effected in the steps 1004 and 1005 only if the timbre selecting operation is called, or if the relevant MP flags are switched according to the turning on/off operation of the corresponding blocks on the algorithm edit display.

In the steps 1006 to 1308, the relevant basic microprograms are loaded into the MP buffer in response to the on/off state of the respective MP flags. These microprogram loading procedures are similar to the process in steps 1003 to 1005, except that the flags referred to and the names of microprograms are different. In steps 1006 to 1008, basic microprogram NOISE GEN OFF is loaded into the MP buffer if the flag NOISE GEN FLG is turned off, while NOISE GEN is loaded if NOISE GEN FLG is turned on. In steps 1101 to 1103, microprogram WAVE-FILTER OFF is loaded into the MP buffer if WAVE-FILTER FLG is turned off. Otherwise, WAVE-FILTER is loaded if WAVE-FILTER FLG is turned on. In steps 1104 to 1106, microprogram NOISE-FILTER OFF is loaded into the MP buffer if NOISE-FILTER FLG is turned off. Otherwise, NOISE-FILTER is loaded if NOISE-FILTER FLG is turned on.

In step 1107, the basic microprogram IN-MIX required for the tone generation algorithm is loaded into the MP buffer, and the MP buffer is organized. In steps 1108 to 1110, microprogram DIST1 OFF is loaded into the MP buffer if DIST1 FLG is turned off, or DIST1 is loaded if DIST1 FLG is turned on. In steps 1111 to 1113, microprogram IN-HFF1 OFF is loaded into the MP buffer if IN-HPF1 FLG is turned off, or IN-HPF1 is loaded if IN-HPF1 FLG is turned on.

Figure 12:
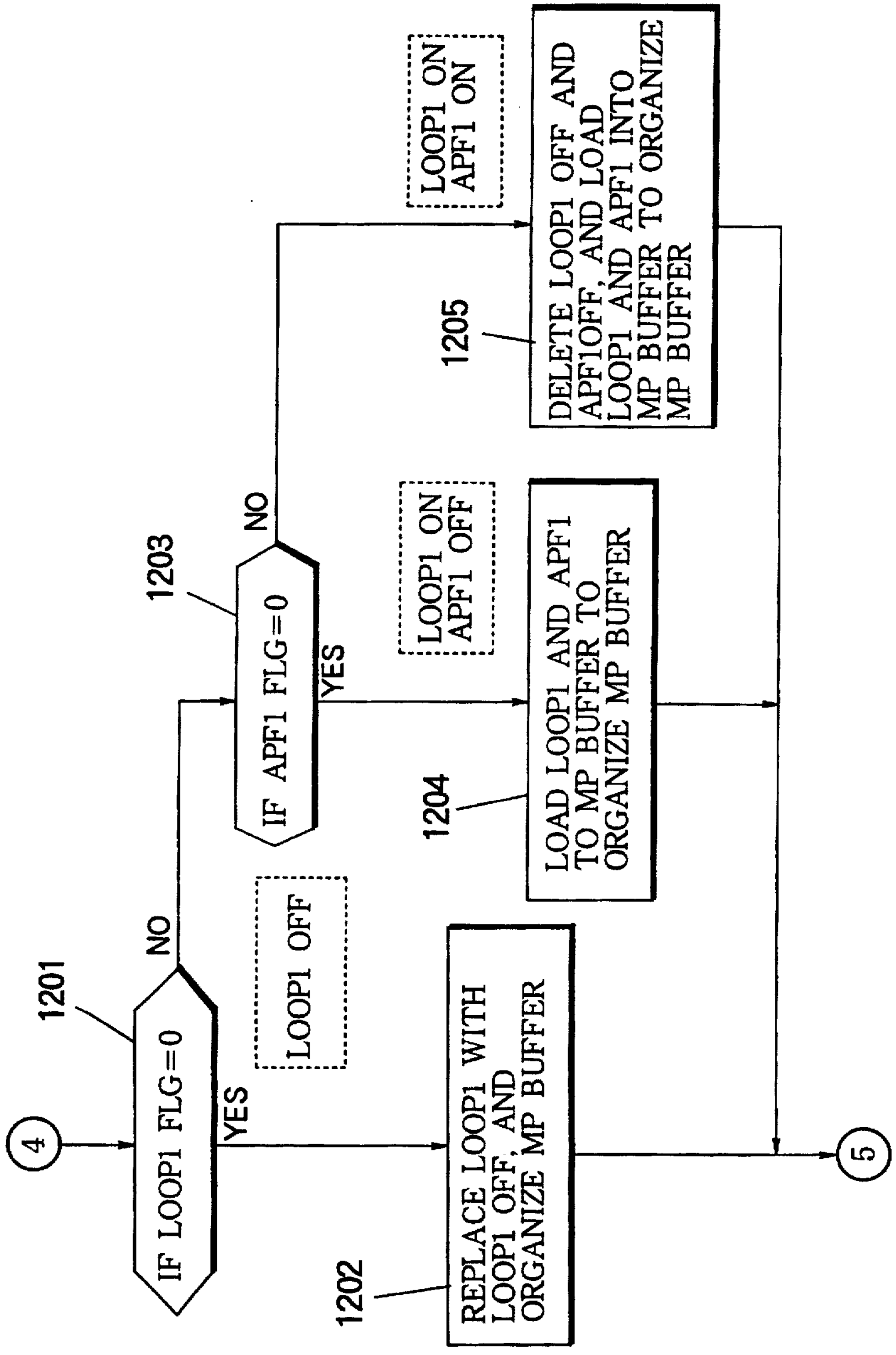
FIG. 12 is a flowchart showing the timbre setup procedures in detail.

In steps 1201 to 1205 of FIG. 12, basic microprograms for the loop effector and the all-pass filter included in the loop are treated. Microprogram LOOP1 OFF is loaded into the MP buffer if LOOP1 FLG is turned off, or microprogram LOOP1 is loaded if LOOP1 FLG is turned on. Further, microprograms LOOP1 and APF1 OFF are loaded into the MP buffer if LOOP1 FLG is on and APF1 FLG is off, or microprograms LOOP1 and APF1 are loaded into the MP buffer if LOOP1 FLG and APF1 FLG are turned on.

Figure 13:
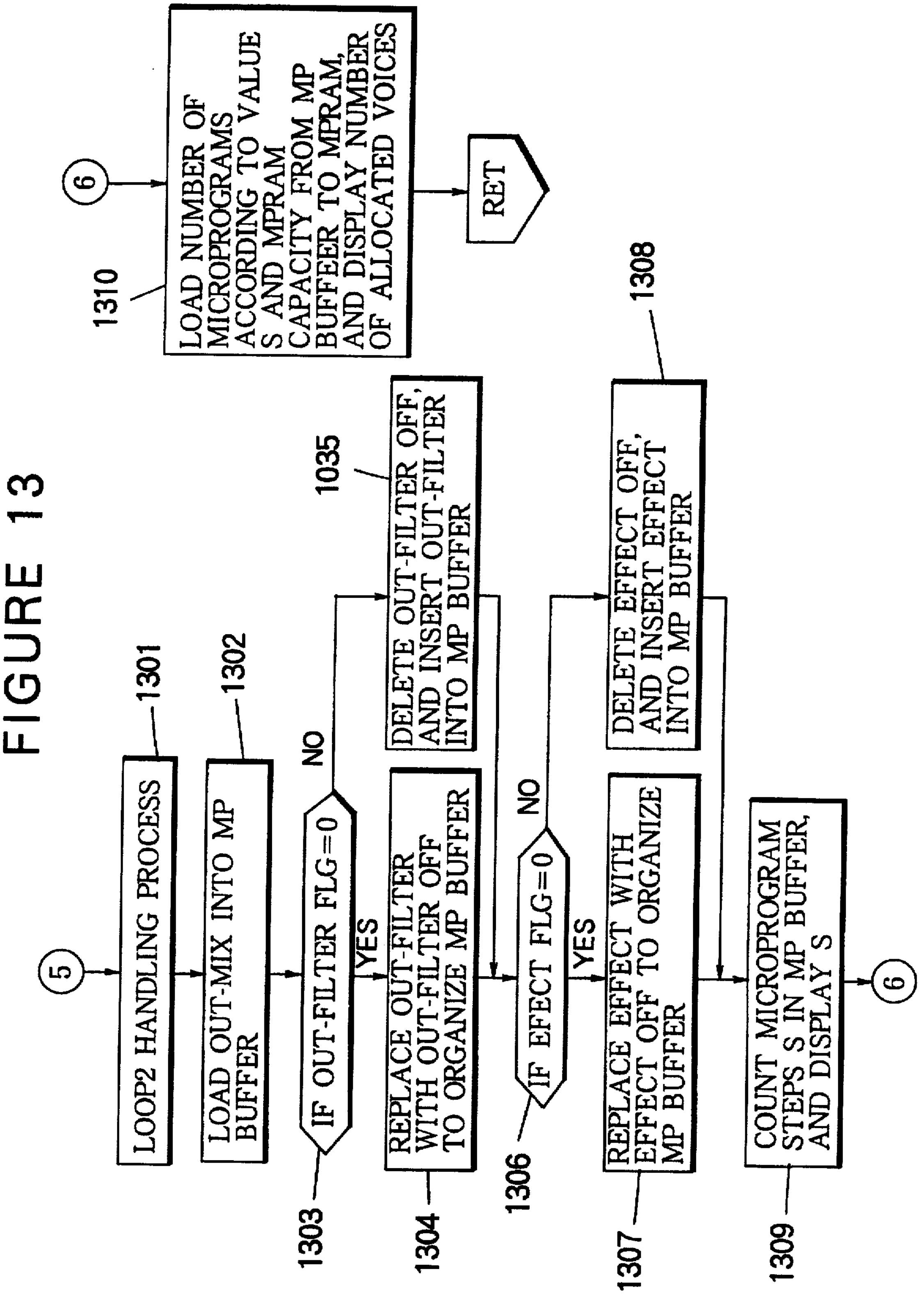
FIG. 13 is a flowchart showing the timbre setup procedures in detail.

Step 1301 in FIG. 13 is similar to the steps 1201 to 1205 in FIG. 12. The other loop effector LOOP2 is handled or treated in step 1301. In step 1302, the basic microprogram OUT-MIX indispensable for the tone generation algorithm is transferred to the MP buffer. In steps 1303 to 1305, microprogram OUT-FILTER OFF is loaded into the MP buffer if OUT-FILTER FLG is turned off, or microprogram OUT-FILTER is loaded if OUT-FILTER FLG is turned on. In steps 1306 to 1308, microprogram EFFECT OFF is loaded into the MP buffer if EFFECT FLG is turned off, or microprogram EFFECT is loaded if EFFECT FLG is turned on.

In step 1309, the number of the computation steps of the microprograms loaded in the MP buffer is counted, and the counted value is set in a variable S and displayed. The counted value corresponds to "PROGRAM STEPS" indicated in the block 354 of FIGS. 3 and 4. Further in step 1310, it is estimated how many voices are available based on the value of the variable S and the capacity of the microprogram RAM 112 in the sound source 108. The microprograms prepared for the estimated number of the voices are transferred from the MP buffer to the microprogram RAM 112. The allocated number of the voices is displayed. The display corresponds to "VOICES" indicated in the block 354 of FIGS. 3 and 4.

The details of the timbre edit processing executed in step 906 of FIG. 9A will be described hereunder referring to FIGS. 14 to 17. First of all in the timbre editing, edit item administration is conducted in step 1401. The administration manages user selection of items to be edited. Upon selecting an item of the tone generation algorithm edit, the relevant editing mode is called. In step 1402, it is tested whether the algorithm editing mode is called or not. If the algorithm editing mode is called, the procedure advances forward to step 1404. Otherwise, if the editing mode is not called, the routine branches to step 1403 to execute other miscellaneous processings, and then the procedure returns. The miscellaneous processings in step 1403 include setup or edit of parameters of each block shown in FIGS. 3 and 4, edit of voice names, load of timbre parameters to V buffer with timbre selection, save of the timbre parameters on the V buffer back to the RAM 103 or disk drive 104, and so on. When the algorithm editing mode is enabled in step 1402, the algorithm editing window is displayed on the screen of the display 107 in step 1404. The on/off status of each block of the algorithm diagram is displayed according to the timbre parameters currently loaded in the V buffer, namely according to the status of the MP flags.

Figure 14:
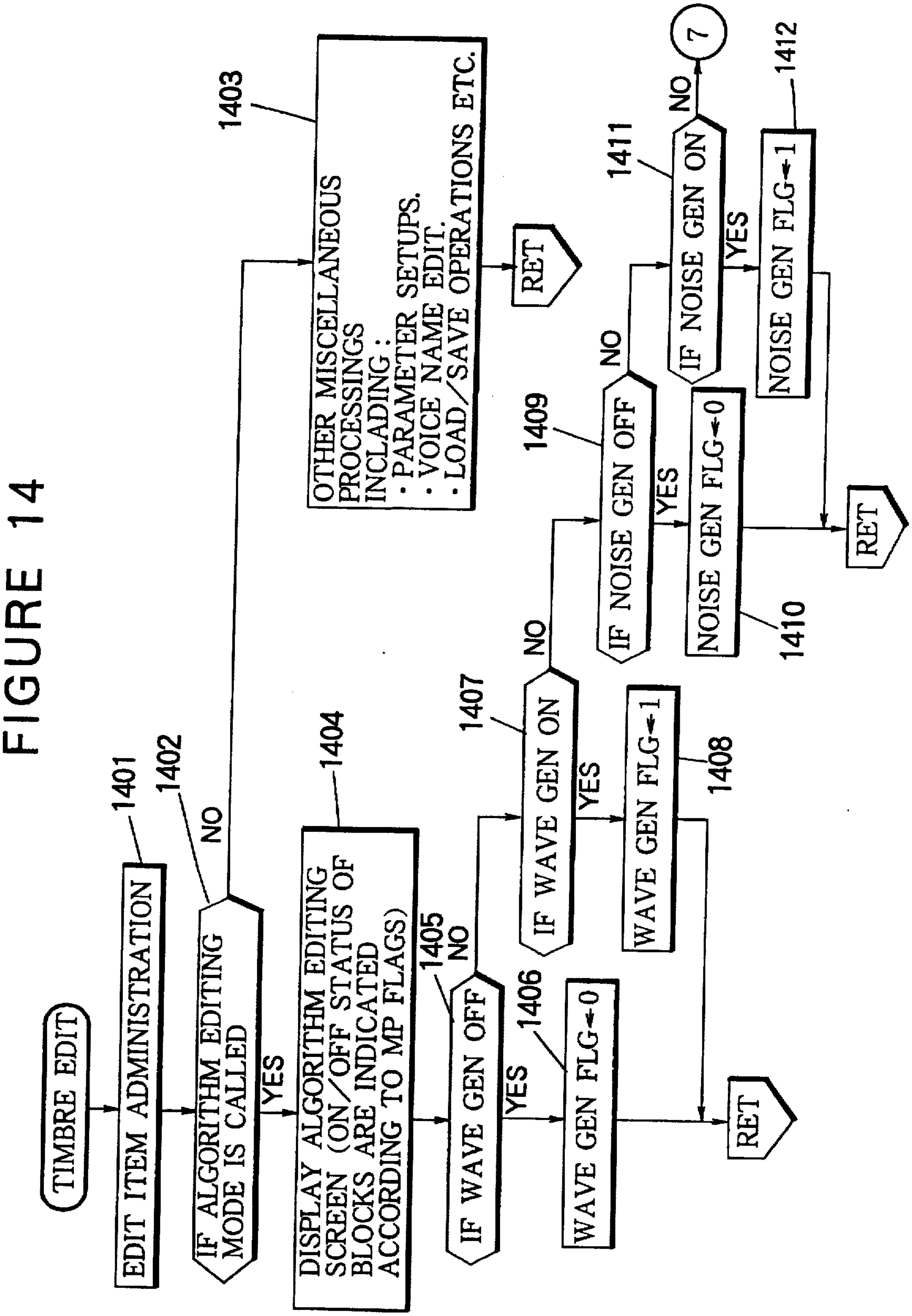
FIG. 14 is a flowchart showing the timbre setup procedures in detail.
Figure 15:
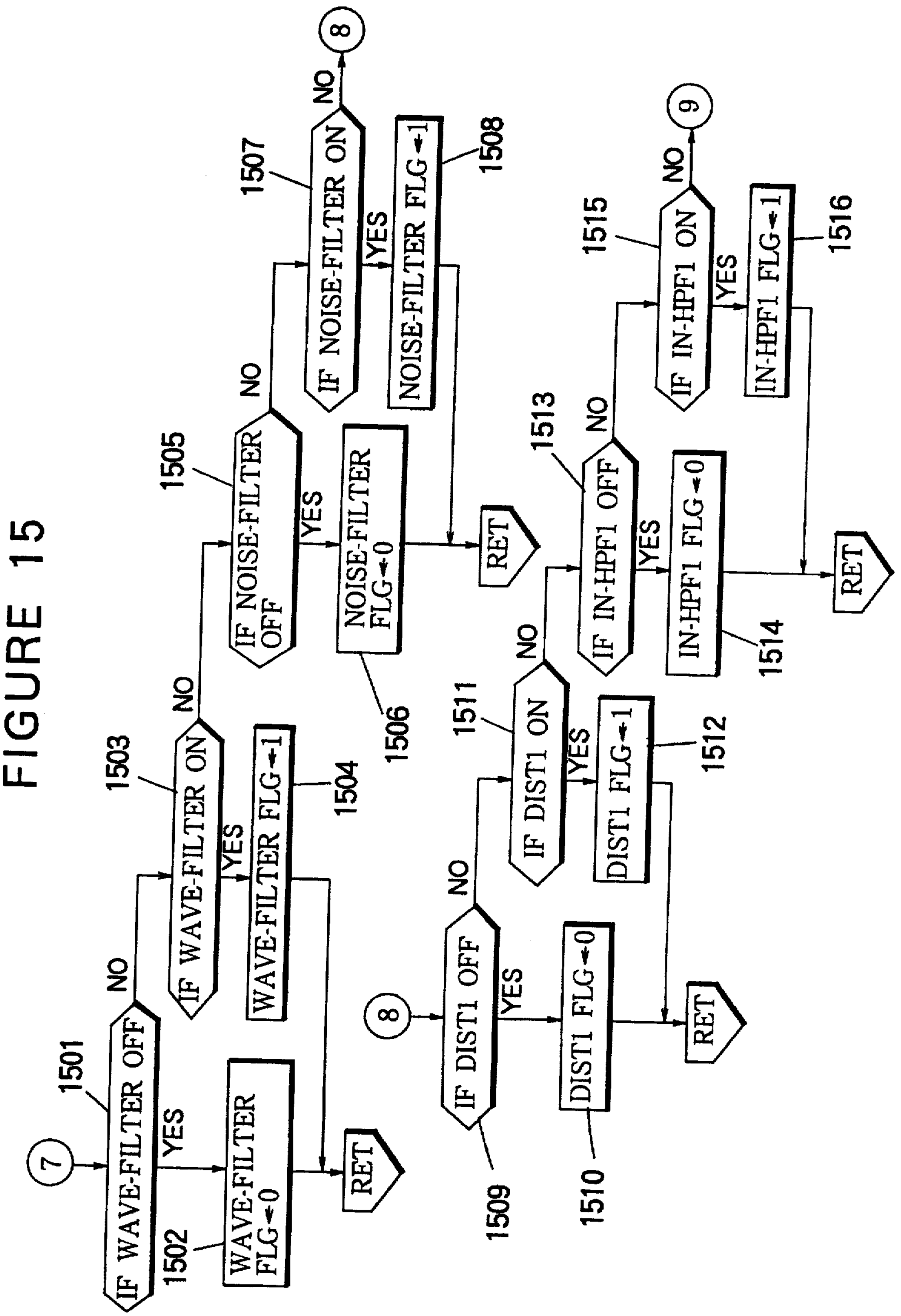
FIG. 15 is a flowchart showing the timbre setup procedures in detail.
Figure 17:
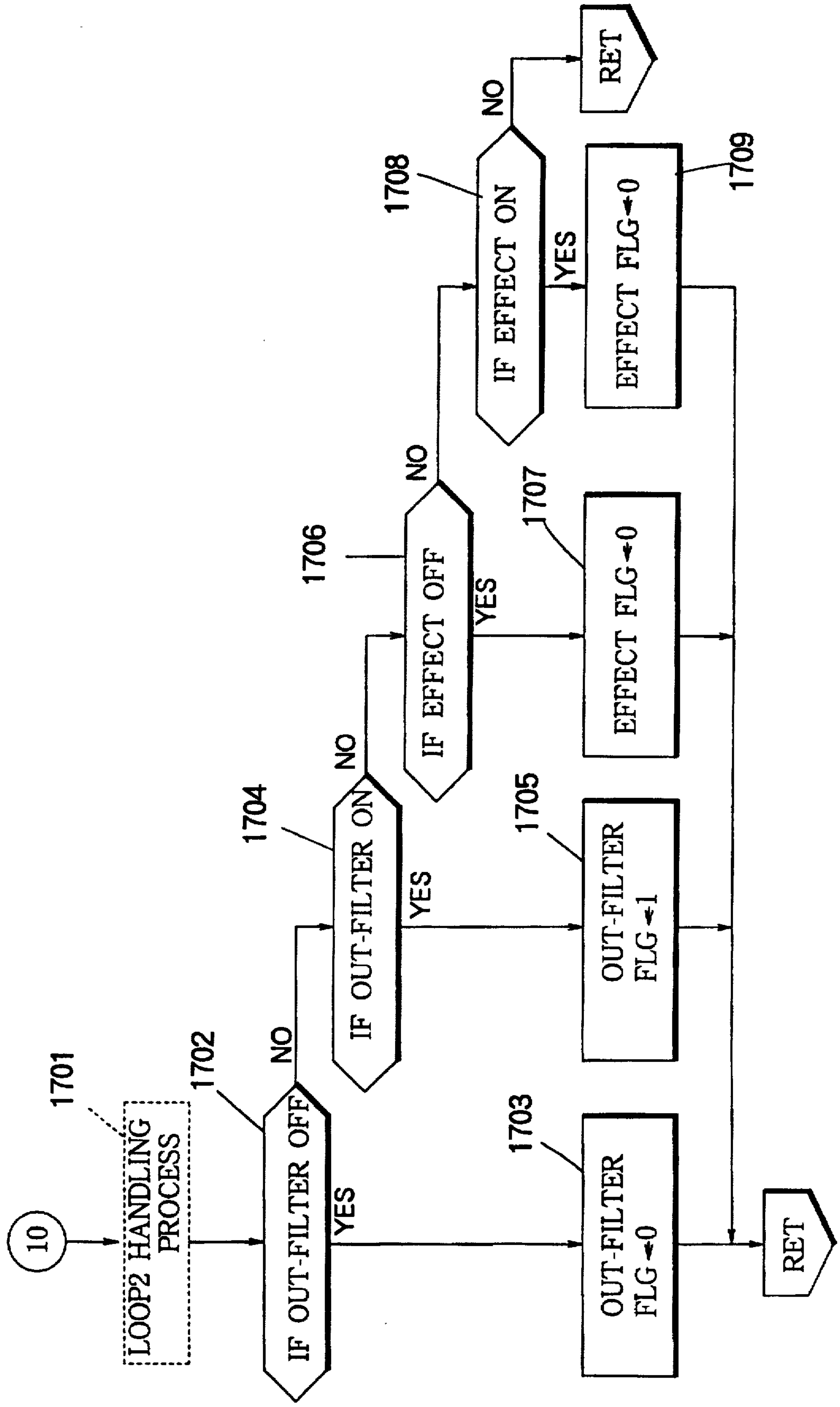
FIG. 17 is a flowchart showing the timbre setup procedures in detail.

In step 1405 of FIG. 14 to step 1709 of FIG. 17, it is tested if there is select or nonselect event for a certain algorithm block. Then, the relevant MP flag is turned on or off. For examples occurrence of nonselect event for the wave generator (WAVE GEN) is tested. If there is the nonselect event, the flag WAVE GEN FLG is turned off and is set to "0" in step 1406 before returning. In case that there is no nonselect event for WAVE GEN, select event for WAVE GEN is tested in step 1407. If there is the select event, WAVE GEN FLG is turned on to "1" in step 1408 before returning. The other MP flags are turned on/off by similar procedures upon detecting relevant select/nonselect events as shown in FIG. 15.

Figure 16:
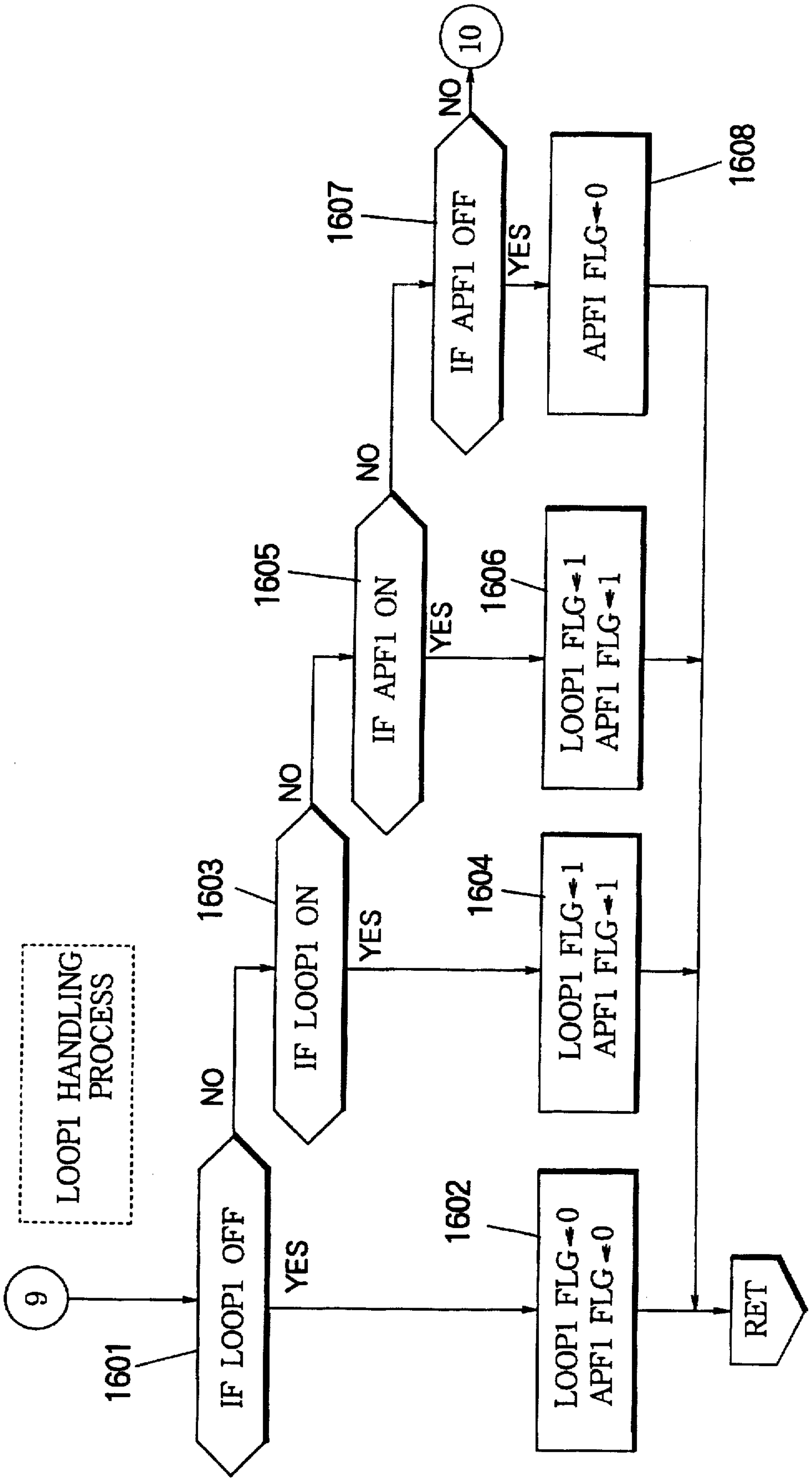
FIG. 16 is a flowchart showing the timbre setup procedures in detail.

In steps 1601 to 1608 of FIG. 16, which are procedures to handle the loop effector LOOP1, MP flags are set up as described below. Specifically, the all-pass filter APF1 is provided in the loop LOOP1. If there is nonselect event of the loop effector LOOP1 in step 1601, both of the flags LOOP1 FLG and APF1 FLG are turned off in step 1062. Thus, the block APF1 is disabled as well if LOOP1 is disabled. If there is select event of the loop effector LOOP1 in step 1603, both of the flags LOOP1 FLG and APF1 FLG are turned on in step 1604, so that the block APF1 is enabled as well if LOOP1 is enabled. Upon detecting select event of all-pass filter APF1 in step 1605, both of the flags LOOP1 FLG and APF1 FLG are turned on in step 1606, so that the block LOOP1 is enabled as well if APF1 is enabled. Upon detecting nonselect event of all-pass filter APF1 in step 1607, the flag LOOP1 FLG is turned off in step 1608. A routine of FIG. 17 is executed for handling LOOP2 in similar manner to steps 1601 to 1608 of FIG. 16.

As described above, according to the invention, the display 107 is provided for displaying the block diagram shown in FIG. 3 containing various functional blocks which represent corresponding elementary functions selectively usable for synthesis of a desired musical tone. The ROM 102 provisionally stores a pair of an effective elementary program and an ineffective elementary program for each functional block such that the effective elementary program is designed to effectuate the corresponding elementary function while the ineffective elementary program is designed to ineffectuate the corresponding elementary function. The editing operator 106 is used for graphically treating the displayed block diagram so that each functional block is selected if the corresponding elementary function is necessary for the synthesis of the desired musical tone and is otherwise nonselected if the corresponding elementary function is unnecessary for the synthesis of the desired musical tone to thereby edit an algorithm which defines an arithmetic procedure for the synthesis of the desired musical tone. The CPU 101 operates as assembler means for retrieving from the ROM 102 an effective elementary program for each selected functional block so as to enable the corresponding elementary function and for retrieving an ineffective elementary program for each nonselected functional block so as to disable the corresponding elementary function to thereby assemble the retrieved ones of the effective and ineffective elementary programs into a complete program according to the edited algorithm. The RAM 103 is provided for storing the complete program. The sound source 108 is connected to the RAM 103 for executing the edited arithmetic procedure according to the stored complete program to thereby generate the desired musical tone.

In the embodiment described above, the user can create the complete microprogram according to the desired algorithm. The complete microprogram does not include unnecessary steps so that the capacity of the microprogram RAM 112 in DSP can be utilized efficiently. If the complete microprogram is created according to a rather simple algorithm, the number of steps can be decreased so that the user can allocate many voices, or can execute other processings by limited resources. The numbers or types of the delay loop and any other algorithm blocks are not limited to those of the embodiment described above. In the embodiment described above, the maximum or full configuration of the algorithm is displayed in a block diagram format in order to enable the user's block select/nonselect operation. However, it is possible to configure a user interface wherein the user can build up a desired tone generation circuit or algorithm by connecting desired blocks on a display window. Further, in the embodiment above, the sound source is comprised of delay loop type. However, the tone generator of the sound source can be other types such as FM synthesizer, formant synthesizer and so on. An envelope generator (EG), or a modulator (LFO) modules can be included in the functional elements, even though they are abbreviated in the embodiment above. It is possible to arrange or adjust the number of the EG or LFO corresponding to the number of the steps required to generate tones. In the embodiment described above, the MP flags are immediately modified upon the user's block selection/nonselection. The appropriate basic microprograms are transferred to the MP buffer with real-time basis. However, the system can be configured to operate in the maximum or full algorithm during the editing mode. Only required basic microprograms are compiled at the end of the editing mode. In the algorithm editing, the user may want to limit the step size of the microprograms at a certain value in order to allocate required number of voices. Considering this needs, it is possible to provide a maximum step size limit, in order to make warning if the user selects some blocks which make the step size over the limit, or in order to inhibit selection of such a block. The DSP employed in the present invention can be replaced not only with processors specialized for certain signal processing, but also with any other processors such as generic microprocessors.

Next, a second embodiment of the present invention is described in conjunction with FIGS. 18–30B. In the previous embodiment, the block diagram is displayed as a framework to present the general algorithm of the tone generation in the full extent. Then, the block diagram is graphically treated to select or nonselect each of the functional blocks contained in the block diagram. In this second embodiment, the framework itself is formed by graphic editing to provide various types of the basic block diagrams. Namely, desired functional blocks are preselected from a parts list of various elementary functions usable for the tone generation. Then, the preselected functional blocks are connected to each other to define input/output relation among the preselected functional blocks to thereby construct one type of the block diagram.

Figure 18:
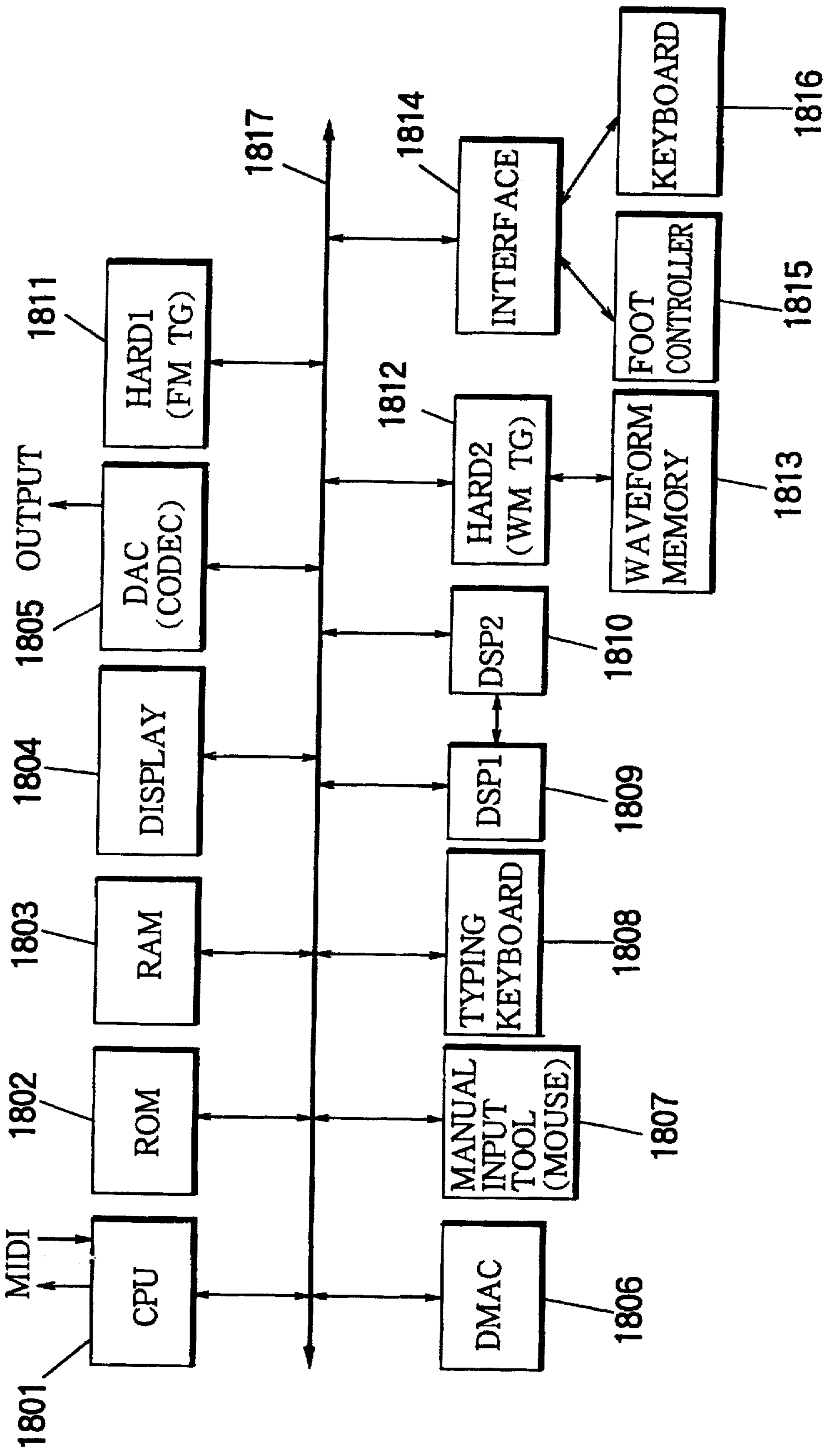
FIG. 18 is a schematic block diagram showing a second embodiment of the electronic musical instrument according to the invention.

FIG. 18 shows an overall system configuration of the second embodiment of the inventive electronic musical instrument. This instrument contains CPU 1801, ROM 1802, RAM 1803, display 1804, DAC 1805, DMAC 1806, manual input tool 1807 such as mouse tool, typing keyboard 1808, first digital signal processor (DSP1) 1809, second digital signal processor (DSP2) 1810, first hardware device (HARD1) 1811, second hardware device (HARD2) 1812, waveform memory 1813, interface 1814, foot controller 1815, keyboard 1816 and bus line 1817.

Figure 19:
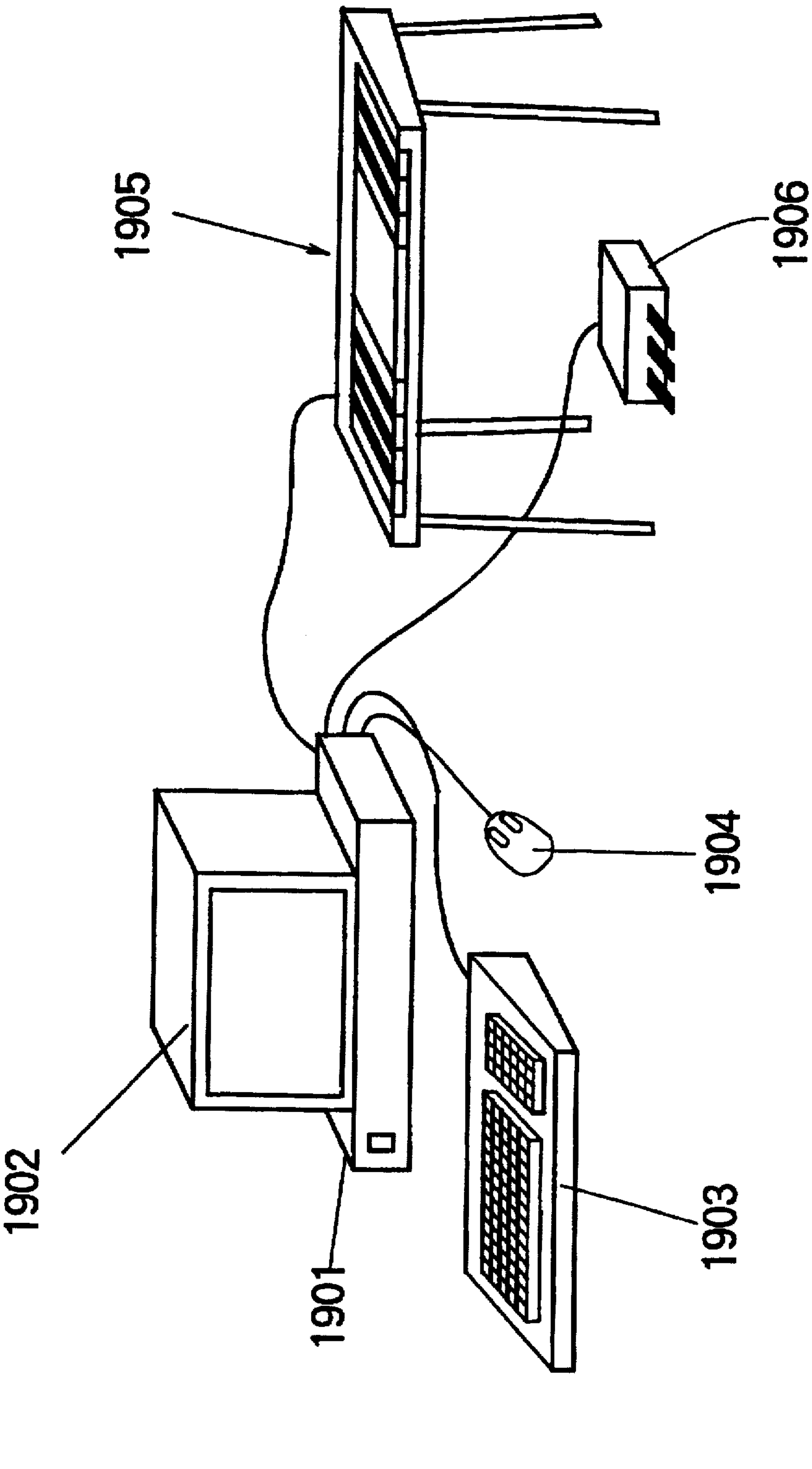
FIG. 19 is an illustrative diagram showing appearance of the second embodiment.

FIG. 19 shows an appearance of the electronic musical instrument. In this figure, a display 1902 corresponds to the display 1804 of FIG. 18. In similar manner, a mouse tool 1904 corresponds to the manual input tool 1807, a keyboard 1903 corresponds to the typing keyboard 1808, a keyboard 1905 corresponds to the keyboard 1816, and a foot controller 1906 corresponds to the foot controller 1815. The remaining parts shown in FIG. 18 are contained within a main console 1901 shown in FIG. 19. Referring back to FIG. 18, the set of CPU 1801, ROM 1802, RAM 1803 and display 1804 corresponds to the set of the CPU 101, ROM 102, RAM 103 and display 107 contained in the first embodiment shown in FIG. 1 to perform the same function. The group of the interface 1814, foot controller 1815 and keyboard 1816 corresponds to the playing operator 105 of FIG. 1 to perform the same function. The set of manual input tool 1807 and typing keyboard 1808 corresponds to the setting operator 106 of FIG. 1 to perform the same function. In this second embodiment, the manual input tool 1807 is composed of the mouse tool which can be operated by clicking, dragging and so on. The clicking is such that a mouse cursor or pointer is pointed to a target character or figure displayed on a screen and then a mouse button is depressed and released. The dragging is such that the mouse cursor is pointed to a target character or figure, then the mouse button is depressed while moving the mouse tool, and thereafter the mouse button is released. The manual input tool 1807 may be composed of other pointing tools than the mouse tool.

The first embodiment shown in FIG. 1 utilizes a single of the DSP 108 as the sound source, whereas the second embodiment utilizes a pair of DSPs 1809 and 1810 as the sound sources. Each of the DSPs 1809 and 1810 is equivalent to the DSP 108 of FIG. 1, and contains a computation RAM, a microprogram RAM, a parameter RAM and a computation processor. Each of the DSPs 1809 and 1810 can work as a sound source of the waveform memory readout mode or the frequency modulation (FM) mode. In the waveform memory readout mode, the wave data may be stored in the ROM 1802 or RAM 1803. Further, these DSPs 1809 and 1810 can perform various processings of musical tone signals such as filtering process, loop process of delay and filter, effect imparting process and mixing process.

The hardware devices 1811 and 1892 are installed in the system to perform various processings related to the synthesis of the musical tone. The hardware device 1811 works as a FM sound source, while the other hardware device 1812 works as a sound source of the waveform memory readout type. The waveform memory 1813 stores the wave data for use in the hardware device 1812. Further, the CPU 1801 of the electronic musical instrument can function as a sound source of the waveform memory readout type such that the wave data stored in the ROM 1802 is read out by the CPU 1801 to generate a musical tone. Moreover, the CPU 1801 performs digital filtering process and envelope imparting process of the generated musical tone.

As described above, the musical tone generation can be carried out by one or more of CPU 1801, first DSP 1809, second DSP 1810, first hardware device 1811 and second hardware device 1812. These units utilize a buffer area of the RAM 1803 to treat data of intermediate and final musical tone signals. The buffer area will be described later in detail with reference to FIG. 20. The DAC 1805 converts the digital musical tone signal produced by the various methods into an analog signal, which is fed to an output sound system (not shown in the figure). The DAC 1805 may be composed of LSI called CODEC. The DMAC 1806 is a controller to control data transfer between the memories including 1802 and RAM 1803 connected to the bus line 1817, and the various units other than the memories. Particularly, the DMAC 1806 responds directly to a request from DSPs 1809 and 1810, hardware devices 1811 and 1812 and DAC 1805 so as to transfer specified data to specified address without control by the CPU 1801.

In this embodiment, each of the CPU 1801, DSPs 1809 and 1810, and hardware devices 1811 and 1812 operates to generate the musical tone signal. Actually, each unit synthesizes a final musical tone by combining altogether several elementary functions associated to the tone synthesis. These elementary functions are realized by operating CPU 1801, DSPs 1809 and 1810, or hardware devices 1811 and 1812 according to softwares such as specific programs and parameters. A set of the specific programs and parameters is called "software module" which is loaded to realize a specific elementary function in the CPU 1801, DSPs 1809 and 1810, and hardware devices 1811 and 1812. Various kinds of the software modules are prepared in the ROM 1802. Typical software modules (1)–(15) are listed hereunder. In the present embodiment of the electronic musical instrument, the user can select or nonselect each of the elementary functions involved in the tone synthesis in manner similar to the first embodiment. An effective software module is called "ON module" which is loaded when a corresponding elementary function is selected. An ineffective software module is called "OFF module" which is loaded when a corresponding elementary function is nonselected. Namely, a pair of ON module and OFF module are prepared for each elementary function.

(1) CPU 1801 may use a software module to realize an elementary function defined to carry out generation of a musical tone signal in the waveform readout method. The software includes CPU WM TG ON module which is used when the elementary function is selected, and CPU WM TG OFF module which is used when the elementary function is nonselected. The CPU WM TG ON module is a program loaded into the CPU 1801 to generate the musical tone by the waveform memory readout method. The CPU WM TG OFF module is a program loaded to always output null data.

(2) The CPU 1801 may use a software module to realize an elementary function defined to carry out digital filtering process of the musical tone signal. The software includes CPU DF ON module which is used when the elementary function is selected, and CPU DF OFF module which is used when the elementary function is nonselected. The CPU DF ON module is a program loaded into the CPU 1801 to perform the digital filtering process. The CPU DF OFF module is a program loaded to pass input data as it is to output the same.

(3) CPU 1801 may use a software module to realize an elementary function defined to carry out amplitude control of the musical tone signal to impart thereto a desired envelope. The software includes CPU AMPL ON module which is used when the elementary function is selected, and CPU AMPL OFF module which is used when the elementary function is nonselected. The CPU AMPL ON module is a program loaded into the CPU 1801 to perform the amplitude control of the musical tone signal. The CPU AMPL OFF module is a program loaded to pass input data as it is to output the same.

(4) DSP 1809 may use a software module to realize an elementary function defined to carry out generation of a musical tone signal by the waveform memory readout method. The software includes DSP1 WM TG ON module which is used when the elementary function is selected, and DSP1 WM TG OFF module which is used when the elementary function is nonselected. The DSP1 WM TG ON module is a program loaded into the DSP 1809 to generate the musical tone signal by the waveform memory readout method. The DSP1 WM TG OFF module is a program loaded to always output null data.

(5) DSP 1809 may use a software module to realize an elementary function defined to carry out digital filtering process of the musical tone signal. The software includes DSP1 DF ON module which is used when the elementary function is selected, and DSP1 DF OFF module which is used when the elementary function is nonselected. The DSP1 DF ON module is a microprogram loaded into the DSP 1809 to perform the digital filtering process of the musical tone signal. The DSP1 DF OFF module is a microprogram loaded to pass input data as it is to output the same.

(6) DSP 1809 may use a software module to realize an elementary function defined to carry out amplitude control of the musical tone signal to impart thereto an envelope. The software includes DSP1 AM PL ON module which is used when the elementary function is selected, and DSP1 AMPL OFF module which is used when the elementary function is nonselected. The DSP1 AMPL ON module is a microprogram loaded into the DSP 1809 to perform the amplitude control of the musical tone signal. The DSP1 AMPL OFF module is a microprogram loaded to pass input data as it is to output the same.

(7) DSP 1809 may use a software module to realize an elementary function defined to carry out loop process of delaying and filtering of the musical tone signal to impart thereto a desired effect. The software includes DSP1 D&F LOOP ON module which is used when the elementary function is selected, and DSP1 D&F LOOP OFF module which is used when the elementary function is nonselected. The DSP1 D&F LOOP ON module is a microprogram loaded into the DSP 1809 to perform the loop process of delaying and filtering of the musical tone signal. The DSP1 D&F LOOP OFF module is a microprogram loaded to pass input data as it is to output the same.

(8) DSP 1809 may use a software module to realize an elementary function defined to carry out reverberation creating process. The software includes DSP1 REVERB ON module which is used when the elementary function is selected, and DSP1 REVERB OFF module which is used when the elementary function is nonselected. The DSP1 REVERB ON module is a microprogram loaded into the DSP 1809 to create a reverberation effect in the generated musical sounds. The DSP1 REVERB OFF module is a microprogram loaded to pass input data as it is to output the same.

(9) DSP 1809 may use a software module to realize an elementary function defined to carry out chorus effect creation process. The software includes DSP1 CHORUS ON module which is used when the elementary function is selected, and DSP1 CHORUS OFF module which is used when the elementary function is nonselected. The DSP1 CHORUS ON module is a microprogram loaded into the DSP 1809 to apply a chorus effect to the generated musical sounds. The DSP1 CHORUS OFF module is a microprogram loaded to pass input data as it is to output the same.

(10) DSP 1809 may use a software module to realize an elementary function defined to carry out phase shift effect creating process. The software includes DSP1 PHASE SHIFTER ON module which is used when the elementary function is selected, and DSP1 PHASE SHIFTER OFF module which is used when the elementary function is nonselected. The DSP1 PHASE SHIFTER ON module is a microprogram loaded into the DSP1 to create a desired phase shift effect. The DSF1 PHASE SHIFTER OFF module is a microprogram loaded to pass input data as it is to output the same.

(11) DSP 1809 may use a software module to realize an elementary function defined to carry out mixing process of the generated musical sounds. The software includes DSP1 MIXERi ON module which is used when the elementary function is selected, and DSP1 MIXERi OFF module which is used when the elementary function is nonselected. The DSP1 MIXERi ON module is a microprogram loaded into the DSP 1809 to perform the mixing process of input signals at a specified ratio according to specified parameters. The DSP1 MIXERi OFF module is a microprogram loaded to simply mix all of input signals with each other and to output the mixed results. The DSP 1809 can provide n number of mixers corresponding to DSP1 MIXERi (i=1–n) modules.

(12) DSP 1809 may use a software module to realize an elementary function defined to carry out tone generating process of the FM mode. The software includes DSP1 FM ON module which is used when the elementary function is selected, and DSP1 FM OFF module which is used when the elementary function is nonselected. The DSP1 FM ON module is a microprogram loaded into the DSP 1809 to perform the tone generating process of the FM mode. The DSP1 FM OFF module is a microprogram loaded to always output null data.

(13) DSP 1810 may use similar software modules as those listed in (4)–(12) used in DSP 1809. Namely, in (4)–(12), "DSP1" is changed to "DSP2", and "DSP 1809" is changed to "DSP 1810" to describe the software modules used in DSP 1810.

(14) Hardware device 1811 may use a software module to realize an elementary function defined to provide parameters. The software includes HARD1 ON module which is used when the elementary function is selected, and HARD1 OFF module which is used when the elementary function is nonselected. The HARD1 ON module is a parameter set loaded into the hardware device 1811 when the same performs the FM mode tone generating process. The HARD1 OFF module is a parameter set loaded to control the hardware device 1811 to always output null data.

(15) Hardware device 1812 may use a software module to realize an elementary function defined to provide a parameter set. The software includes HARD2 ON module which is used when the elementary function is selected, and HARD2 OFF module which is used when the elementary function is nonselected. The HARD2 ON module is a parameter set loaded into the hardware device 1812 when the same performs musical tone generating process by the waveform memory readout method. The HARD2 OFF module is a parameter set loaded to control the hardware device 1812 to always output null data.

The software modules listed in (1)–(3) are loaded into a work area of the RAM 1803, and are executed by the CPU 1801. On the other hand, the software modules listed in (4)–(12) are loaded into a microprogram RAM of the DSP 1809 and are executed by the DSP 1809. The software modules listed in (13) are loaded into a microprogram RAM of the DSP 1810 and are executed by the DSP 1810. The software module listed in (14) is transferred to the hardware device 1811, which is operated according to the transferred parameter set. The software module listed in (15) is transferred to the hardware device 1812, which is operated according to the transferred parameter set.

Figure 20:
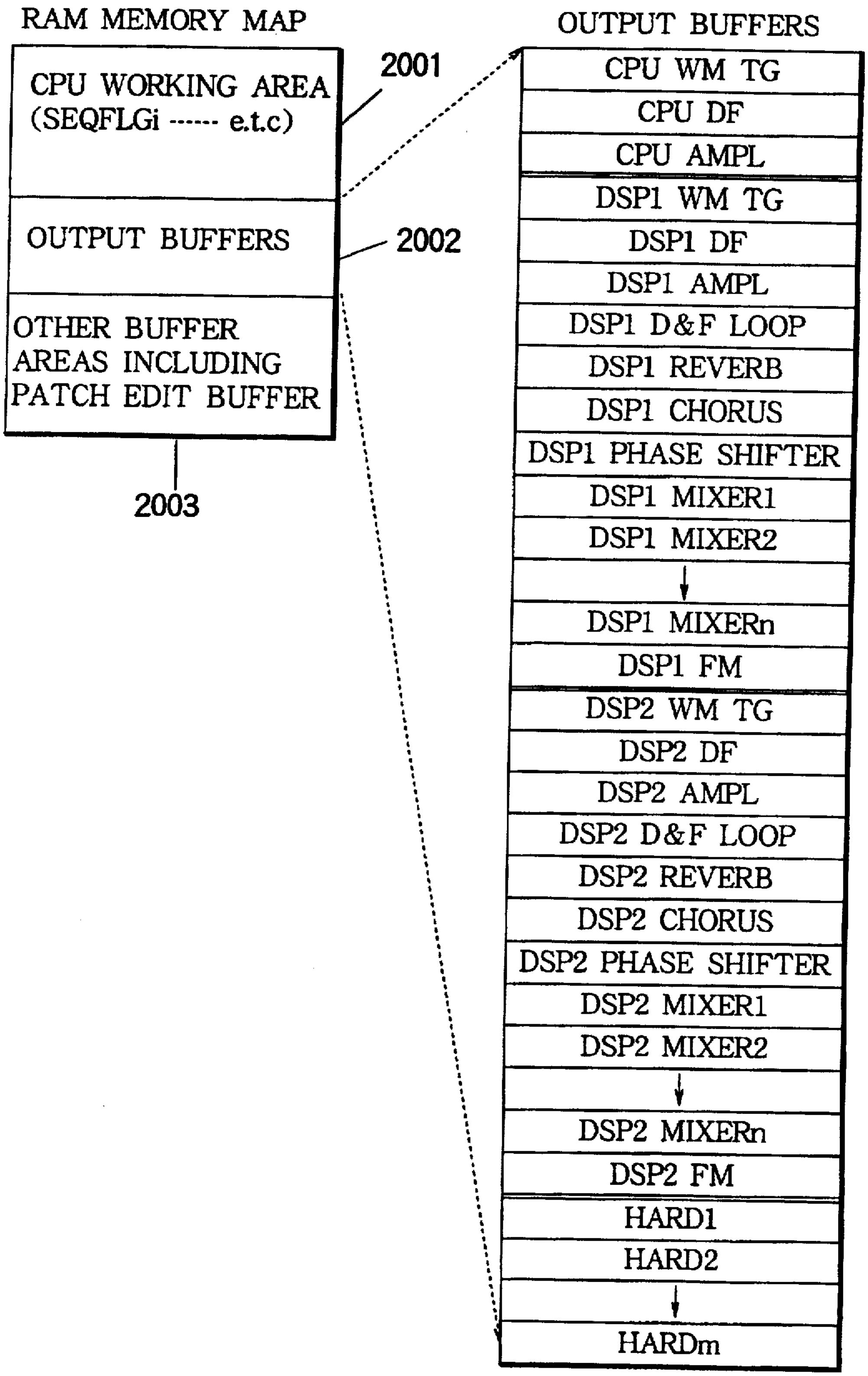
FIG. 20 is a memory map of a RAM contained in the second embodiment.

FIG. 20 shows a memory map of the RAM 1803 of FIG. 18. The RAM 1803 is provided with a work area 2001 used by the CPU 1801, output buffers 2002 denoted by "OUTPUT BUFFERS" and other buffer areas 2003. As shown in the right side of FIG. 20, the output buffers 2002 are provided with areas for registering computation results obtained by operating the respective software modules in the CPU 1801, DSPs 1809 and 1810, and hardware devices 1811 and 1812. Each software module retrieves data provided by other software modules from these output buffer areas to perform its own process. When the processors and devices including the DSPs 1809 and 1810 and the hardware devices 1811 and 1812 other than the CPU 1801 access these output buffer areas, these processors and devices issue a request to the DMAC 1806 so that the data transfer is conducted by direct memory access (DMA) between the processors and devices, and the output buffer areas. Otherwise, the data transfer may be managed and controlled by the CPU 1801. Hereafter, detailed description will be given below for each area of the output buffer 2002.

(1) CPU WM TG is an output buffer area used to register outputs from either of CPU WM TG ON module and CPU WM TG OFF module.

(2) CPU DF is an output buffer area used to register outputs from either of CPU DF ON module and CPU DF OFF module.

(3) CPU AMPL is an output buffer area used to register outputs from either of CPU AMPL ON module and CPU AMPL OFF module.

(4) DSP1 WM TG is an output buffer area used to register outputs from either of DSP1 WM TG ON module and DSP1 WM TG OFF module.

(5) DSP1 DF is an output buffer area used to register outputs from either of DSP1 DF ON module and DSP1 DF OFF module.

(6) DSP1 AMPL is an output buffer area used to register outputs from either of DSP1 AMPL ON module and DSP1 AMPL OFF module.

(7) DSP1 D&F LOOP is an output buffer area used to register outputs from either of DSP1 D&F LOOP ON module and DSP1 D&F LOOP OFF module.

(8) DSP1 REVERB is an output buffer area used to register outputs from either of DSP1 REVERB ON module and DSP1 REVERB OFF module.

(9) DSP1 CHORUS is an output buffer area allocated to register outputs from either of DSP1 CHORUS ON module and DSP1 CHORUS OFF module.

(10) DSP1 PHASE SHIFTER is an output buffer area allocated to register outputs from either of DSP1 PHASE SHIFTER ON module and DSP1 PHASE SHIFTER OFF module.

(11) DSP1 MIXERi (i=1–n) is an output buffer area assigned to register outputs from either of DSP1 MIXERi ON module and DSP1 MIXERi OFF module. The mixer is prepared in n number of mixer units. The mixing result of each mixer unit is registered in the corresponding output buffer area.

(12) DSP1 FM is an output buffer area provided to register outputs from either of DSP1 FM ON module and DSP1 FM OFF module.

(13) DSP2 WM TG through DSP2 FM are output buffer areas which are similar to those listed in (4)–(12) and which are allocated to various software modules associated to the second DSP 1810.

(14) HARD1 is an output buffer area used to register outputs from the hardware device 1811 which is operated based on either of HARD1 ON module and HARD1 OFF module.

(15) HARD2 is an output buffer used to register outputs from the hardware device 1812 which is operated according to either of HARD2 ON module and HARD2 OFF module.

(16) HARD3–HARDm are output buffer areas provided to reserve outputs from other hardware devices. However, the present electronic musical instrument employs only the hardware devices 1811 and 1812 so that the HARD3–HARDm are not used in this embodiment.

Next, description is given for editing procedure of the algorithm for the musical tone generation in the present electronic musical instrument. In this embodiment, the user operates the manual input tool 1807 and the typing keyboard 1808 while monitoring the display 1804 to edit the musical tone synthesizing algorithm. Outline of the editing procedure is described hereinbelow.

(1) The system of the computerized musical instrument is booted to exhibit a module picture on the display 1804. The module picture shows various functional blocks as parts corresponding to various elementary functions usable in synthesis of the musical sounds. Each functional block represents a software module which is installed to realize the corresponding elementary function. Therefore, the functional block contained in the module picture is called "module" hereinafter.

(2) The user preselects various modules from parts contained in the module picture so that the preselected modules are used to form a framework for the editing of the tone generating algorithm. This preselection is conducted by clicking operation of the mouse tool on the desired modules contained in the module picture.

(3) The system then switches the display 1804 from the module picture to a patch picture, which contains the preselected modules likewise a patchwork. The patch picture is used to graphically edit the specific tone generation algorithm, and represents a functional diagram corresponding to those shown in FIGS. 3 and 4 of the first embodiment.

(4) The user graphically treats the patch picture to conduct settings of the respective modules, and further to connect the respective modules to each other to define input/output relations of the respective modules, thereby completing a desired functional block as the framework for the algorithm editing.

(5) Then, the functional block is graphically treated to select or nonselect each module or functional block involved in the block diagram to thereby edit the specific algorithm of the tone generation in manner similar to the first embodiment.

Figure 21:
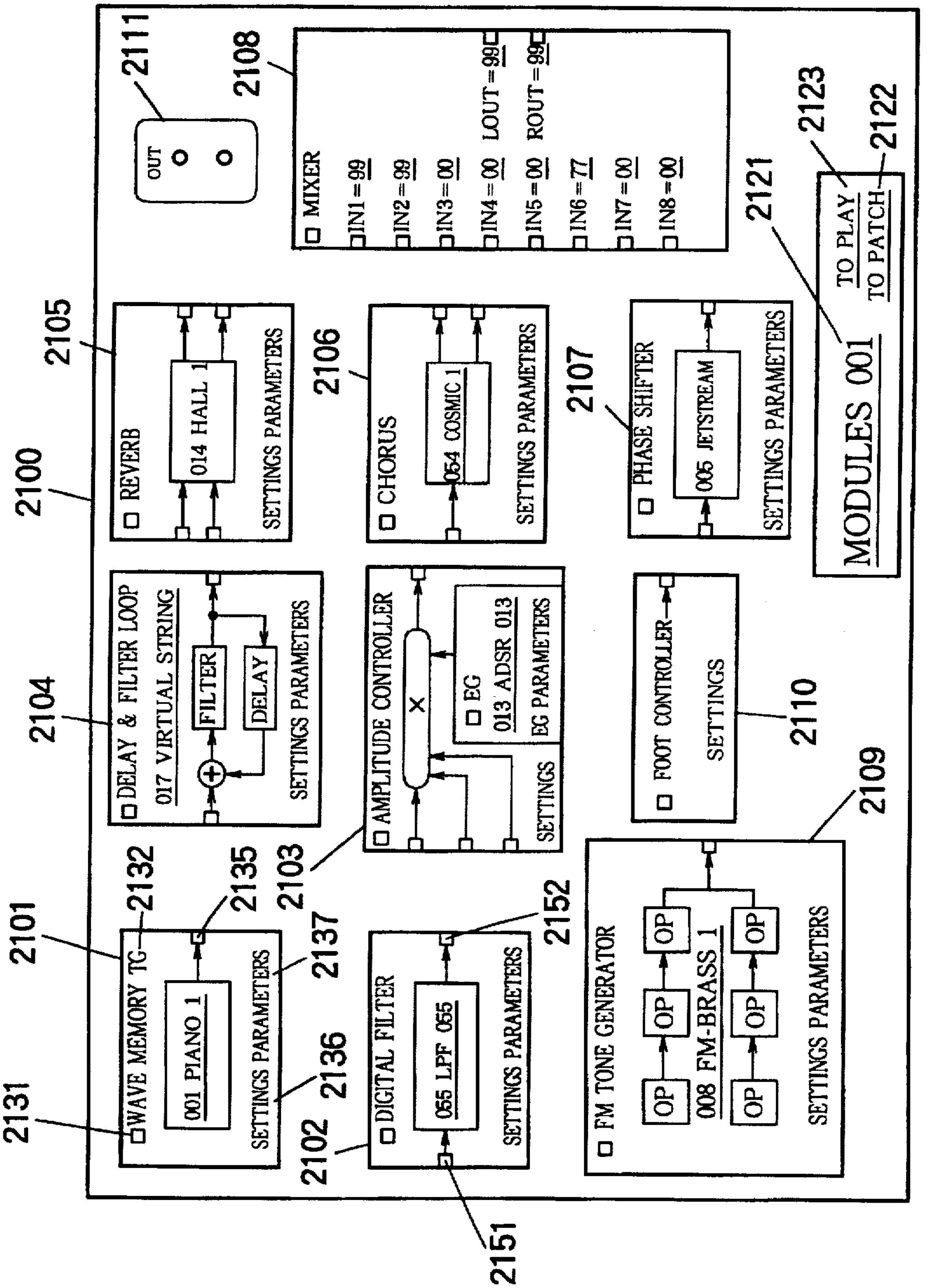
FIG. 21 shows an example of a module picture.
Figure 22A:
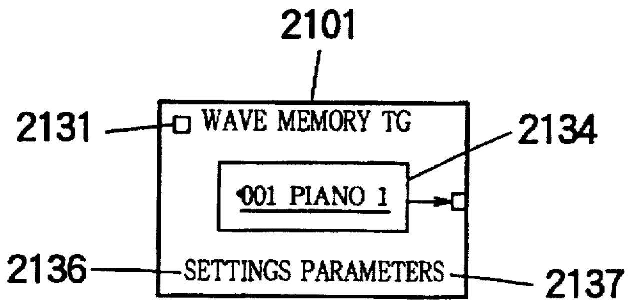
FIGS. 22A–22H show setup of modules on a patch picture.
Figure 22B:
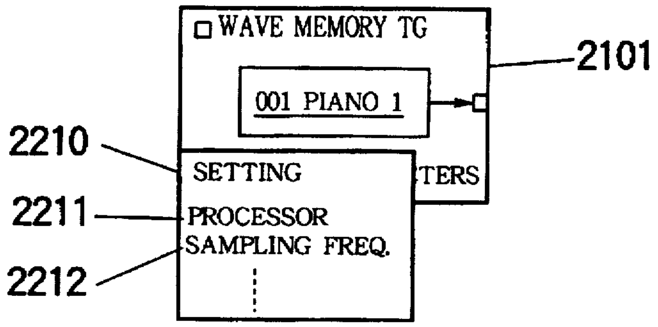
Figure 22C:
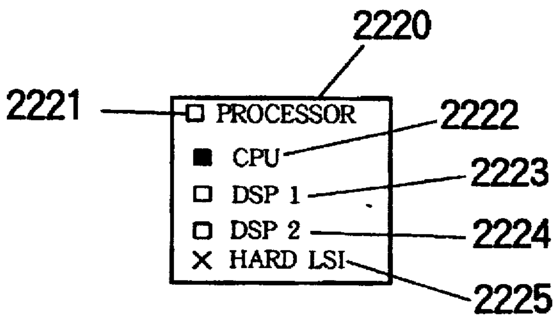
Figure 22D:
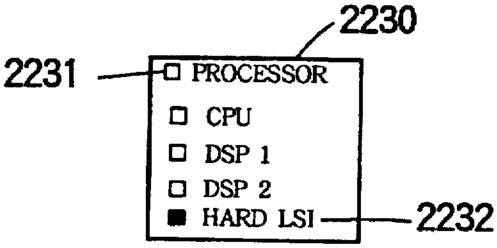
Figure 22E:
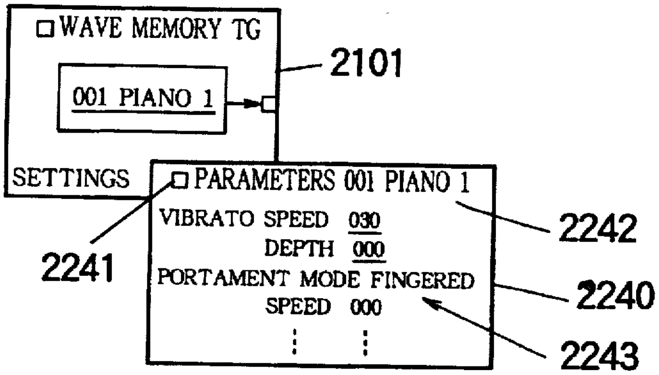
Figure 22F:
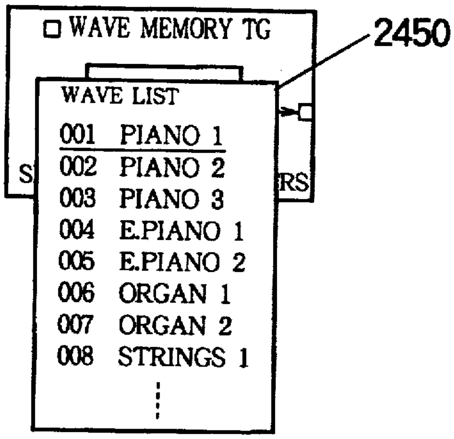
Figure 22G:
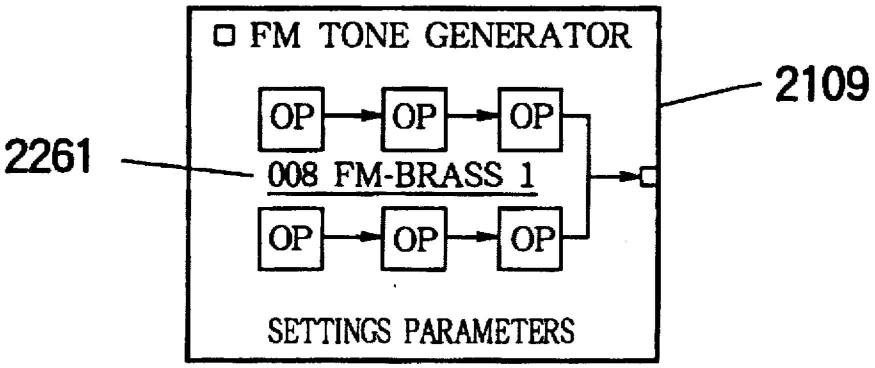
Figure 22H:
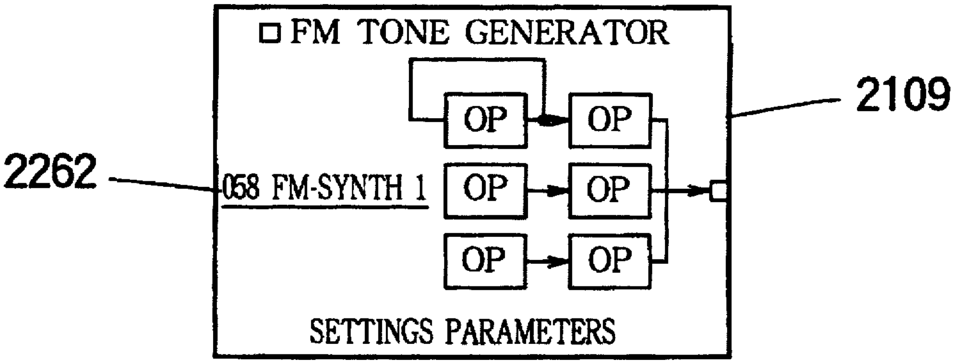
Figure 23:
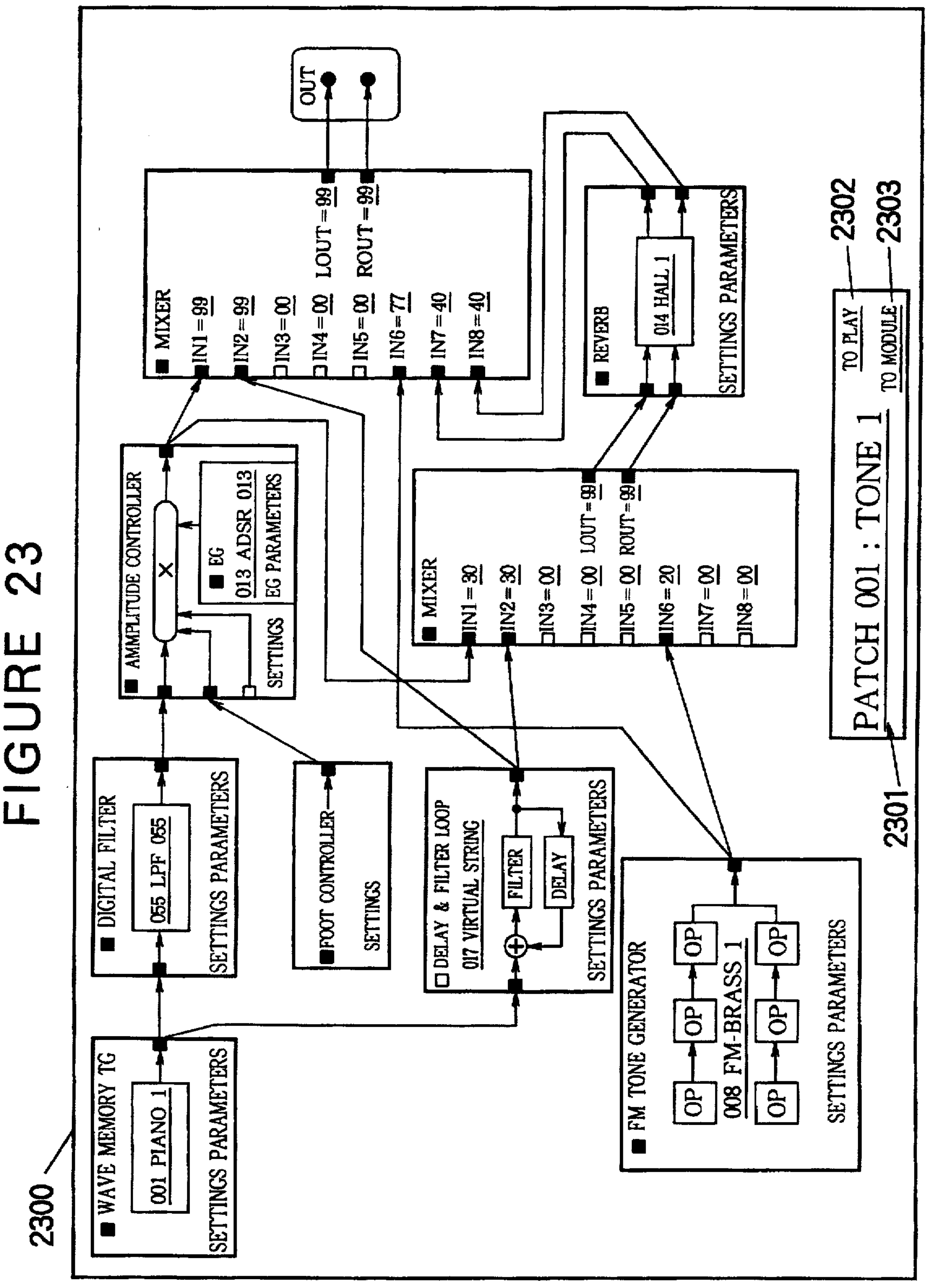
FIG. 23 shows a first example of the patch picture.
Figure 24:
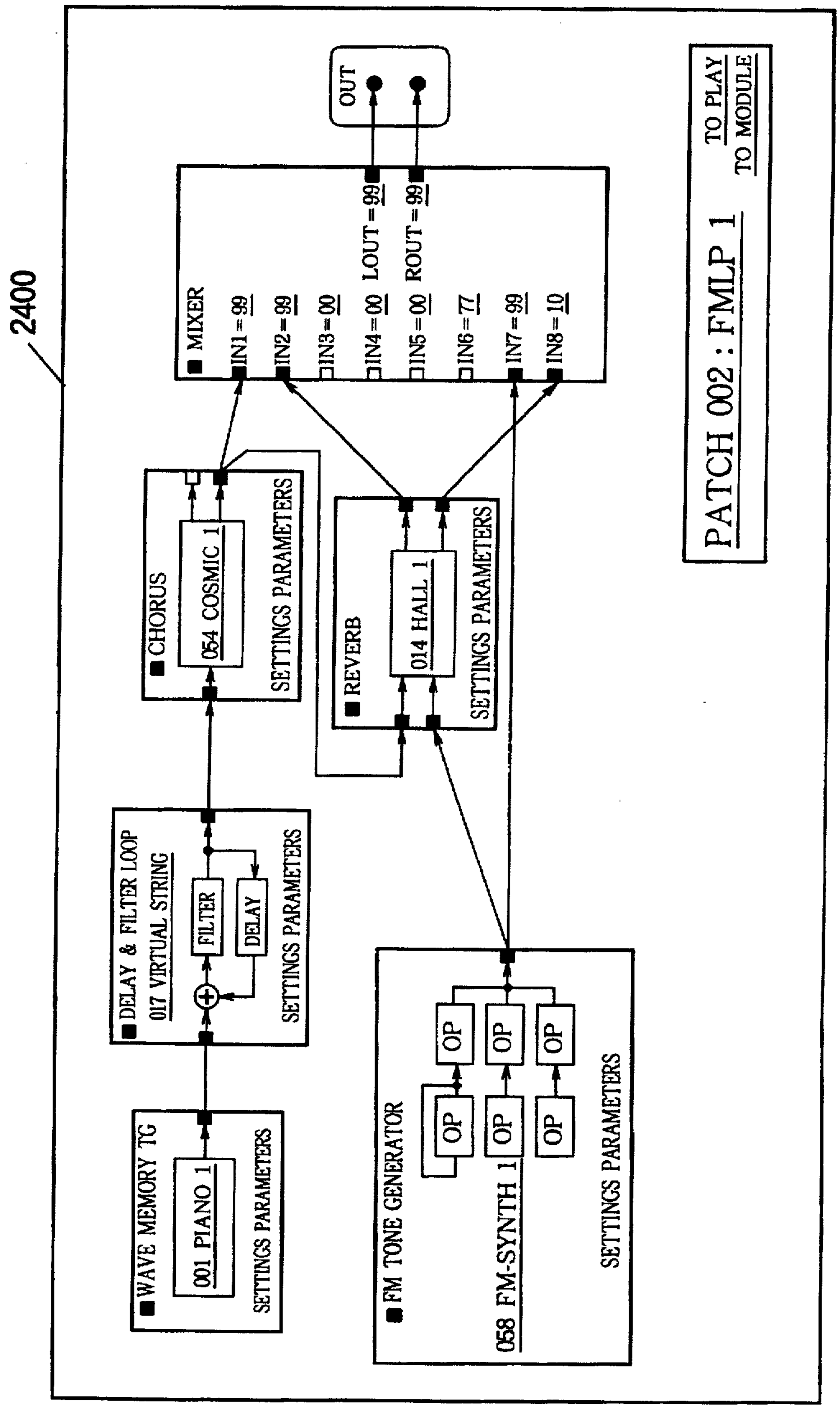
FIG. 24 shows a second example of the patch picture.

Hereinafter, detailed description is given for the editing work in conjunction with the drawings in which FIG. 21 shows an example of the module picture, FIGS. 22A–22H show setting operation of modules, and FIGS. 23 and 24 show different examples of the patch picture. Referring first to FIG. 21, reference 2100 denotes a window of the module picture presented on the display 1804. This window 2100 contains various items of the modules denoted by reference numerals 2101–2111. The mouse cursor or pointer is pointed to desired one of the modules 2101–2111, and then the mouse button is clicked so that the desired module is preselected. Such an operation is called "module preselection". Then, the module window 2100 of FIG. 21 is erased, and in turn the patch picture is presented on the display 1804. The preselected module is patched in the displayed patch picture. The module preselection is conducted one by one to collect various elementary functions usable for the generation or synthesis of the musical tone. FIGS. 23 and 24 show examples of the patch picture in which several ones of the preselected modules are already patched and are interconnected with each other. However, the initial patch picture has only a blank space together with information including a name of the patch picture and menu items.

Referring back to FIG. 21, each module is indicated by a rectangle block which contains a check box and a name of the module at an upper left portion of the block. The check box is utilized to designate whether the corresponding elementary function should be selected or nonselected. For example, a rectangular block of the module 2101, which is installed to generate musical tone waveforms by the waveform memory readout mode, contains a check box 2181 and the name "WAVE MEMORY TG" (denoted by reference numeral 2132) at the upper left portion. In similar manner, the remaining modules 2102–2110 have a check box and a name at a left upper portion of the rectangular block. However, the last "OUT" module 2111 is an exceptional type that must be installed to designate an end terminal for outputting the musical tone signal. Therefore, the OUT module 2111 does not have a check box to specify on/off state of the OUT module, because the OUT module must be selected in any cases.

Generally, each module has a label "SETTINGS" at a lower left portion of the rectangular block and another label "PARAMETERS" at the right side of the label "SETTINGS". For example, the WAVE MEMORY TG module 2101 has the label "SETTINGS" denoted by reference 2136 at the lower left portion and the label "PARAMETERS" denoted by reference 2137 at the right side of the label "SETTINGS". After each module is patched into the patch picture, the label "SETTINGS" is clicked by the mouse tool so as to commence various settings of the module. Further, the label "PARAMETERS" is clicked by the mouse tool to commence setting of various parameters related to the module.

FIG. 22A shows an initial display state of the WAVE MEMORY TG module 2101. FIG. 22B shows a work display state of the same WAVE MEMORY TG module 2101 after the label "SETTINGS" 2136 thereof is clicked by the mouse tool. This display state contains a menu 2210 related to the settings of the module 2101. The menu 2210 lists various select items. An item "PROCESSOR" 2211 is clicked to select a processor used to realize the elementary function of the module. Another item "SAMPLING FREQ" 2212 is clicked to set a sampling frequency of waveform data.

When the item "PROCESSOR" 2211 is clicked by the mouse tool within the menu 2210, the display presents one of processor select menus 2220 and 2230 shown in FIGS. 22C and 22D. The processor select menu is provided to select a processor used to realize the elementary function of the module. The processor select menu 2220 of FIG. 22C lists items "CPU" denoted by 2222, "DSP1" denoted by 2223, and "DSP2" denoted by 2224 together with check boxes. One of the check boxes of "CPU" 2222, "DSP1" 2223 and "DSP2" 2224 is selected by the clicking of the mouse tool so that the elementary function of the module is realized by the selected one of the CPU 1801, DSP 1809 and DSP 1810.

In the processor select menu 2220 of FIG. 22C, an item "HARD LSI" is marked by a cross because the system is not installed with any hardware device to realize the elementary function of the module. On the other hand, in case that the system is installed with such a hardware device, the other processor select menu 2230 is presented as shown in FIG. 22D which includes an item "HARD LSI" denoted by 2232 together with a check box for selection. If this check box is clicked by the mouse tool, the hardware device is selected to realize the elementary function of the module. The "WAVE MEMORY TG" module 2101 has the elementary function to generate a musical tone signal by the waveform memory readout method. As described before, this elementary function can be realized by means of one of the CPU 1801, DSP 1809, DSP 1810 and hardware device 1812 in this embodiment. Thus, the processor select menu 2230 is presented as shown in FIG. 22D in conjunction with the module 2101.

By such a manner, the processor select menu is presented for each module to enable the user to select a desired processor capable of realizing the corresponding elementary function. In the processor select menus 2220 and 2230 shown in FIGS. 22C and 22D, reference numerals 2221 and 2231 denote a close box, which is clicked to close the processor select menu 2220 or 2230 after the desired processor is specified by the user. It should be noted in this second embodiment that an item accompanied by a box marked black is selected and an item accompanied by a box marked white is nonselected. This marking notation is opposite to the first embodiment. Any notation may be adopted to definitely discriminate between the select/nonselect states.

FIG. 22E shows a working display state of the WAVE MEMORY TG module 2101, which is presented when the label "PARAMETERS" 2137 is clicked by the mouse tool, and which contains a parameter setting menu denoted by reference numeral 2240. This menu contains a close box 2241 which is clicked to close the menu. The parameter setting menu 2240 lists various parameter values denoted by 2243 associated to the operation of the module 2101. The user sets or alters each parameter value by means of the mouse tool and the typing keyboard 1808. Reference numeral 2242 denotes a number and name of a parameter group, which is an entity of the various parameter values involved in the parameter setting menu 2240. The parameter group can be selected to totally change the various parameter values associated to the module. As shown in FIG. 22A, the module 2101 has the number and name of the parameter group "001 PIANO1" (denoted by reference 2134) underlined at a middle portion of the rectangular block. This indicates that the module 2101 is currently set with the parameter group specified by "001 PIANO1". The number and name denoted by 2134 may be clicked by the mouse tool so that a list of preset parameter groups is displayed as shown in FIG. 22F and as denoted by reference numeral 2450. The user may select a desired parameter group from the list 2450 so that the various parameter values of the selected group are set to the module as one entity.

FIGS. 22G and 22H show another type of parameter group set in the FM tone generator module 2109. In FIG. 22G, one parameter group "008 FM-BRASS1" is selected and set as denoted by reference 2261. In FIG. 22H, another parameter group "058 FM-SYNTH1" is set in the same module as denoted by reference 2262. In the FM tone generator module, a desired parameter group is selected to specify a desired arrangement of operators (OP) which correspond to a desired timbre. The selected arrangement is diagrammatically presented within the rectangular block of the module 2109 as shown in FIGS. 22G and 22H.

Referring back to FIG. 21, generally, the labels "SETTINGS" and "PARAMETERS" are attached to each of the modules. Exceptionally, the "FOOT CONTROLLER" module 2110 lacks the label "PARAMETERS" since the module 2110 does not have any parameters to be set. Further, the "MIXER" module 2108 and the "OUT" module 2111 lack both of "SETTINGS" and "PARAMETERS" since these modules do not have processors and parameters to select and set. Moreover, the "AMPLITUDE CONTROLLER" module 2103 has a modified label "EG PARAMETERS" since parameters are set for an internal envelope generator within the module 2103. As described above, the number and name of the parameter group is underlined to indicate the currently selected parameter group in the rectangular blocks of the respective modules in which a set of parameters can be selected as an entity. As described in conjunction with FIG. 22F, a desired item of the parameter groups is clicked for the select and set. However, such an indication of the parameter group lacks from the blocks of the FOOT CONTROLLER module 2110, MIXER module 2108 and OUT module 2111 since these modules do not have any parameters to be set.

Each module has small rectangular symbols to indicate input and output terminals. For example, the module 2101 has an output terminal 2135 for outputting the generated musical tone signal. The module 2102 has a pair of input terminal 2151 and output terminal 2152. An input terminal may not be provided in some module which has no function to receive and process the musical tone signal. The mixer module 2108 has a multiple of input terminals and a pair of output terminals, which are accompanied by weight values in the range of 00–99 with an underline. The weight value of each terminal may be changed or rewritten by the user on the patch picture. In the module window 2100 of FIG. 21, reference numeral 2121 indicates the name of the displayed module picture. The indicated name is clicked to call a list of various module pictures. The user can select a desired module picture from the list. By such an operation, the user picks up desired ones of modules contained in the selected module picture. Reference numeral 2123 denotes a mode button which is clicked to switch from the editing mode to a normal play mode. Reference numeral 2122 denotes a command button which is clicked to switch from the module picture to the patch picture without selection of any module.

Next, operation on the patch picture will be described with reference to FIGS. 23 and 24. In the patch picture shown in FIG. 23, reference numeral 2300 denotes a window in which the patch picture is displayed. The initial window 2300 of the patch picture has a blank space since no module is patched yet and indicates only the name of the patch picture (denoted by 2301), a mode button (denoted by 2302) used to return to the normal play mode, and a button (denoted by 2303) used to return to the module picture.

As described in conjunction with FIGS. 21–22H, desired ones of the modules are preselected from the module pictures. The preselected modules are patched into the patch picture as shown in FIG. 23. As described in conjunction with FIGS. 22A–22H, selection of the processor and setting of the parameters may be conducted for each of the preselected modules. Further, the modules are interconnected to each other through the input and output terminals of the respective modules. The connecting work is graphically carried out such that the mouse tool is dragged from an input terminal of one module to an output terminal of another module. The pair of the input and output terminals are marked black. Further, in manner similar to the first embodiment, a check box placed at an upper left portion of the rectangular block of each module is selectively clicked to determine selection or nonselection of the corresponding elementary function of each module. By such a manner, the specific tone generation algorithm is edited on the patch picture to define the arithmetic procedure of the tone generation. The produced algorithm is reserved as "patch data" in the RAM 1803 which is backed up by a battery so that the reserved patch data is never erased. The reserved patch data is retrieved from the RAM 1803 by calling the name of the corresponding patch picture as denoted by reference numeral 2301 in FIG. 23. The patch data includes identification of the preselected modules used for the tone generation, settings of these modules such as "SETTINGS", "PARAMETERS" and the name of the parameter group, interconnection among the respective modules, and the on/off status (select/nonselect status) of the respective modules.

When the desired patch data is read out from the memory, the software modules corresponding to the modules specified by the patch data are loaded into adequate ones of the RAM 1803, the microprogram memories of the DSPs 1809 and 1810, and the hardware devices 1811 and 1812. The musical tone is generated according to the loaded software modules. Hereinbelow, description is given for correspondence between each module shown in FIG. 21 and each software module loaded as described above. The corresponding software module is one of "ON module" and "OFF module" which are selected according to the on/off status of each module as indicated by the check box placed at the upper left portion of the rectangular block of each module.

(1) WAVE MEMORY TG module 2101 corresponds to one of CPU WM TG ON module and CPU WM OFF module when the CPU is specified as the processor for realizing the elementary function of the module, or corresponds to one of DSP1 WM TG ON module and DSP1 WM TG OFF module when the DSP1 is specified as the processor for realizing the elementary function of the module, or corresponds to one of DSP2 WM TG ON module and DSP2 WM TG OFF module when the DSP2 is specified as the processor for realizing the elementary function of the module, or corresponds to one of HARD2 ON module and HARD2 OFF module when the HARD LSI is specified as the processor for realizing the elementary function of the module.

(2) DIGITAL FILTER module 2102 corresponds to one of CPU DF ON module and CPU DF OFF module when CPU is specified as the processor for realizing the elementary function of the module, or corresponds to one of DSP1 DF ON module and DSP1 DF OFF module when DSP1 is specified as the processor for realizing the elementary function of the module, or corresponds to one of DSP2 DF ON module and DSP2 DF OFF module when DSP2 is specified as the processor for realizing the elementary function of the module.

(3) AMPLITUDE CONTROLLER module 2103 corresponds to one of CPU AMPL ON module and CPU AMPL OFF module when CPU is specified as the processor for realizing the elementary function of the module, or corresponds to one of DSP1 AMPL ON module and DSP1 AMPL OFF module when DSP1 is specified as the processor for realizing the elementary function of the module, or corresponds to one of DSP2 AMPL ON module and DSP2 AMPL OFF module when DSP2 is specified as the processor for realizing the elementary function of the module.

(4) DELAY & FILTER LOOP module 2104 corresponds to one of DSP1 D&F LOOP ON module and DSP1 D&F LOOP OFF module when DSP1 is specified as the processor for realizing the elementary function of the module, or corresponds to one of DSP2 D&F LOOP ON module and DSP2 D&F LOOP OFF module when DSP2 is specified as the processor for realizing the elementary function of the module.

(5) REVERB module 2105 corresponds to one of DSP1 REVERB ON module and DSP1 REVERB OFF module when DSP1 is specified as the processor for realizing the elementary function of the module, or corresponds to one of DSP2 REVERB ON module and DSP2 REVERB OFF module when DSP2 is specified as the processor for realizing the elementary function of the module.

(6) CHORUS module 2106 corresponds to one of DSP1 CHORUS ON module and DSF1 CHORUS OFF module when DSP1 is specified as the processor for realizing the elementary function of the module, or corresponds to one of DSP2 CHORUS ON module and DSP2 CHORUS OFF module when DSP2 is specified as the processor for realizing the elementary function of the module.

(7) PHASE SHIFTER module 2107 corresponds to one of DSP1 PHASE SHIFTER ON module and DSP1 PHASE SHIFTER OFF module when DSP1 is specified as the processor for realizing the elementary function of the module, or corresponds to one of DSP2 PHASE SHIFTER ON module and DSP2 PHASE SHIFTER OFF module when DSP2 is specified as the processor for realizing the elementary function of the module.

(8) MIXER module 2108 has an elementary function (fixing function) which is realized by either of DSPs 1809 and 1810. The system may adequately specify one of the DSPs 1809 and 1810. Therefore, when DSP 1809 is specified, one of DSP1 MIXERi ON module (i=1–n) and DSP1 MIXERi OFF module corresponds to the MIXER module 2108. When DSP 1810 is specified, one of DSP2 MIXERi ON module and DSP2 MIXERi OFF module corresponds to the MIXER module 2108. An n number of the fixer units can be provided by one DSP. Therefore, the MIXER module 2108 may be patched into the patch picture up to the n number of the mixer units for one DSP. These mixer units are labeled i=1, 2, . . . in the order of the patching.

(9) FM TONE GENERATOR module 2109 corresponds to one of DSP1 FM ON module and DSP1 FM OFF module when DSP1 is specified as the processor for realizing the elementary function of the module, or corresponds to one of DSP2 FM ON module and DSP2 FM OFF module when DSP2 is specified as the processor for realizing the elementary function of the module, or corresponds to one of HARD1 ON module and HARD1 OFF module when HARD LSI is specified as the processor for realizing the elementary function of the module.

(10) FOOT CONTROLLER module 2110 does not have a corresponding software module. Another module connected to this module 2110 takes output values from the foot controller 1815.

(11) OUT module 2111 does not have a corresponding software module. When the DAC 1805 takes the final musical tone signal and feeds the same to the acoustic sound system including a loudspeaker, the DAC 1805 actually takes the data outputted from a module connected to this OUT module 2111.

As described above, the software modules specified by the patch data are loaded into the system. In manner similar to the first embodiment, the nonselected module is realized by the OFF software module having a reduced number of computation steps to simply output null data or to simply through-pass input data as it is. Thus, the musical tone generation is effected by a program having no redundant computation steps.

Figure 25:
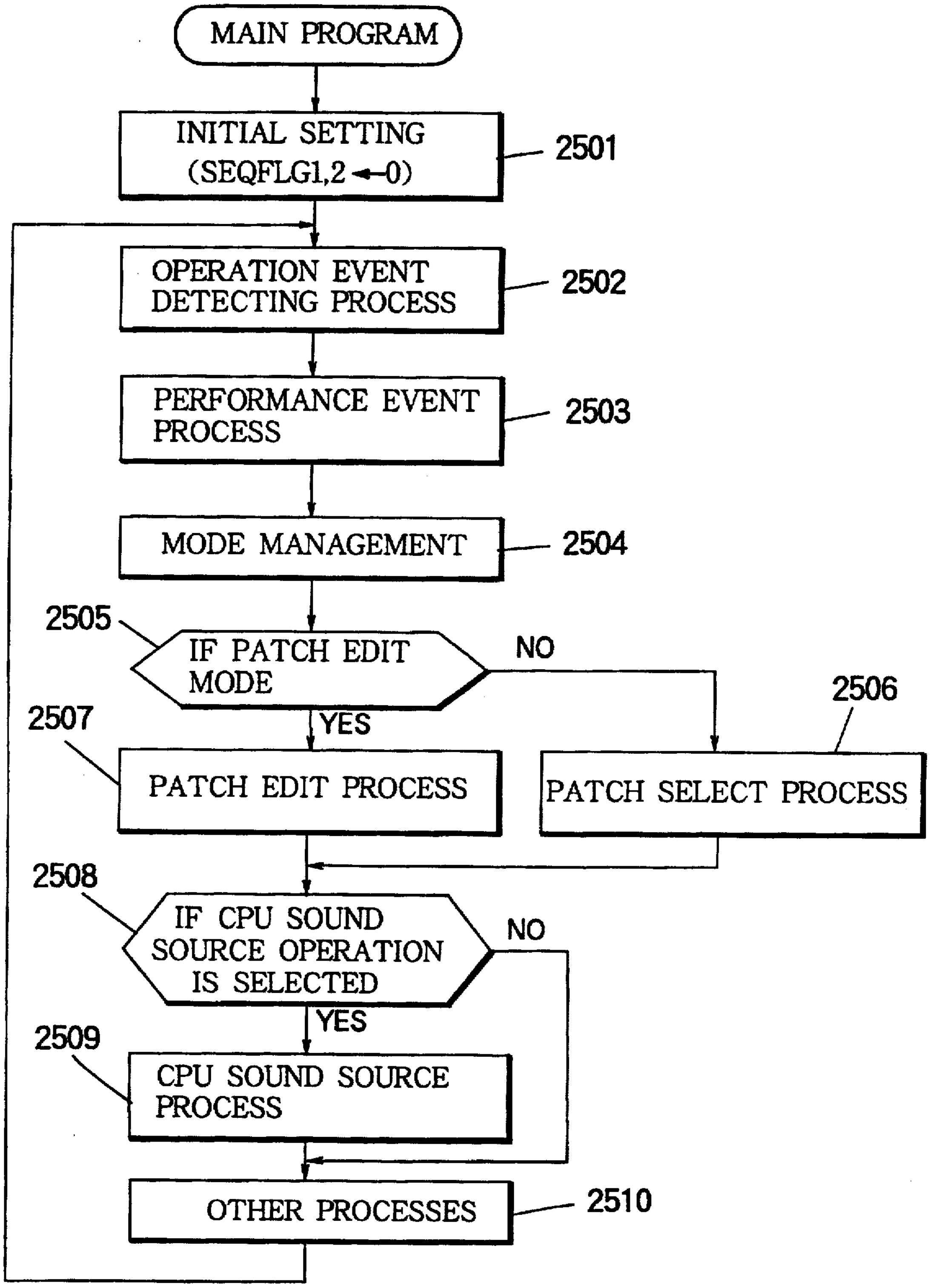
FIG. 25 is a flowchart showing a main program routine executed by the second embodiment.

Next, detailed description is given for operation of the second embodiment of the electronic musical instrument in conjunction with FIGS. 25–28. FIG. 25 is a flowchart showing a main program executed by the CPU 1801. First, initialization of various parts is carried out in step 2501. Particularly, sequence flags SEQFLG1 and SEQFLG2 are initialized to "0". These flags are used to control procedures of the patch edit process. Next, any operation event is detected in step 2502. Then, a performance event is processed in step 2503. The operation event detecting process of step 2502 is undertaken to detect an operation event issued by means of the mouse tool or the typing keyboard 1808. The performance event process of step 2503 is undertaken to detect a performance event inputted by the user through the keyboard 1816 and the foot controller 1815. The performance event may be provided in the form of MIDI input. Then, a command is issued to generate a musical tone in response to the detected performance event.

Next, mode management process is carried out in step 2504. This electronic musical instrument has the normal play mode in which the musical tone is generated in response to the user's performance operation, and the patch edit mode in which the patch data is produced by graphically treating the module picture and the patch picture. This mode management step 2504 manages switching of these two modes.

Next, check is made in step 2505 as to whether the patch edit mode is currently selected. If YES, the patch edit process is executed in step 2507 as will be described in detail later with reference to FIG. 27. If NO, patch select process is undertaken in step 2506 such that desired patch data is selected by specifying the name of the patch picture. In this patch select process, the software modules corresponding to the modules specified in the selected patch data are adequately loaded into the RAM 1803, the microprogram RAMs of the DSPs 1809 and 1810, and the hardware devices 1811 and 1812.

Next, check is made in step 2508 as to if the sound source operation by the CPU 1801 is selected. Namely, this check is made to detect whether the currently selected patch data specifies any module which performs the sound source process by the CPU. If YES, the sound source process by the CPU 1801 is effected in step 2509 as will be described later in detail with reference to FIG. 26. If NO, the routine jumps to step 2510 where other processes are undertaken. Thereafter, the routine returns to step 2502.

Figure 26:
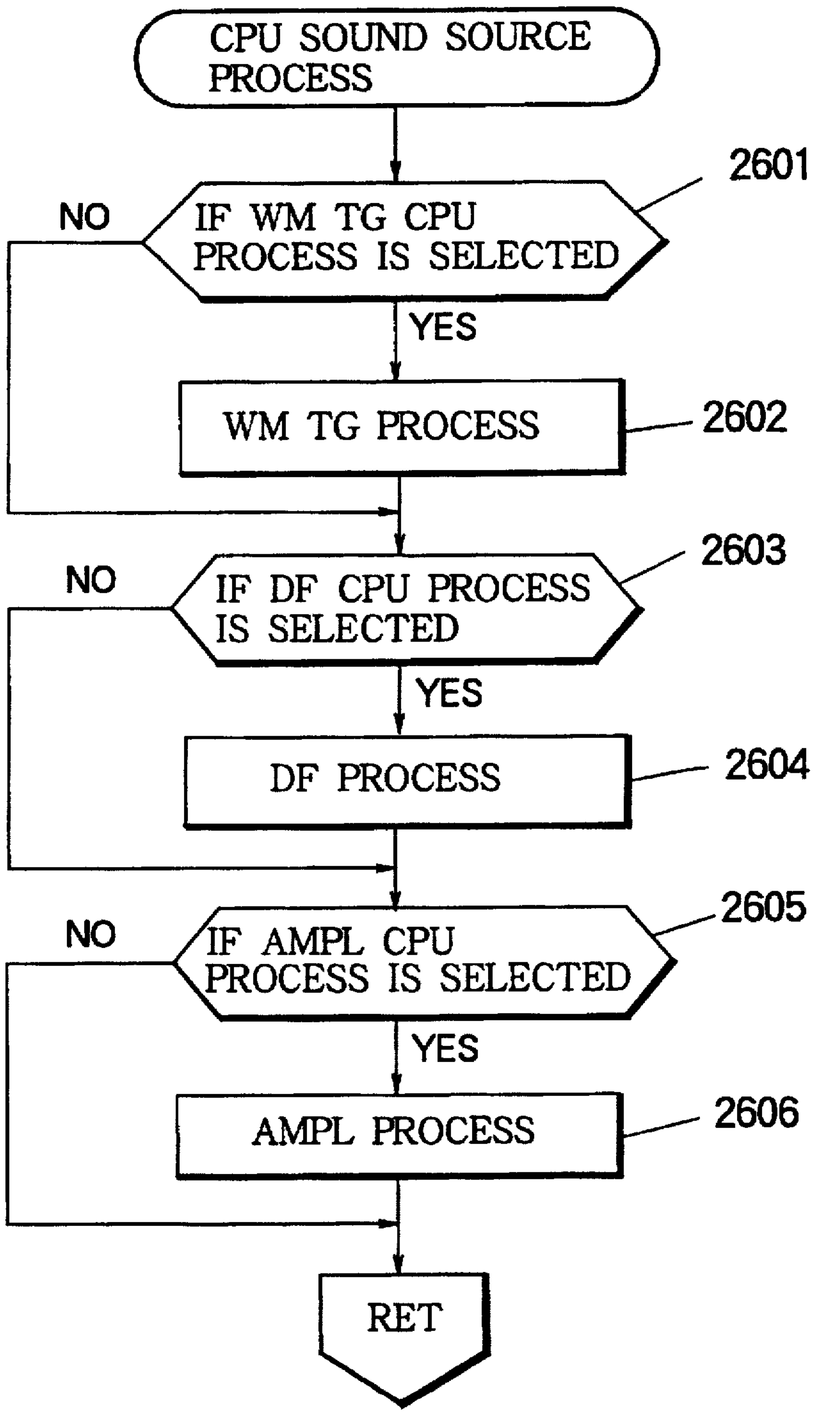
FIG. 26 is a flowchart showing a routine of CPU sound source process.

FIG. 26 is a flowchart showing the detail of the CPU sound source process or CPU tone generation process executed in step 2509 of FIG. 25. In the CPU sound source process, first check is made in step 2601 as to if "WM TG CPU" process is selected. This process is selected in case that the currently set patch data specifies the WAVE MEMORY TG module 2101 and the CPU is designated as the processor to realize the module 2101. If this check result is YES, one of the CPU WM TG ON module and the CPU WM TG OFF module is loaded in the RAM 1803 according to the on/off status of the module 2101. Thus, the loaded ON or OFF software module is executed in step 2602 to effect the WM TG process such that the musical tone is generated by reading out the waveform data from the waveform memory.

Next, check is made in step 2603 as to if "DF CPU" process is selected. This process is selected in case that the current pitch data specifies the DIGITAL FILTER module 2102 and the CPU is designated as the processor for realizing the module 2102. If the check result is YES, the CPU DF ON module or the CPU DF OFF module is loaded in the RAM 1803 according to the on/off status of the module 2102. Thus, the loaded ON or OFF software module is driven in step 2604 to carry out the DF process or digital filtering process.

Next, check is made in step 2605 as to if "AMPL CPU" process is selected. This process is selected in case that the current patch data specifies the use of the AMPLITUDE CONTROLLER module 2103 and the CPU is designated as the processor for realizing the module 2103. If the check result is YES, the CPU AMPL ON module or the CPU AMPL OFF module is loaded in the RAM 1803 according to the on/off status of the module 2103. Thus, the loaded ON or OFF software module is driven to carry out the AMPL process or amplitude control process.

Figure 27:
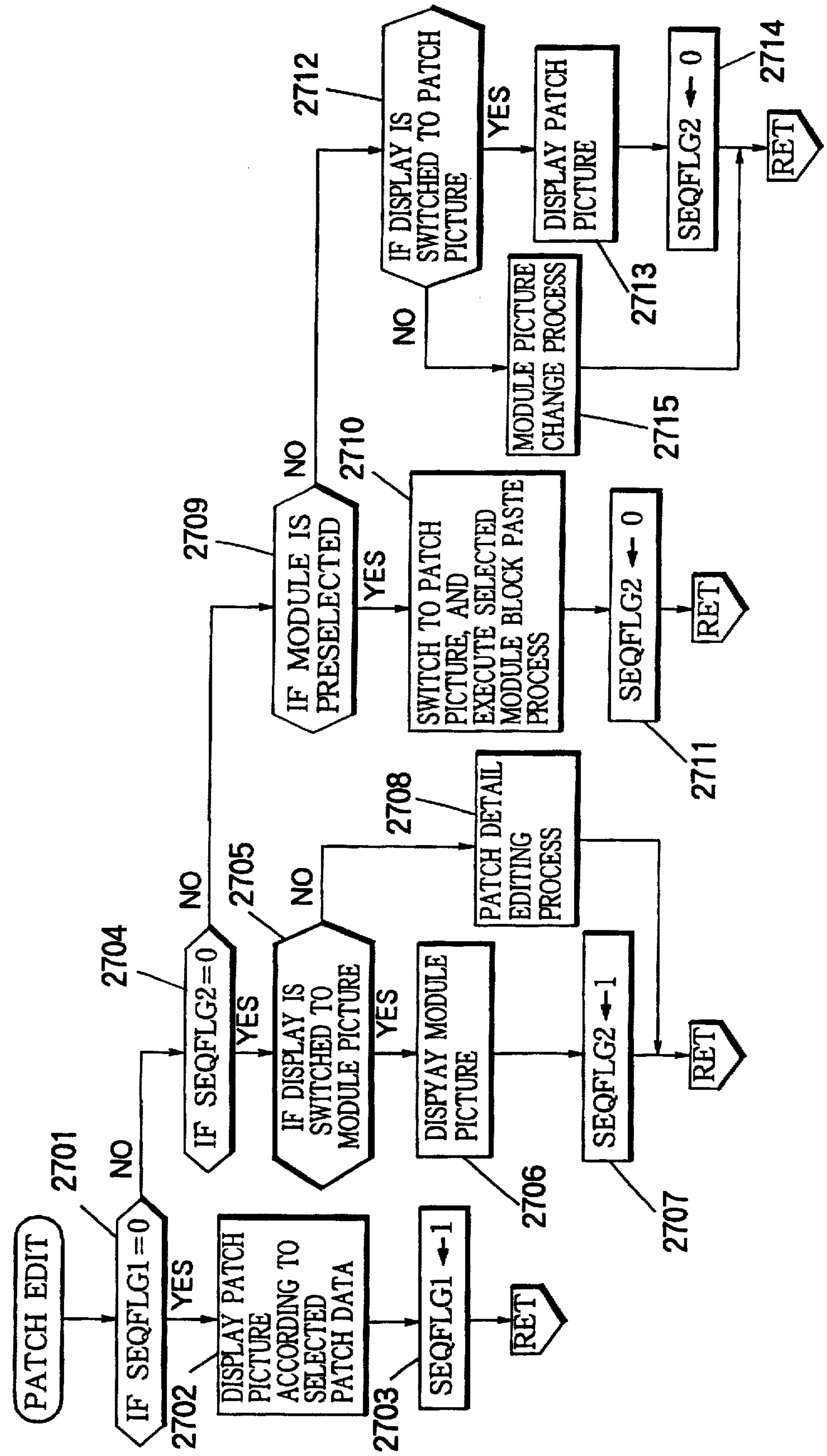
FIG. 27 is a flowchart showing a routine of patch edit process.

FIG. 27 is a flowchart showing the detail of the patch edit process executed in step 2507 of FIG. 25. In this patch edit process, first check is made in step 2701 as to if the sequence flag SEQFLG1 is set to "0". This flag is set to "0" under the normal play mode, and is otherwise set to "1" under the patch edit mode. If the sequence flag remains in "0" at step 2701, this means the fact that this patch edit process is just called after the normal play mode is switched to the patch edit mode. Thus, in step 2702, the patch picture corresponding to the currently selected patch data is displayed in the patch window. Then, the flag SEQFLG1 is set to "1" in step 2703. Thereafter, the routine returns.

If the step 2701 indicates that the flag SEQFLG1 is not set in "0", next check is made in step 2704 as to if the sequence flag SEQFLG2 is set in "0". This flag is set to "1" when the module picture is displayed, and is otherwise set to "0" when the patch picture is displayed. If the flag SEQFLG2 is set in "0", the patch picture is currently displayed. Thus, subsequent check is made in step 2705 as to if a switch event is inputted by clicking the item 2303 shown in FIG. 23 to switch from the patch picture to the module picture. If YES, the module picture is displayed in step 2706. Further, the flag SEQFLG2 is set to "1" in step 2707. Thereafter, the routine returns. If the check result of step 2705 is NO, patch detail editing process is undertaken in step 2708 for effecting various editing operations on the patch picture. Thereafter, the routine returns. If the check result of the step 2704 indicates that the flag SEQFLG2 is not set in "0", the module picture is currently displayed. Thus, check is made in step 2709 as to if a preselect event is issued for any module on the module picture. If the module preselect event is issued, the display is switched to the patch picture corresponding to the currently selected patch data in step 2710. Further, the preselected module is patched or pasted into the displayed patch picture. Then, the flag SEQFLG2 is reset to "0". Thereafter, the routine returns.

If the module preselect event is not issued in step 2709, check is made in step 2712 as to if a switch event is issued by clicking the item 2122 shown in FIG. 21 to command change from the module picture to the patch picture. If YES, the patch picture corresponding to the currently selected patch data is displayed in step 2713. Then, the flag SEQ-FLG2 is reset to "0" in step 2714. Thereafter, the routine returns. If the switch event is not issued in step 2712, module picture change process is undertaken in step 2715. Thereafter, the routine returns. In the module picture change process, a module name denoted by reference 2121 of FIG. 21 is clicked on the current module picture so that the list of the various module pictures or frames is called. Then, the user selects a desired module picture from the list. If no click is made on the name button 2121 shown in FIG. 21, the routine simply passes the step 2715 of the module picture change process.

Figure 28:
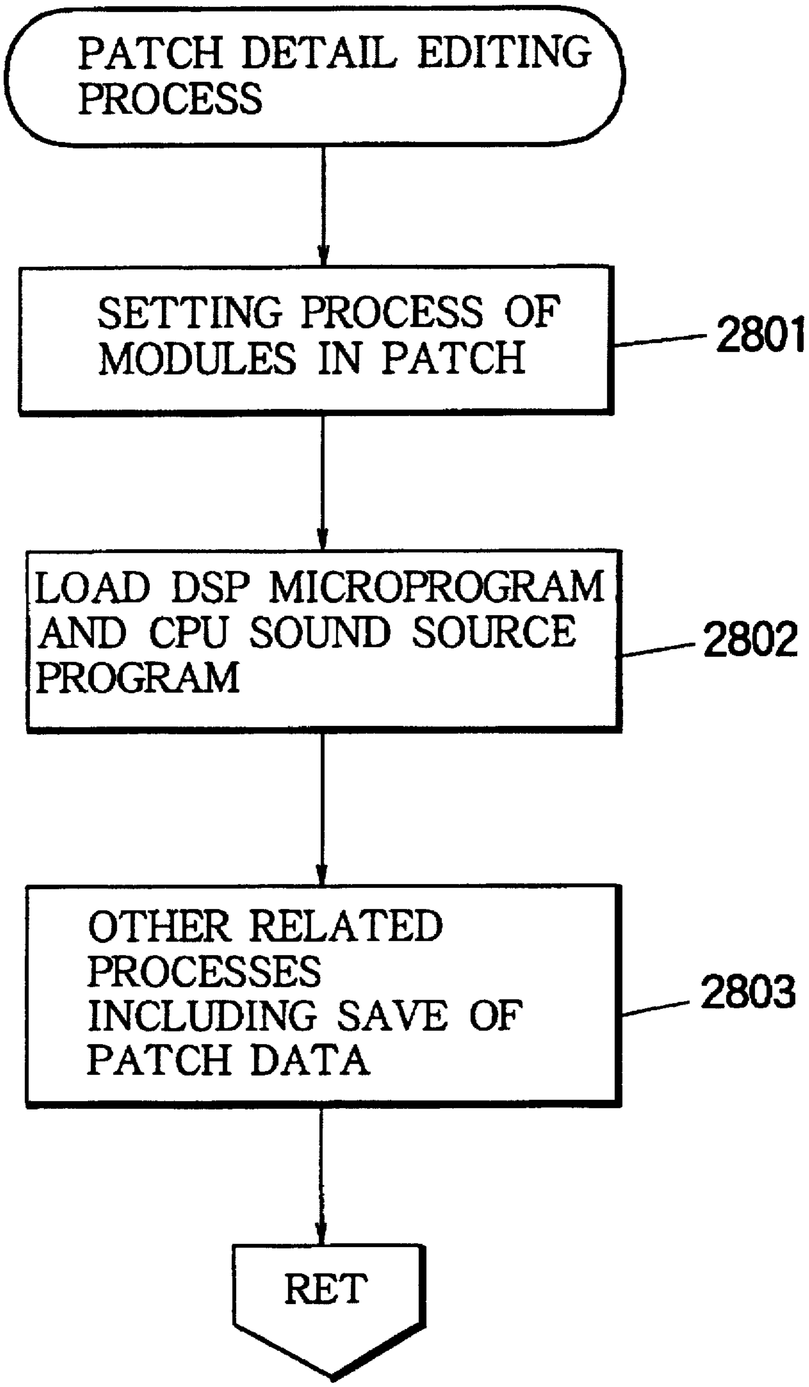
FIG. 28 is a flowchart showing details of the patch edit process.

FIG. 28 is a flowchart showing the patch detail editing process executed in the step 2708 of FIG. 27. In the patch detail editing process, setting process of each module is carried out in step 2801 on the patch picture. This setting process includes setting of the on/off status of each module, for example, by turning on or off the check box 2131 shown in FIG. 22A, designating of the parameter group, for example, by changing the number and name of the parameter group as denoted by reference numeral 2134 shown in FIG. 22A, processor settings associated to the item "SETTINGS" as exemplified by reference numeral 2210 of FIG. 22B in conjunction with FIGS. 22C and 22D, and parameter settings associated to the item "PARAMETERS" exemplified by reference numeral 2240 of FIG. 22E.

Next, step 2802 is undertaken such that required DSP microprograms and CPU tone generation programs are loaded according to the patch data, and required parameters are transferred to the hardware devices. In manner similar to the loading process of the DSP microprograms in the first embodiment, the software modules specified by the patch data are loaded into the RAM 1803, microprogram RAMs of DSPs 1809 and 1810, and hardware devices 1811 and 1812. The thus loaded CPU tone generation programs are executed in the steps 2602, 2604 and 2606 shown in FIG. 26. Then, other related processes are executed in step 2803. Thereafter, the routine returns. These related processes include moving and deleting of modules on the patch picture, editing of connections among modules, changing of the patch data and saving of the patch data. The patch data may be changed by clicking the patch name denoted by reference 2301 of FIG. 23 to call a list of various patch pictures. The user can select a desired one of the listed patch pictures, and the selected patch picture is displayed in place of the current patch picture.

Figures 29A, 29B:
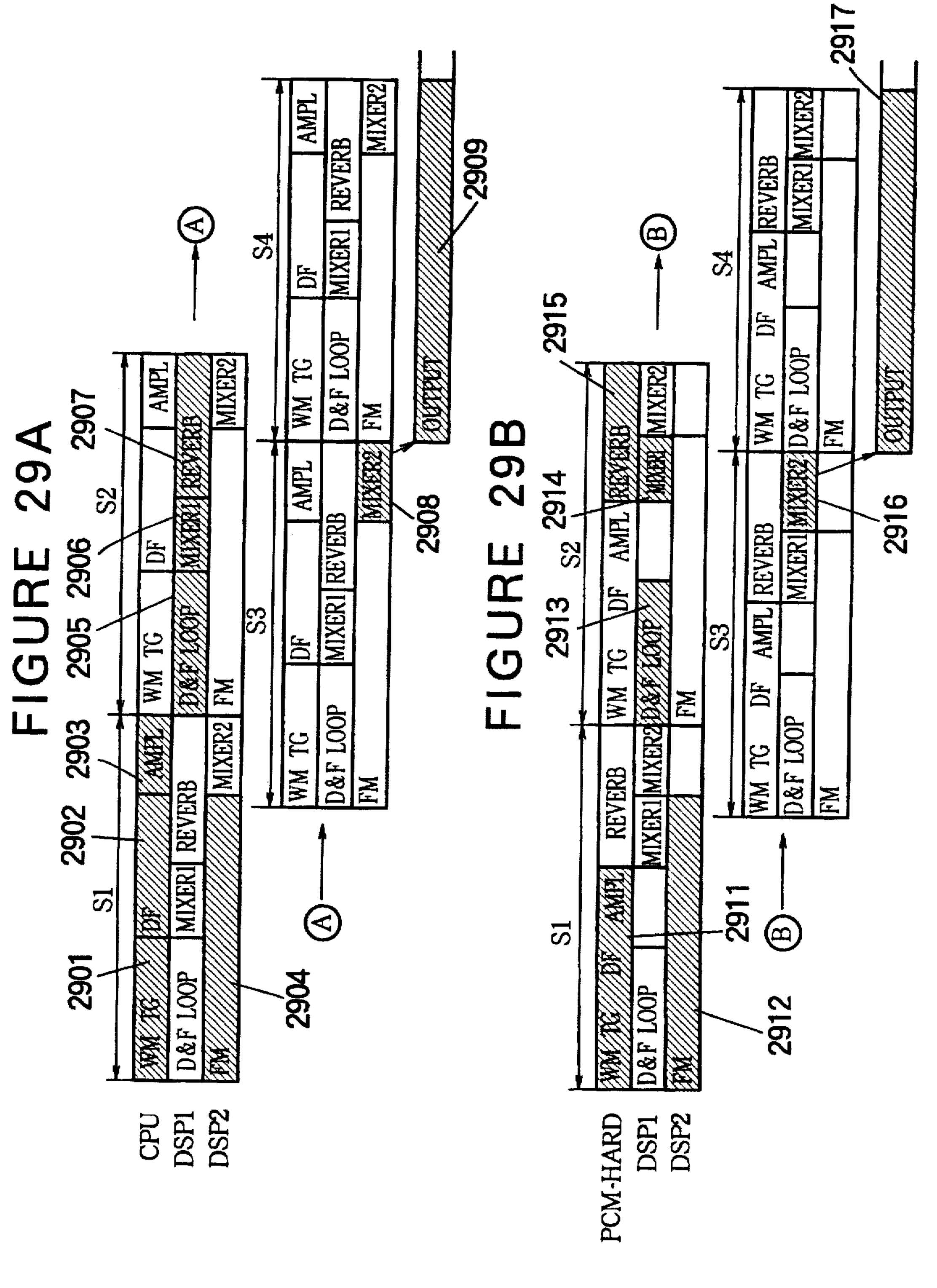
FIGS. 29A and 29B are a time chart showing operation of the second embodiment.

FIG. 29A is a time chart showing the musical tone generating process based on the patch data represented by the patch picture of FIG. 23. Specifically in FIG. 29A, according to the patch data of FIG. 23, the CPU 1801 is used to perform the waveform memory tone generating process (denoted by WAVE MEMORY TG in FIG. 23), the digital filtering process (DIGITAL FILTER), and the amplitude control process (AMPLITUDE CONTROLLER). The DSP 1809 is utilized to perform the delay and filter loop process (DELAY & FILTER LOOP), the preceding mixing process (MIXER) and the reverberation creating process (REVERB) after the preceding mixing process. The DSP 1810 is used to perform the FM tone generating process (FM TONE GENERATOR) and the succeeding mixing process (MIXER) after the reverberation creating process (REVERB). In the time chart of FIG. 29A, S1, S2, S3 and S4 denote one DAC cycle, respectively. The musical tone signal is outputted according to the following process flow. The musical tone signal is transferred among the various modules interconnected as shown in FIG. 23 through the output buffers (OUTPUT BUFFERS) as described in conjunction with FIG. 20. At the first cycle S1, the CPU 1801 carries out the waveform memory tone generating process as diagrammatically illustrated by a hatching section 2901. The output thereof is subjected to the digital filtering process as depicted by a hatching section 2902. The output therefrom is subjected to the amplitude control process depicted by a hatching section 2903 in response to the operation of the foot controller. In parallel to the waveform memory tone generating process, the DSP 1810 carries out the FM tone generating process as depicted by a hatching section 2904. At the second cycle S2, the DSP 1809 applies the delay and filter loop process as depicted by a hatching section 2905 to the output of the waveform memory tone generating process. Further, the DSP 1809 carries out the preceding mixing process of the outputs from the envelope control process, the delay and filter loop process and the FM tone generating process, as depicted by a hatching section 2906. Further, the output thereof is subjected to the reverberation creating process as depicted by a hatching section 2907. At the third cycle S3, as depicted by a hatching section 2908, the DSP 1810 carries out the succeeding mixing process of the outputs from the amplitude control process, the delay and filter loop process, the FM tone generating process, and the reverberation creating process. The mixed result is fed to the DAC 1805 at the fourth cycle S4 as depicted by a hatching section 2909. In detail, the DAC 1805 requests the DMAC 1806 at a predetermined period to access an address of the RAM 1803 where the mixed result is stored. Thus, the DAC 1805 receives the final musical tone signal, which is fed to a sound system (not shown in the drawings).

FIG. 29B shows a variation of the process flow shown in the FIG. 29A. In this variation, according to the patch data illustrated in FIG. 23, the hardware device 1812 executes the waveform memory tone generating process (denoted by WAVE MEMORY TG in FIG. 23), the amplitude control process (AMPLITUDE CONTROLLER) and the reverberation creating process (REVERB). The DSP 1809 executes the delay and filter loop process (DELAY & FILTER LOOP), the preceding mixing process (MIXER) before the reverberation creating process, and the succeeding mixing process (MIXER) after the reverberation creating process. The DSP 1810 executes the FM tone generating process (FM TONE GENERATOR).

At the first cycle S1, the hardware device 1812 executes the waveform memory tone generating process, the digital filtering process, and the amplitude control process as denoted by a hatching period 2911. In parallel manner, the DSP 1810 carries out the FM tone generating process in a hatching period 2912. At the second cycle S2, the DSP 1809 carries out the delay and filter loop process for the output from the waveform memory tone generating process in a hatching period 2913. Further, the DSP 1809 carries out the preceding mixing process of the outputs from the delay and filter loop process and the FM tone generating process in a hatching period 2914. The hardware device 1812 carries out the reverberation creating process for the output from the preceding mixing process in a hatching period 2915. At the third cycle S3, as denoted by a hatching period 2916, the DSP 1809 carries out the succeeding mixing process of the outputs from the amplitude control process, the delay and filter loop process, the FM tone generating process, and the reverberation creating process. The mixed result is fed to the DAC 1805 in a period 2917 at the fourth cycle S4.

Figures 30A, 30B:
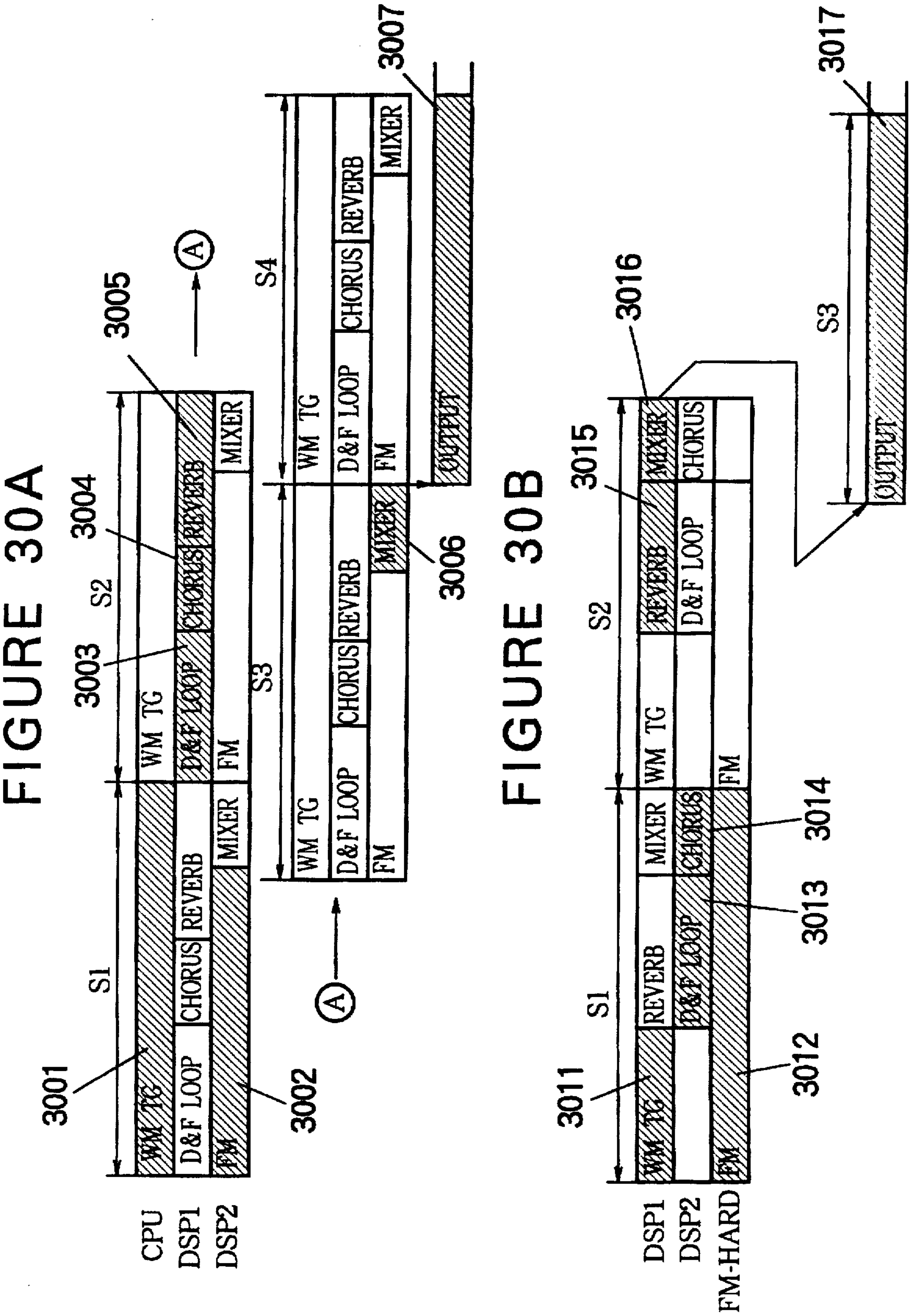
FIGS. 30A and 30B are another time chart showing operation of the second embodiment.

FIG. 30A is a time chart showing a sequence of the musical tone generation according to the patch data diagrammatically indicated in FIG. 24. In this sequence, the CPU 1801 executes the waveform memory tone generating process (schematically illustrated as WAVE MEMORY TG in FIG. 24). The DSP 1809 executes the delay and filter loop process (DELAY & FILTER LOOP), the chorus process (CHORUS) and the reverberation creating process (REVERB). The DSP 1810 executes the FM tone generating process (FM TONE GENERATOR) and the mixing process (MIXER). At the first cycle S1, the CPU 1801 carries out the waveform memory tone generating process in a period 3001. In parallel manner, the DSP 1810 carries out the FM tone generating process in a period 3002. At the second cycle S2, the DSP 1809 carries out the delay and filter loop process of the output from the waveform memory tone generating process in a period 3003. Further, the DSP 1809 carries out the chorus process of the output from the delay and filter loop process in a period 3004. Moreover, the DSP 1809 carries out the reverberation creating process of the output from the chorus process in a period 3005. At the third cycle S3, the DSP 1810 carries out the mixing process in a period 3006 for the outputs from the chorus process, the reverberation creating process and the FM tone generating process. The mixed result is fed to the DAC 1805 in a period 3007 at the fourth cycle S4.

FIG. 30B shows a variation of the sequence shown in FIG. 30A. In this variation, the DSP 1809 handles the waveform memory tone generating process (the corresponding module or block is denoted by WAVE MEMORY TG in FIG. 24), the reverberation creating process (REVERB) and the mixing process (MIXER). The DSP 1810 handles the delay and filter loop process (DELAY & FILTER LOOP) and the chorus process (CHORUS). The hardware device 1811 is used for the FM tone generating process (FM TONE GENERATOR). At the first cycle S1, the DSP 1809 carries out the waveform memory tone generating process in a period 3011. The DSP 1810 carries out the delay and filter loop process of the output from the memory tone generating process in a period 3013, and further carries out the chorus process of the output from the delay and filter loop process in a period 3014. In parallel manners the hardware device 1811 carries out the FM tone generating process in a period 3012. At the second cycle S2, the DSP 1809 carries out the reverberation creating process in a period 3015, and further carries out the mixing process in a period 3016. The mixed result is fed to the DAC 1805 in a period 3017 at the third cycle S3.

As described above, the second embodiment can achieve the same effect as that of the first embodiment. Further, the second embodiment can edit a framework of the functional block diagram which is fixed in the first embodiment, thereby improving freedom of editing the tone generation algorithm.

Figure 31:
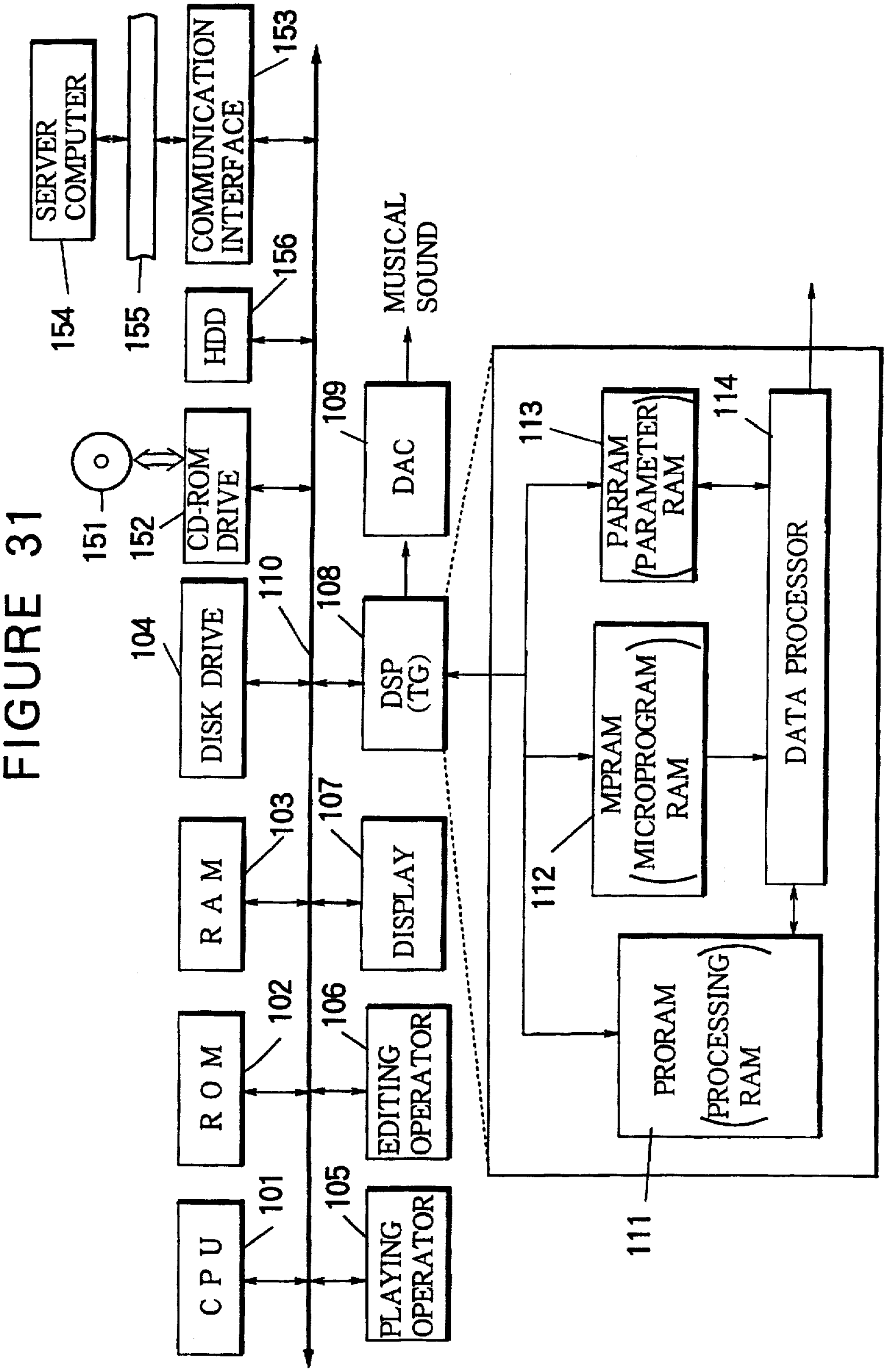
FIG. 31 is a schematic block diagram showing a third embodiment of the electronic musical instrument according to the invention.

FIG. 31 shows a third embodiment of the inventive musical sound apparatus contained in the electronic musical instrument. This embodiment has basically the same construction as the first embodiment shown in FIG. 1. The same components are denoted by the same references as those of the first embodiment to facilitate better understanding of the third embodiment. A storage unit such as a hard disc drive (HDD) 156 can store various data such as control parameters, and various programs including the system control program or main program, the elementary microprograms and application programs. Normally, the ROM 102 provisionally stores these data and programs. However, if not, any program may be loaded into a hard disc or else in the storage unit. The loaded program is transferred to the RAM 103 to enable the CPU 101 to operate the inventive system of the musical sound apparatus. By such a manner, new or version-up programs can be readily installed in the system. For this purpose, a machine-readable media such as a CD-ROM (Compact Disc Read Only Memory) 151 is utilized to install the program. The CD-ROM 151 is set into a CD-ROM drive 152 to read out and download the program from the CD-ROM 151 into the storage unit through the bus 110. The machine-readable media may be composed of a magnetic disc or an optical disc other than the CD-ROM 151.

A communication interface 153 is connected to an external server computer 154 through a communication network 155 such as LAN (Local Area Network), public telephone network and INTERNET. If the storage unit such as the HDD 156 does not reserve needed data or program, the communication interface 153 is activated to receive the data or program from the server computer 154. The CPU 101 transmits a request to the server computer 154 through the interface 153 and the network 155. In response to the request, the server computer 154 transmits the requested data or program to the apparatus. The transmitted data or program is stored in the hard disc of the storage unit to thereby complete the downloading.

The inventive musical sound apparatus can be implemented by means of a personal computer which is installed with the needed data and programs. In such a case, the data and the programs are provided to the user by means of the machine-readable media such as the CD-ROM 151 or a floppy disc. The machine-readable media contains instructions for causing the personal computer to perform the inventive musical sound generating method as described in conjunction with the previous embodiments. Otherwise, the personal computer may receive the data and programs through the communication network 155.

As described in the foregoing, according to the present invention, it is possible to provide a programmable sound source having a voice editor by which users can enjoy freedom of setting a desired tone generation algorithm in order to synthesize various tones with limited hardware resources and limited steps of microprograms.

What is claimed is:

1. A sound source apparatus comprising:

editor means for editing a specific algorithm which defines an arithmetic procedure for computerized synthesis of a desired musical tone by selecting or nonselecting each of various elementary functions which are usable for computerized synthesis of musical tones such that the defined arithmetic procedure is composed of the selected ones of the various elementary functions, wherein the editor means includes means for preselecting and arranging the various elementary functions to prepare a generic algorithm which is then edited to the specific algorithm by selecting or nonselecting each elementary function;

assembler means for assembling a computer program corresponding to the edited specific algorithm;

memory means for storing the assembled computer program; and generator means for executing the arithmetic procedure according to the stored computer program to thereby generate the desired musical tone.

2. A sound source apparatus according to claim 1, further comprising display means for displaying a functional diagram which visually represents the various elementary functions so that the editor means is manually operated to treat the displayed functional diagram to thereby graphically edit the specific algorithm by selecting or nonselecting each elementary function.

3. A sound source apparatus according to claim 1, wherein the assembler means comprises means for collecting an active elementary program which activates each selected elementary function and for collecting an inactive elementary program which deactivates each nonselected elementary function so as to assemble the collected ones of the active and inactive elementary programs into a complete form of the computer program.

4. A sound source apparatus according to claim 3, further including secondary memory means for provisionally storing a pair of programs including the active elementary program and the inactive elementary program in the form of a microprogram for each elementary function.

5. A sound source apparatus comprising:

display means for displaying a block diagram containing various functional blocks which represent corresponding elementary functions selectively usable for synthesis of a desired musical tone;

secondary memory means for provisionally storing a pair of programs including an active elementary program and an inactive elementary program for each functional block such that the active elementary program is designed to activate the corresponding elementary function while the inactive elementary program is designed to deactivate the corresponding elementary function;

editor means for graphically treating the displayed block diagram so that each functional block is selected if the corresponding elementary function is necessary for the synthesis of the desired musical tone and is otherwise nonselected if the corresponding elementary function is unnecessary for the synthesis of the desired musical tone to thereby edit an algorithm which defines an arithmetic procedure for the synthesis of the desired musical tone;

assembler means for retrieving from the secondary memory means an active elementary program for each selected functional block so as to enable the corresponding elementary function and for retrieving an inactive elementary program for each nonselected functional block so as to disable the corresponding elementary function to thereby assemble the retrieved ones of the active and inactive elementary programs into a complete program according to the edited algorithm;

primary memory means for storing the complete program; and generator means connected to the primary memory means for executing the edited arithmetic procedure according to the stored complete program to thereby generate the desired musical tone.

6. A sound source apparatus according to claim 5, wherein the secondary memory means comprises means storing the elementary program in the form of a microprogram.

7. A sound source apparatus according to claim 5, further comprising support means for preselecting the elementary functions and arranging the preselected elementary functions to form the block diagram as a framework treated by the editor means.

8. A timbre creating apparatus for assembling microprograms into a complete program which is loaded into a digital signal processor to operate the same to generate a musical tone having a desired timbre, the apparatus comprising:

display means for displaying a block diagram containing various functional blocks which represent corresponding elementary functions selectively usable for creation of the desired timbre;

memory means for storing a pair of active and inactive microprograms for each functional block such that the active microprogram is designed to activate the corresponding elementary function while the inactive microprogram is designed to deactivate the corresponding elementary function;

editor means for graphically treating the displayed block diagram so that each functional block is selected if the corresponding elementary function contributes to the desired timbre and is otherwise nonselected if the corresponding elementary function does not contribute to the desired timbre to thereby edit an algorithm which defines an arithmetic procedure for the creation of the desired timbre; and assembler means for retrieving from the memory means an active microprogram for each selected functional block so as to enable the corresponding elementary function and for retrieving from the memory means an inactive microprogram for each nonselected functional block so as to disable the corresponding elementary function to thereby assemble the retrieved ones of the active and inactive microprograms into the complete program according to the edited algorithm.

9. A timbre creating apparatus according to claim 8, further comprising support means for preselecting the elementary functions and arranging the preselected elementary functions to form the block diagram as a framework treated by the editor means.

10. A method of generating a musical tone comprising the steps of:

editing a specific algorithm which defines an arithmetic procedure for computerized synthesis of a desired musical tone by selecting or nonselecting each of various elementary functions which are usable for computerized synthesis of musical tones, wherein the editing step includes preselecting and arranging the various elementary functions to create a generic algorithm which is then edited to the specific algorithm by selecting or nonselecting each elementary function;

assembling a computer program corresponding to the edited specific algorithm;

storing the assembled computer program; and executing the arithmetic procedure according to the stored computer program to thereby generate the desired musical tone.

11. A method according to claim 10, further comprising displaying a functional diagram which visually represents the various elementary functions so that the displayed functional diagram is treated to graphically edit the specific algorithm by selecting or nonselecting each elementary function.

12. A method according to claim 10, wherein the assembling step comprises collecting an active elementary program which activates each selected elementary function and for collecting an inactive elementary program which deactivates each nonselected elementary function so as to assemble the collected ones of the active and inactive elementary programs into a complete form of the computer program.

13. A method according to claim 12, further including provisionally storing a pair of programs including the active elementary program and the inactive elementary program in the form of a microprogram for each elementary function.

14. A method of generating musical tone comprising the steps of:

displaying a block diagram containing various functional blocks which represent corresponding elementary functions selectively usable for synthesis of a desired musical tone;

provisionally storing a pair of programs including an active elementary program and an inactive elementary program for each functional block in a secondary memory such that the active elementary program is designed to activate the corresponding elementary function while the inactive elementary program is designed to deactivate the corresponding elementary function;

graphically treating the displayed block diagram so that each functional block is selected if the corresponding elementary function is necessary for the synthesis of the desired musical tone and is otherwise nonselected if the corresponding elementary function is unnecessary for the synthesis of the desired musical tone to thereby edit an algorithm which defines an arithmetic procedure for the synthesis of the desired musical tone;

retrieving from the secondary memory an active elementary program for each selected functional block so as to enable the corresponding elementary function and retrieving an inactive elementary program for each nonselected functional block so as to disable the corresponding elementary function to thereby assemble the retrieved ones of the active and inactive elementary programs into a complete program according to the edited algorithm;

loading the complete program in a primary memory; and executing the edited arithmetic procedure according to the complete program loaded in the primary memory to thereby generate the desired musical tone.

15. A method according to claim 14, wherein the storing step comprises storing the elementary program in the form of a microprogram.

16. A method according to claim 14, further comprising preselecting the elementary functions and arranging the preselected elementary functions to form the block diagram as a framework prepared for the editing of the algorithm.

17. A method of assembling microprograms into a complete program which is loaded into a digital signal processor to operate the same to generate a musical tone having a desired timbre, the method comprising:

displaying a block diagram containing various functional blocks which represent corresponding elementary functions selectively usable for creation of the desired timbre;

storing a pair of programs including an active and an inactive microprogram for each functional block in a memory such that the active microprogram is designed to activate the corresponding elementary function while the inactive microprogram is designed to deactivate the corresponding elementary function;

graphically treating the displayed block diagram so that each functional block is selected if the corresponding elementary function contributes to the desired timbre and is otherwise nonselected if the corresponding elementary function does not contribute to the desired timbre to thereby edit an algorithm which defines an arithmetic procedure for the creation of the desired timbre; and retrieving from the memory an active microprogram for each selected functional block so as to enable the corresponding elementary function and retrieving from the memory an inactive microprogram for each nonselected functional block so as to disable the corresponding elementary function to thereby assemble the retrieved ones of the active and inactive microprograms into the complete program according to the edited algorithm.

18. A method according to claim 17, further comprising preselecting the elementary functions and arranging the preselected elementary functions to form the block diagram as a framework prepared for the editing of the algorithm.

19. A machine readable media containing instructions for causing said machine to perform a method of generating a musical tone, the method comprising the steps of:

editing a specific algorithm which defines an arithmetic procedure for computerized synthesis of a desired musical tone by selecting or nonselecting each of various elementary functions which are usable for computerized synthesis of any musical tones;

assembling a computer program corresponding to the edited specific algorithm;

storing the assembled computer program; and executing the arithmetic procedure according to the stored computer program to thereby generate the desired musical tone.

20. A machine readable media according to claim 19, wherein the method further comprises displaying a functional diagram which visually represents the various elementary functions so that the displayed functional diagram is treated to graphically edit the specific algorithm by selecting or nonselecting each elementary function.

21. A machine readable media according to claim 19, wherein the editing step includes preselecting and arranging the various elementary functions to create a generic algorithm which is then edited to the specific algorithm by selecting or nonselecting each elementary function.

22. A machine readable media according to claim 19, wherein the assembling step comprises collecting an active elementary program which activates each selected elementary function and for collecting an inactive elementary program which deactivates each nonselected elementary function so as to assemble the collected ones of the active and inactive elementary programs into a complete form of the computer program.

23. A machine readable media according to claim 22, wherein the method further includes provisionally storing a pair of programs including the active elementary program and the inactive elementary program in the form of a microprogram for each elementary function.

24. A machine readable media containing instructions for causing said machine to perform a method of generating a musical tone, the method comprising the steps of:

displaying a block diagram containing various functional blocks which represent corresponding elementary functions selectively usable for synthesis of a desired musical tone;

provisionally storing a pair of programs including an active elementary program and an inactive elementary program for each functional block in a secondary memory such that the active elementary program is designed to activate the corresponding elementary function while the inactive elementary program is designed to deactivate the corresponding elementary function;

graphically treating the displayed block diagram so that each functional block is selected if the corresponding elementary function is necessary for the synthesis of the desired musical tone and is otherwise nonselected if the corresponding elementary function is unnecessary for the synthesis of the desired musical tone to thereby edit an algorithm which defines an arithmetic procedure for the synthesis of the desired musical tone;

retrieving from the secondary memory an active elementary program for each selected functional block so as to enable the corresponding elementary function and retrieving an inactive elementary program for each nonselected functional block so as to disable the corresponding elementary function to thereby assemble the retrieved ones of the active and inactive elementary programs into a complete program according to the edited algorithm;

loading the complete program in a primary memory; and executing the edited arithmetic procedure according to the complete program loaded in the primary memory to thereby generate the desired musical tone.

25. A machine readable media according to claim 24, wherein the storing step comprises storing the elementary program in the form of a microprogram.

26. A machine readable media according to claim 24, wherein the method further comprises preselecting the elementary functions and arranging the preselected elementary functions to form the block diagram as a framework prepared for the editing of the algorithm.

27. A machine readable media containing instructions for causing said machine to perform a method of assembling microprograms into a complete program which is loaded into a digital signal processor to operate the same to generate a musical tone having a desired timbre, the method comprising:

displaying a block diagram containing various functional blocks which represent corresponding elementary functions selectively usable for creation of the desired timbre;

storing a pair of programs including an active and an inactive microprogram for each functional block in a memory such that the active microprogram is designed to activate the corresponding elementary function while the inactive microprogram is designed to deactivate the corresponding elementary function;

graphically treating the displayed block diagram so that each functional block is selected if the corresponding elementary function contributes to the desired timbre and is otherwise selected if the corresponding elementary function does not contribute to the desired timbre to thereby edit an algorithm which defines an arithmetic procedure for the creation of the desired timbre; and retrieving from the memory an active microprogram for each selected functional block so as to enable the corresponding elementary function and retrieving from the memory an inactive microprogram for each nonselected functional block so as to disable the corresponding elementary function to thereby assemble the retrieved ones of the active and inactive microprograms into the complete program according to the edited algorithm.

28. A machine readable media according to claim 27, wherein the method further comprises preselecting the elementary functions and arranging the preselected elementary functions to form the block diagram as a framework prepared for the editing of the algorithm.

* * * * *